(12) United States Patent
Jackson et al.

(10) Patent No.: US 12,029,334 B2
(45) Date of Patent: Jul. 9, 2024

(54) METHODS AND APPARATUS FOR NON-DESTRUCTIVE ADHESIVE DEVICES

(71) Applicants: Jeffery L Jackson, Camas, WA (US); Jon Tory Jackson, Camas, WA (US)

(72) Inventors: Jeffery L Jackson, Camas, WA (US); Jon Tory Jackson, Camas, WA (US)

( * ) Notice: Subject to any disclaimer, the term of this patent is extended or adjusted under 35 U.S.C. 154(b) by 0 days.

(21) Appl. No.: 18/513,550

(22) Filed: Nov. 18, 2023

(65) Prior Publication Data
US 2024/0099483 A1    Mar. 28, 2024

Related U.S. Application Data

(63) Continuation of application No. PCT/US2022/030135, filed on May 9, 2022.

(60) Provisional application No. 63/195,478, filed on Jun. 1, 2021, provisional application No. 63/190,653, filed on May 19, 2021.

(51) Int. Cl.
*A47G 1/17* (2006.01)
*C09J 7/38* (2018.01)

(52) U.S. Cl.
CPC .................... *A47G 1/17* (2013.01); *C09J 7/38* (2018.01); *C09J 2301/124* (2020.08); *C09J 2301/204* (2020.08); *C09J 2301/502* (2020.08)

(58) Field of Classification Search
CPC .. C09J 7/38; C09J 2301/124; C09J 2301/204; C09J 2301/502; A47G 1/17; A47G 1/175; F16B 47/003
See application file for complete search history.

(56) References Cited

U.S. PATENT DOCUMENTS

| 5,498,455 A | 3/1996 | Roberts |
| 5,516,581 A | 5/1996 | Kreckel et al. |
| 6,001,471 A | 12/1999 | Bries et al. |

(Continued)

FOREIGN PATENT DOCUMENTS

WO    2018039584 A1    3/2018

OTHER PUBLICATIONS

PCT Written Opinion of the International Searching Authority (ISA) dated Oct. 17, 2022; for International Application No. PCT/US2022/030135; international Filing Date May 19, 2022; 9 pages. (Year: 2022).*
PCT International Search Report, dated Oct. 17, 2022; for International Application No. PCT/US2022/030135; International Filing Date May 19, 2022; 5 pages.
Instructions "17023P-ES." 1 page. Downloaded Oct. 31, 2020 from https://multimedia.3m.com/mws/media/1177411O/17023p-es-command-instructions.pdf&fn=17023P-ES_34871819586.pdf.

(Continued)

*Primary Examiner* — Robert Sandy
(74) *Attorney, Agent, or Firm* — Kaplan IP Law, PLLC; Jonathan T. Kaplan

(57) ABSTRACT

A Non-Destructive Adhesive Device (NDAD) comprising a first end-user graspable tab, coupled to a first area of elastomeric material, coupled to an inelastic area, coupled to a second area of elastomeric material, coupled to a second end-user graspable tab, wherein the first and second areas of elastomeric material are adhesive on both sides, but the first side of the inelastic area is not adhesive. Wherein the second side of the NDAD is attached to an object, and the first side is attached to a wall. Wherein the first object is a mounting plate, for attaching various types of second objects to the wall. Wherein the first area of elastomeric material, the inelastic area, and the second area of elastomeric material are configured to place as much adhesive area as possible, on both sides of the NDAD, as close as possible to the topmost edge of the mounting plate.

20 Claims, 33 Drawing Sheets

(56) References Cited

U.S. PATENT DOCUMENTS

| | | | | |
|---|---|---|---|---|
| 6,004,642 | A | * | 12/1999 | Langford .................... C09J 7/20 428/308.8 |
| 6,106,937 | A | * | 8/2000 | Hamerski .............. A47G 1/175 248/467 |
| 6,120,867 | A | | 9/2000 | Hamerski et al. |
| 6,162,534 | A | | 12/2000 | Hamerski |
| 6,499,707 | B2 | | 12/2002 | Hamerski et al. |
| 6,541,089 | B1 | | 4/2003 | Hamerski et al. |
| 6,558,789 | B1 | | 5/2003 | Hamerski et al. |
| 6,569,521 | B1 | * | 5/2003 | Sheridan ................ C08G 18/61 428/40.1 |
| 6,641,892 | B2 | | 11/2003 | Luhmann |
| 6,972,141 | B1 | * | 12/2005 | Bries ......................... C09J 7/20 428/41.9 |
| 7,028,958 | B2 | | 4/2006 | Pitzen et al. |
| 10,100,229 | B2 | | 10/2018 | Crosby et al. |
| 10,144,195 | B2 | | 12/2018 | Crosby et al. |
| 11,377,575 | B2 | * | 7/2022 | Cowman-Eggert ........ C09J 7/24 |
| 2003/0118970 | A1 | | 6/2003 | Rusin et al. |
| 2003/0134112 | A1 | * | 7/2003 | Kreckel ..................... C09J 7/24 428/354 |
| 2007/0257165 | A1 | | 11/2007 | Newbould et al. |
| 2007/0295436 | A1 | | 12/2007 | Joseph |
| 2012/0064304 | A1 | * | 3/2012 | Bharti ..................... C09J 7/241 428/354 |
| 2018/0065312 | A1 | | 3/2018 | Yates |

OTHER PUBLICATIONS

Instructions "17206-ES." 1 page. Downloaded Oct. 31, 2020 from https://multimedia.3m.com/mws/media/1132655O/command-instructions-17206es.pdf.

"3M Construction & Home Improvement Markets Product Information Sheet." 3 pages. Downloaded Nov. 7, 2020 from https://multimedia.3m.com/mws/media/82916O/command-adhesive-strips.pdf?&fn=CommandAd%2520DS%2520ENG%2520GB%252003.2011.PDF.

"3M Double Coated Polyethylene Foam Tape 4492W." 6 pages. Downloaded Nov. 7, 2020 from: https://3m.citrination.com/pif/000399?locale=en-US.

"3M Dual Lock Reclosable Fastener SJ3560; Jun. 2014." 7 pages. Downloaded Nov. 9, 2020 from: https://multimedia.3m.com/mws/media/1591577O/3m-dual-lock-reclosable-fastener-sj3560.pdf.

"Fasson 2Mil Silver Metalized BOPP TC / Permanent /BG40" 1 page. Downloaded Nov. 9, 2020 from: https://label.averydennison.com/content/dam/averydennison/lpm/ap/en_in/product-families/Data%20Sheets/Film/AMF9601-PDS-en.pdf.

"Tesa 70465 Product Information." 2 pages. Downloaded Nov. 7, 2020 from https://www.tesa.com/en/files/download/2921112,0,tesa-70465-en-us.pdf.

"Tesa Reversible Bonding Solutions." 6 size A4 pages. Downloaded Nov. 7, 2020 from https://www.tesa.com/files/download/661189,tesa-removable-folder-en-v2.pdf.

* cited by examiner

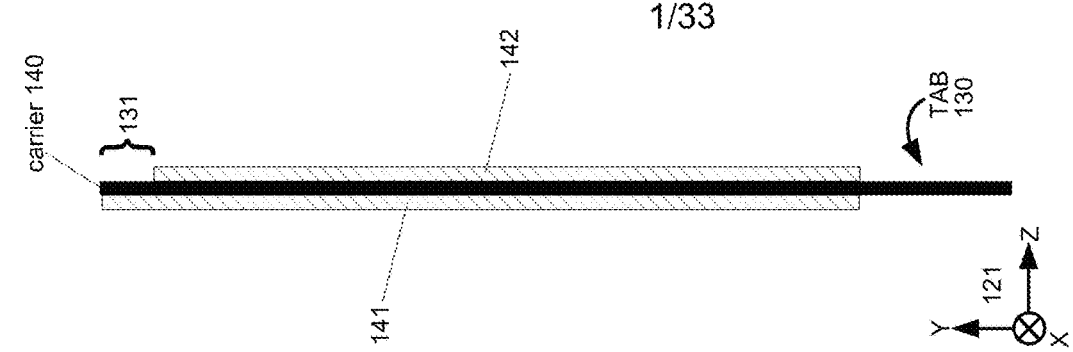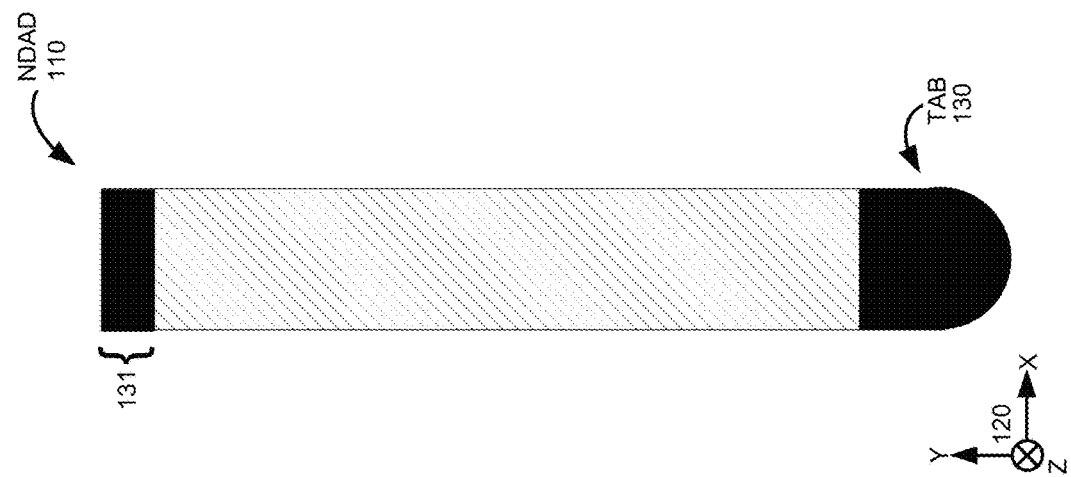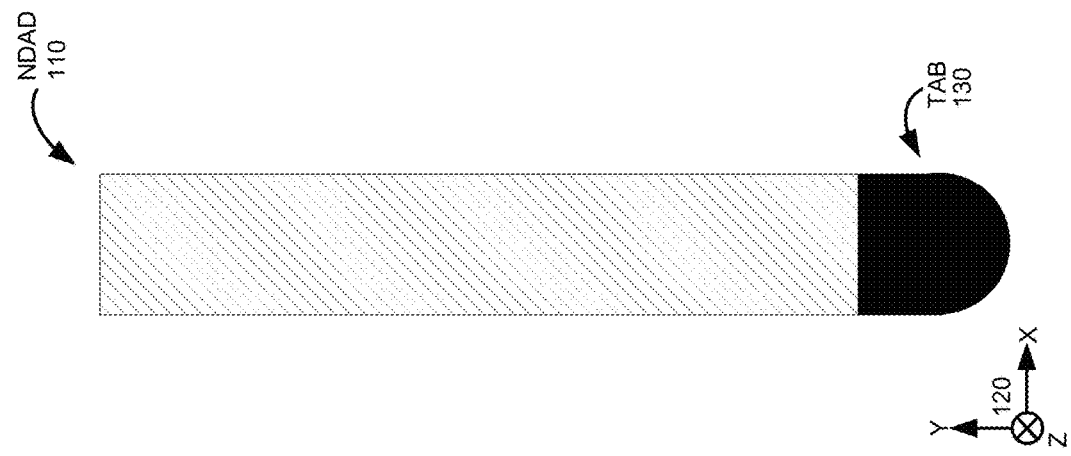

Attached Object Side 112

Wall Side 111

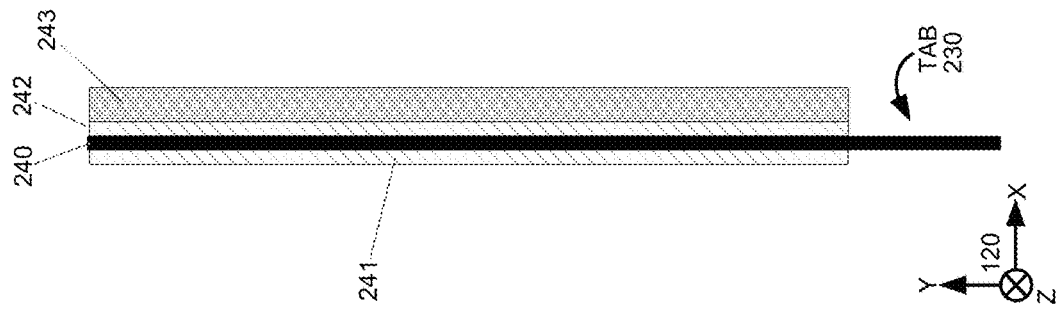
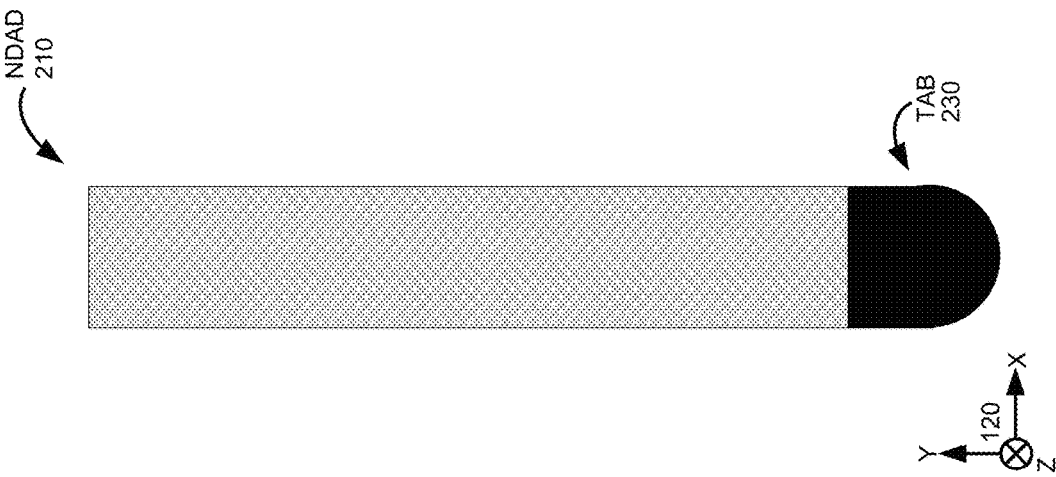
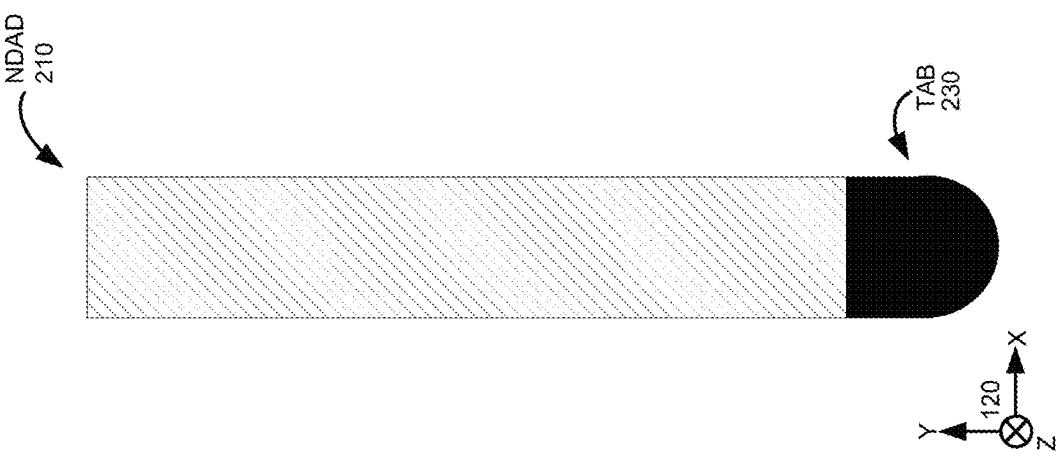

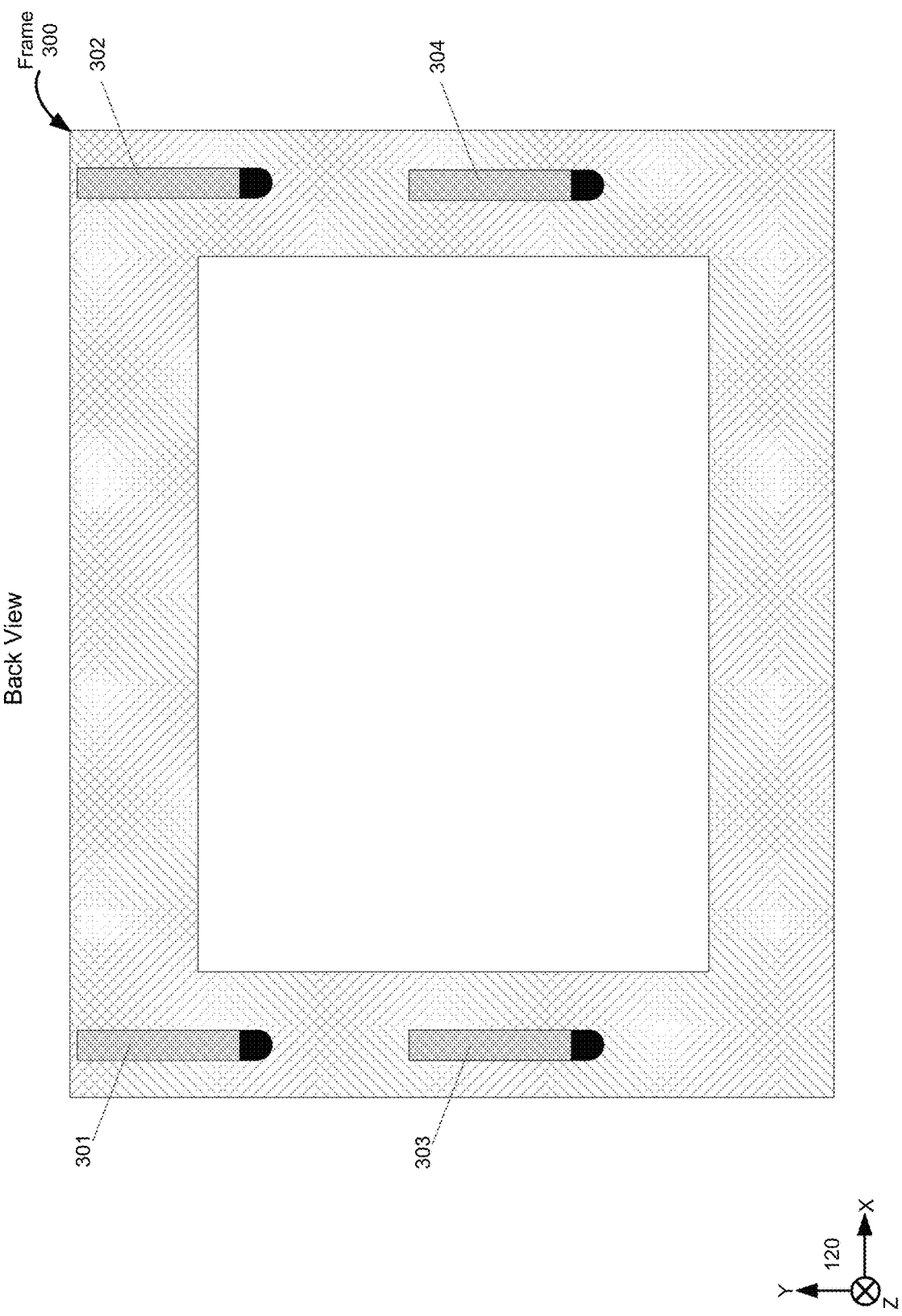

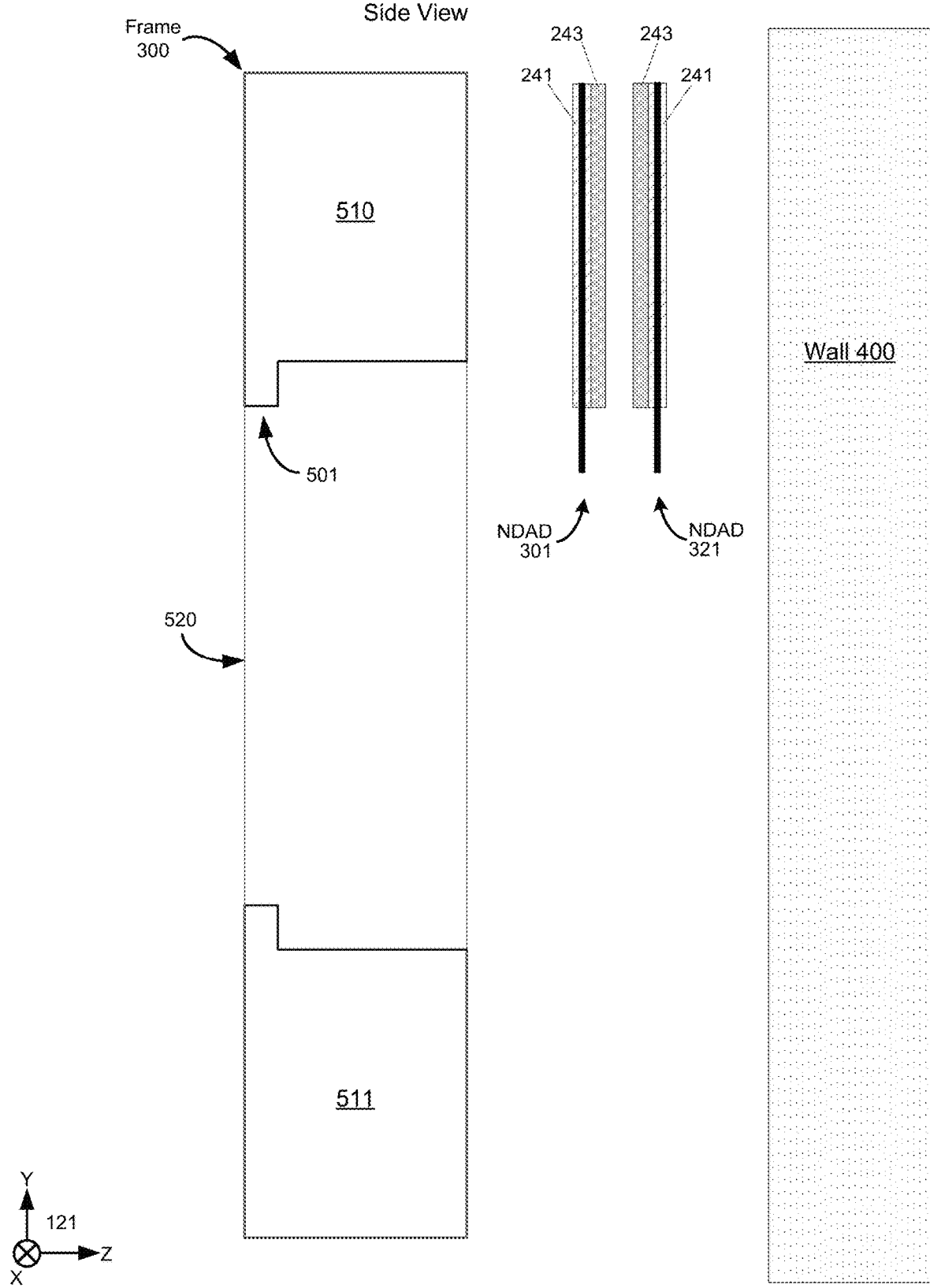

Back (or Wall Side) View

Front View

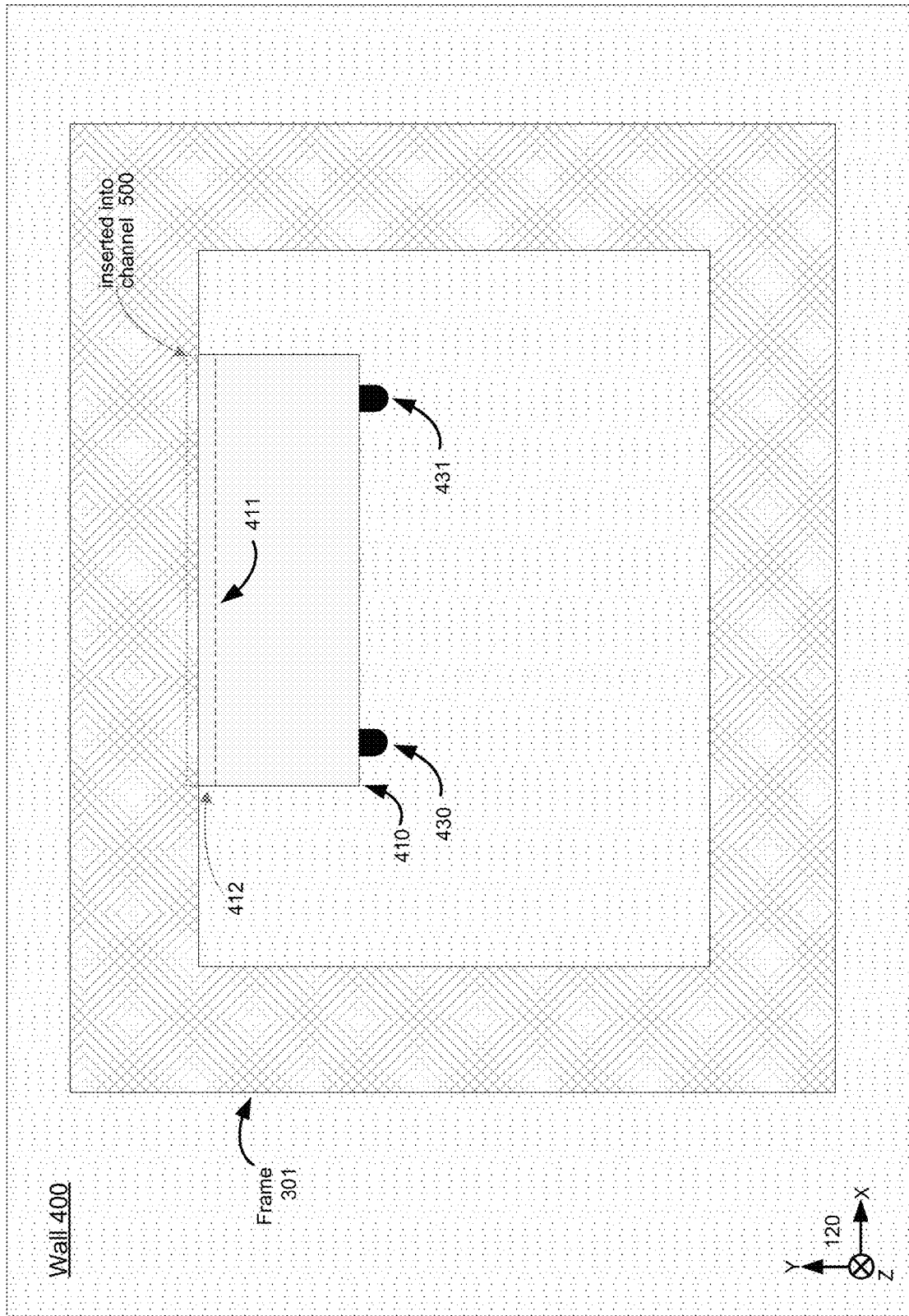

Side View

Side View

Side View

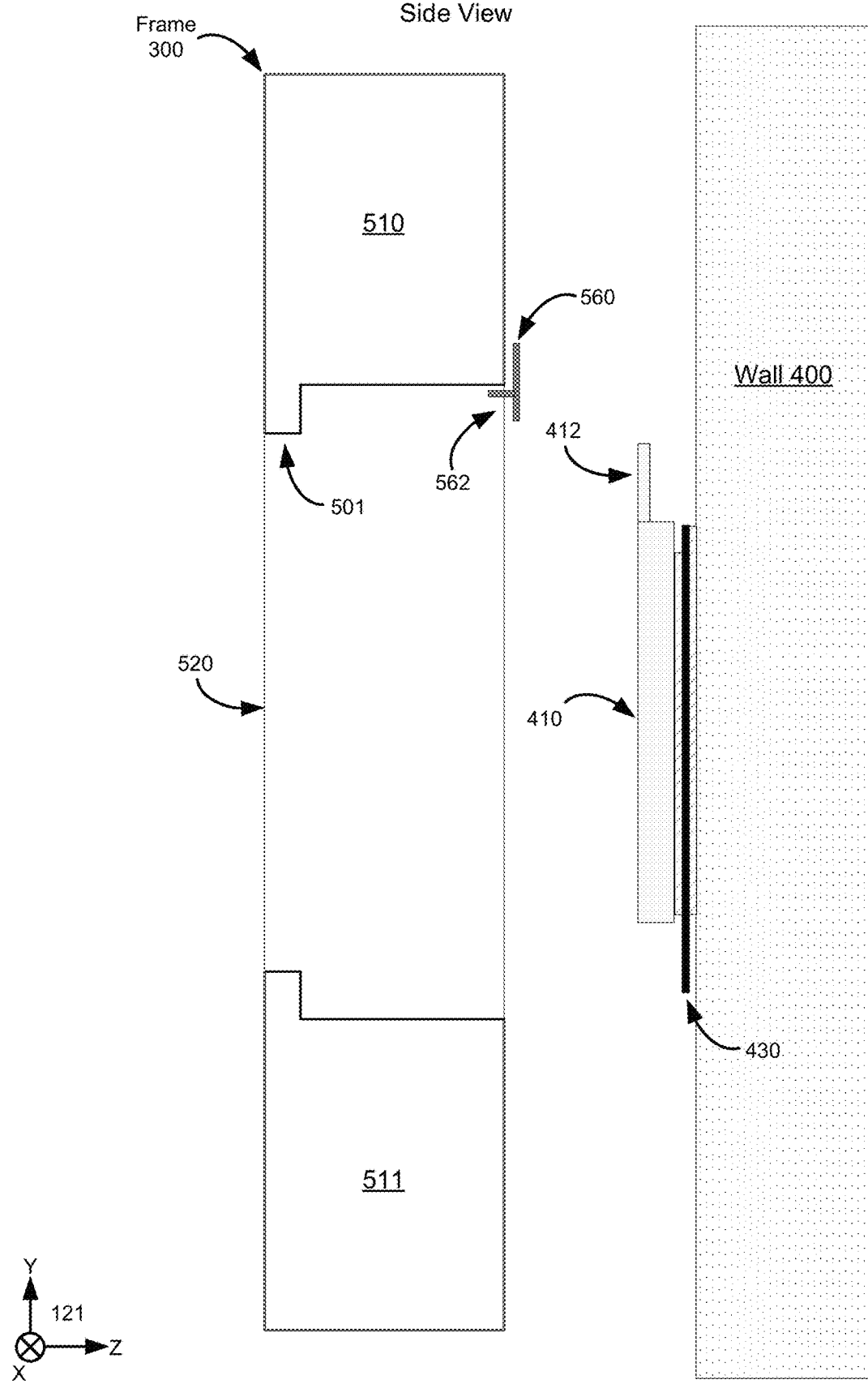

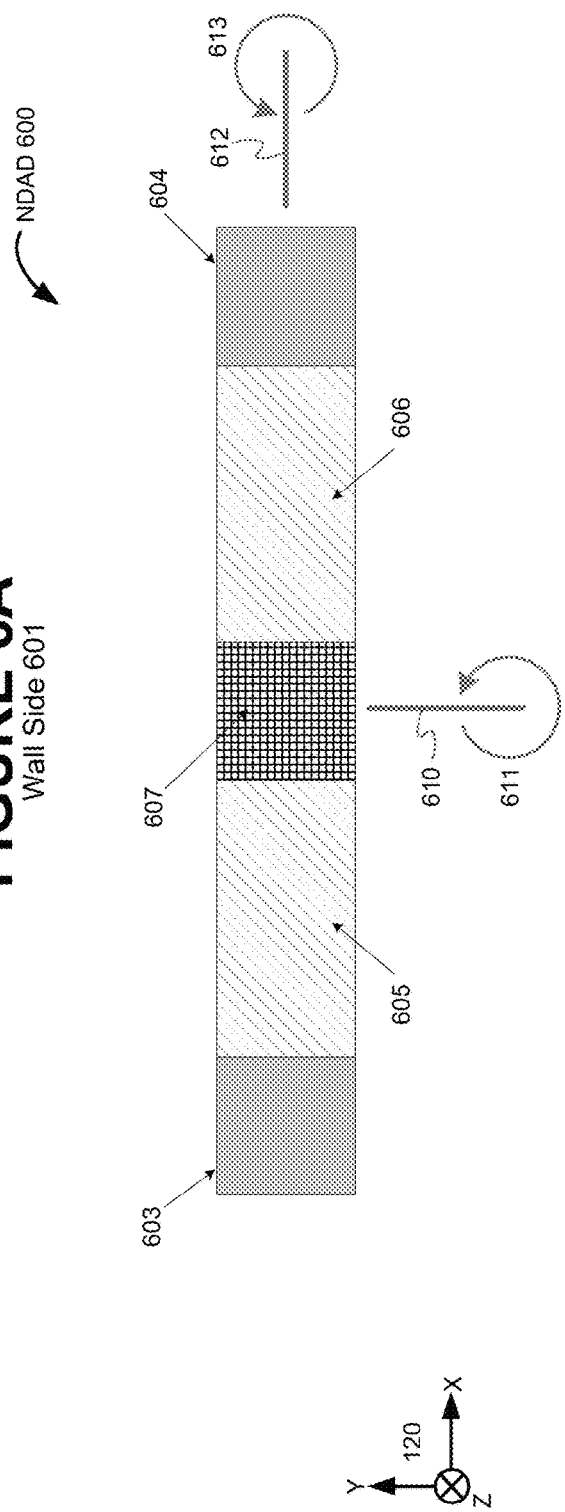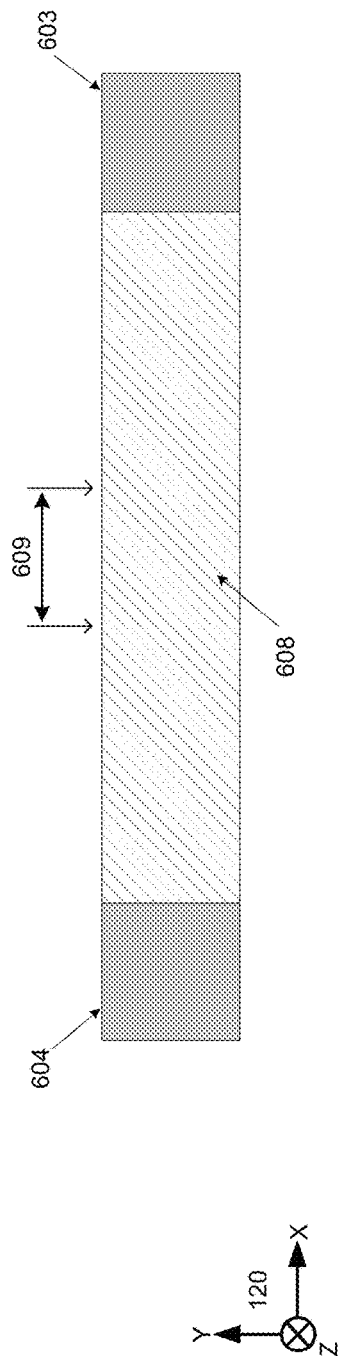

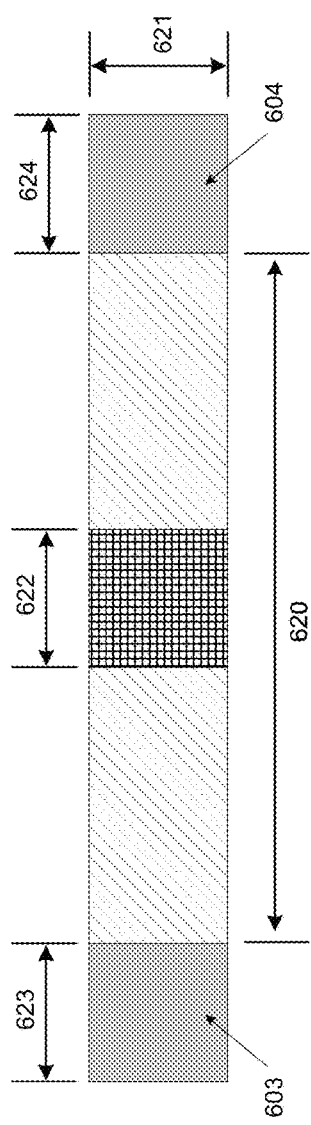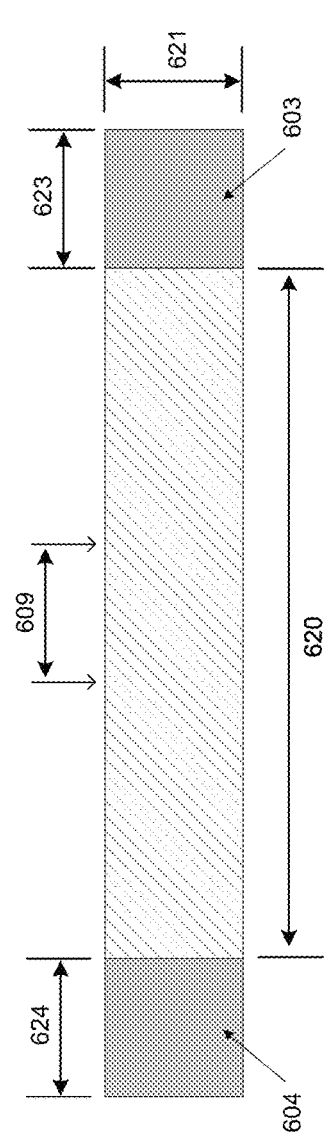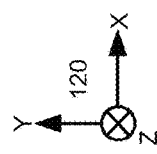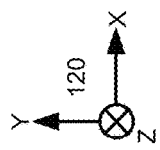
FIGURE 6C
Wall Side 601
FIGURE 6D
Object (e.g., Mounting Plate) Side 602

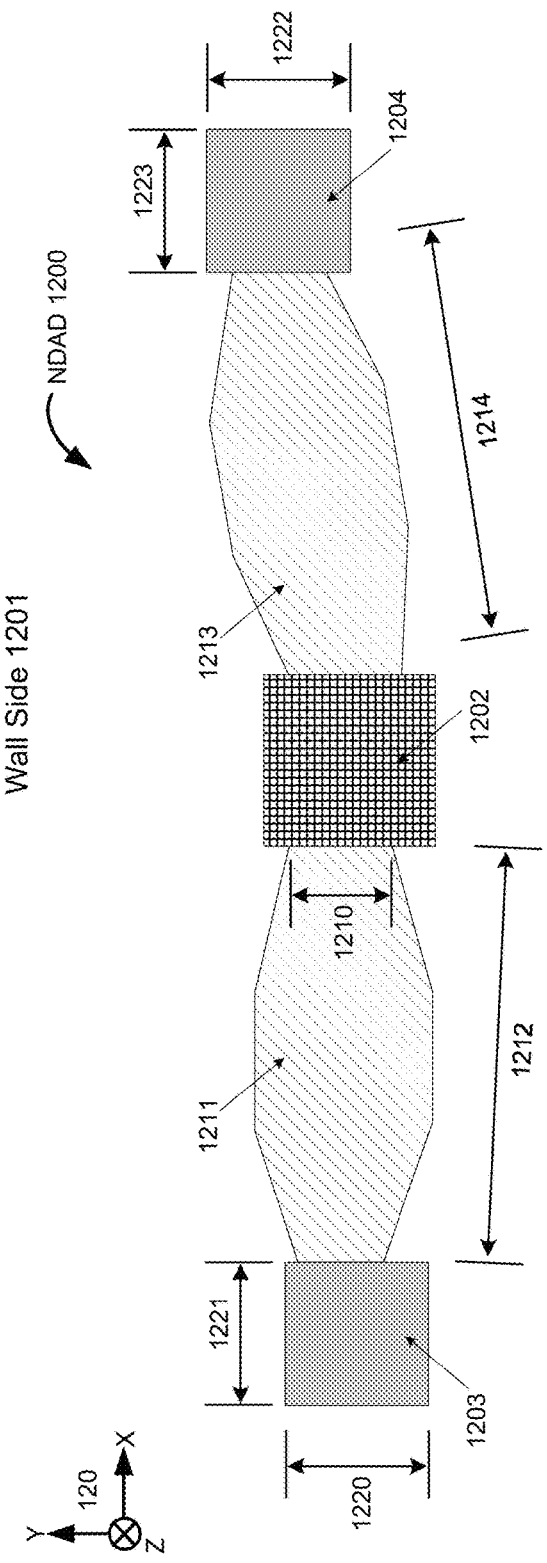
FIGURE 6E Wall Side 1201
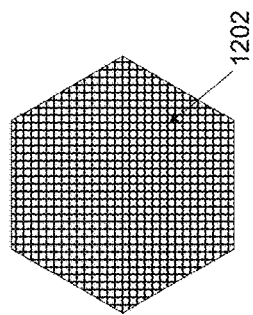
FIGURE 6H
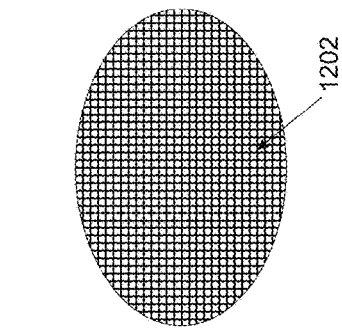
FIGURE 6G
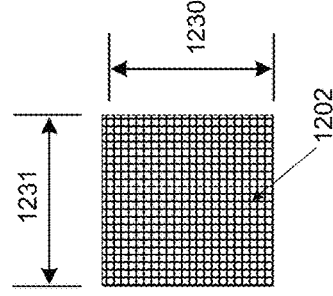
FIGURE 6F

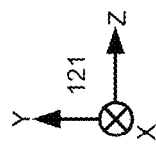
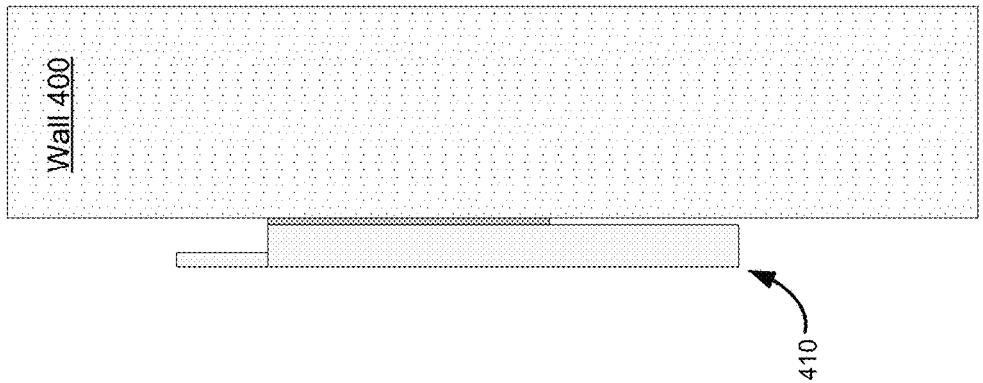
FIGURE 7B
End View
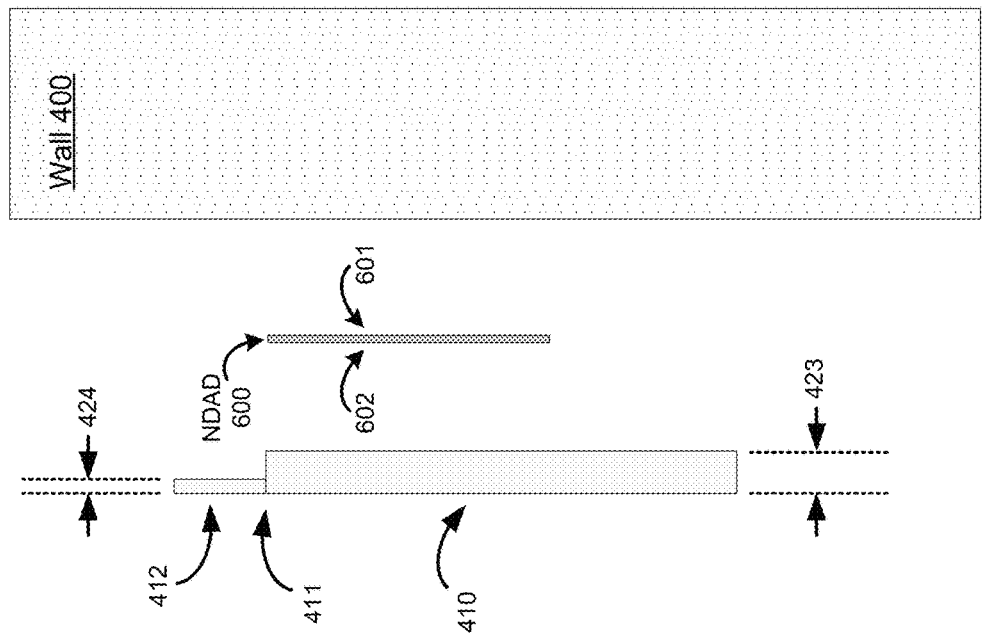
FIGURE 7A
End View
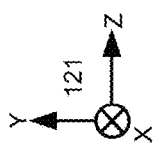

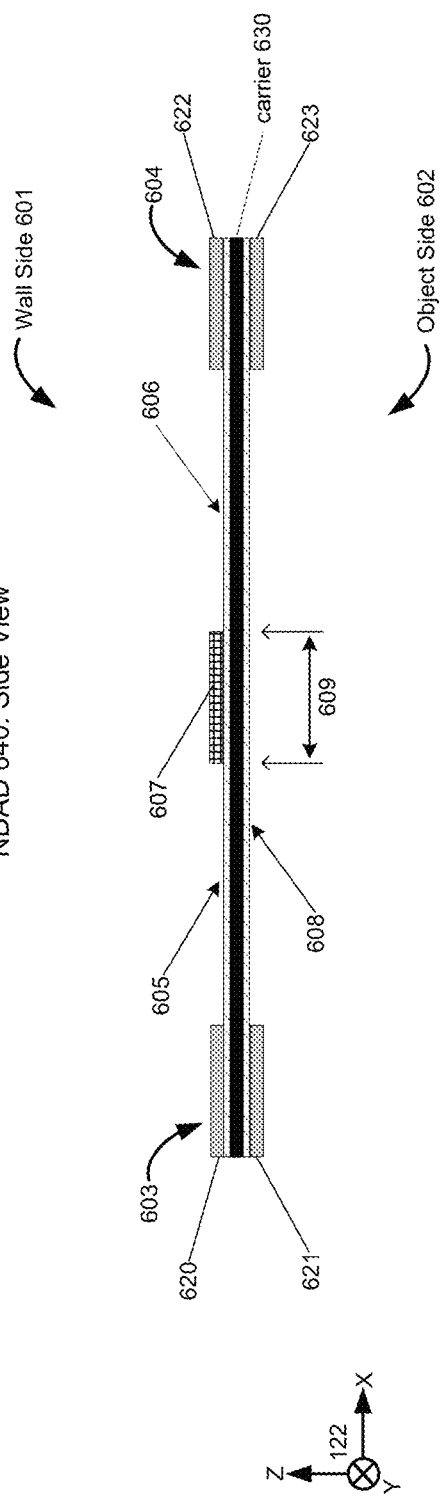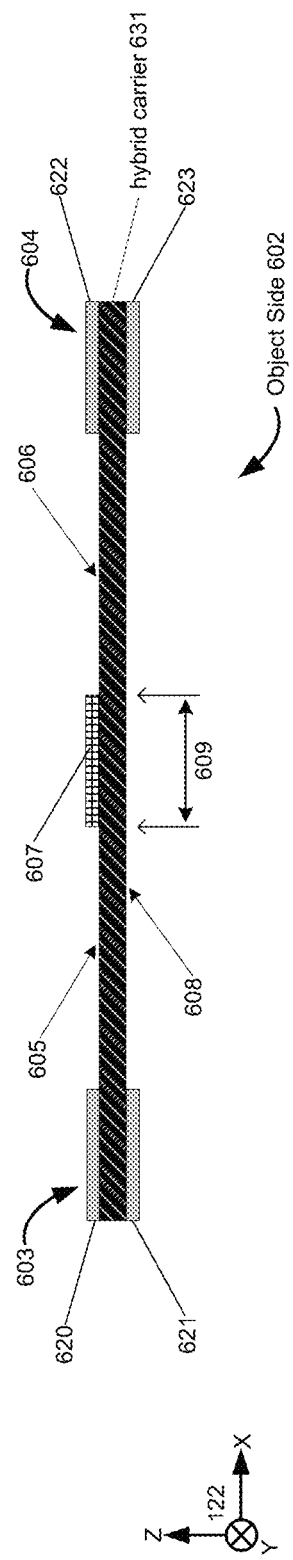

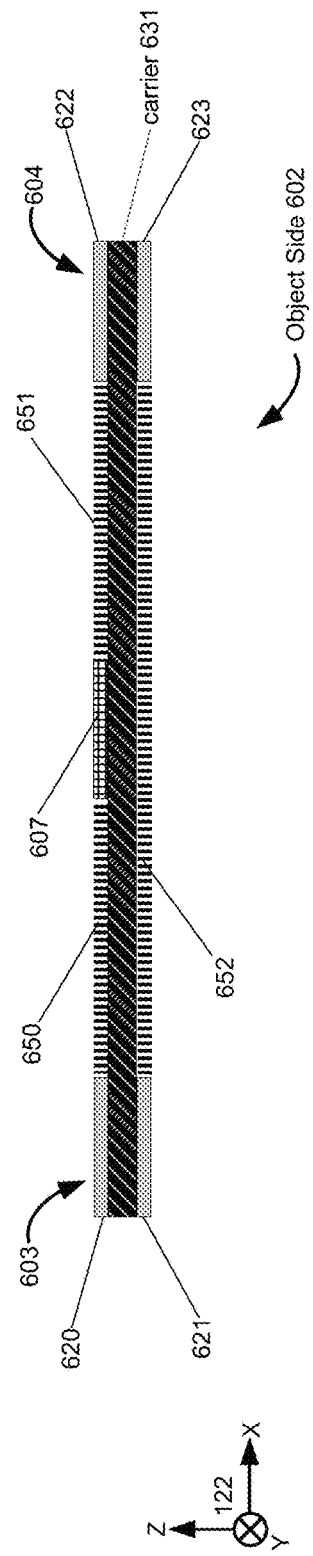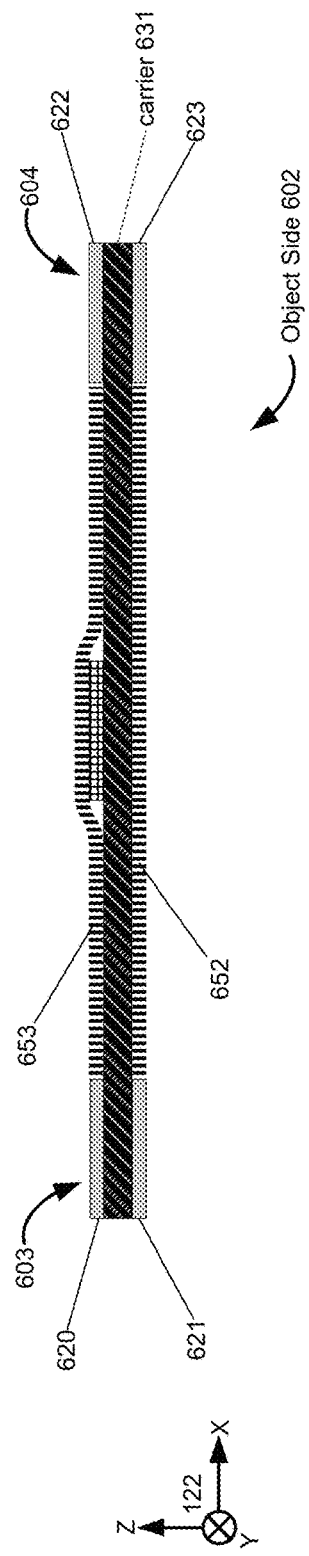

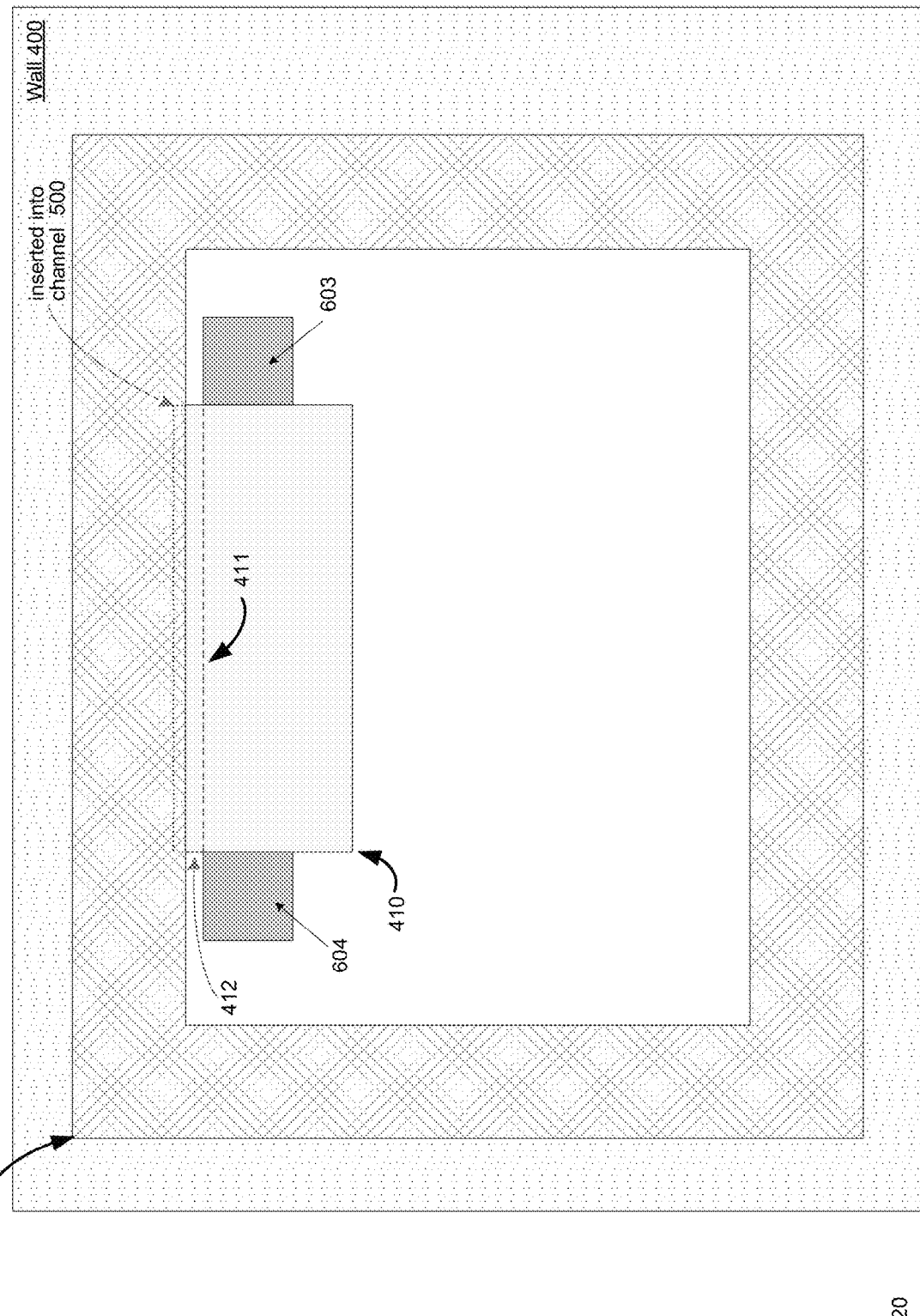
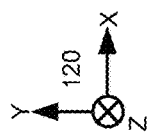
FIGURE 11B

Side View

Test Bench
Side View

FIGURE 13
Legend
| | | |
|---|---|---|
| 1300 |  | adhesive layer |
| 1301 |  | carrier |
| 1302 |  | mechanically-coupling tape |
| 1303 |  | inelastic |
| 1304 |  | tab |
| 1305 |  | picture frame |
| 1306 |  | hybrid carrier |
| 1307 |  | release liner |
| 1308 |  | mounting plate |
| 1309 |  | wall |

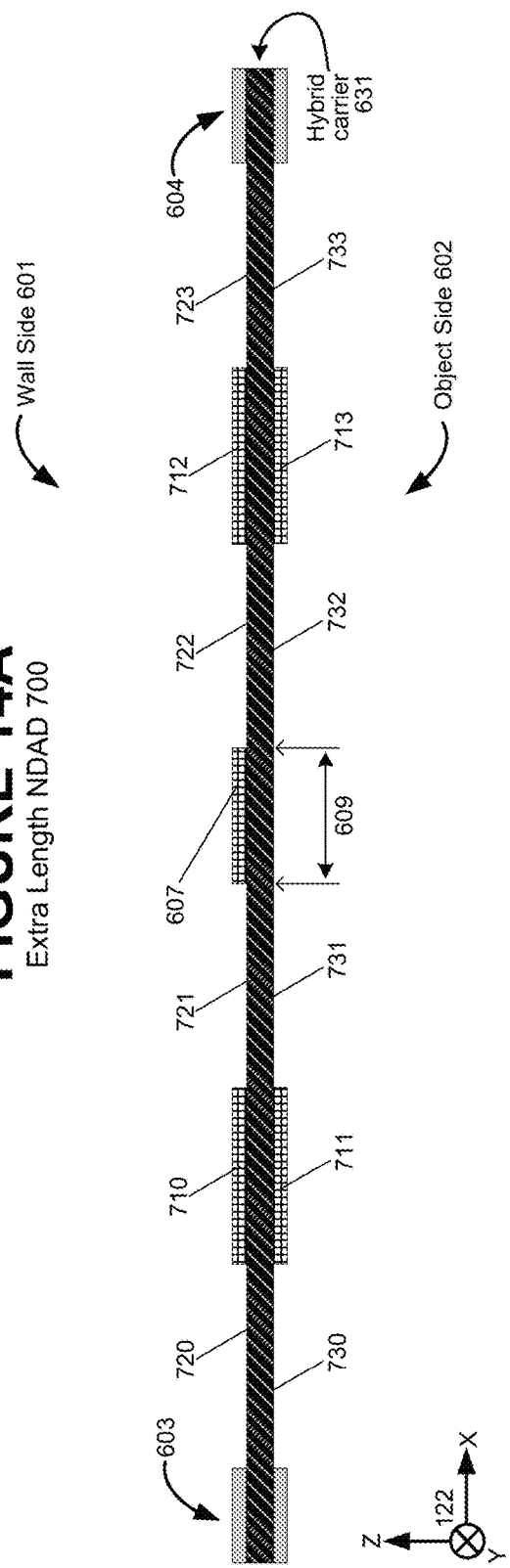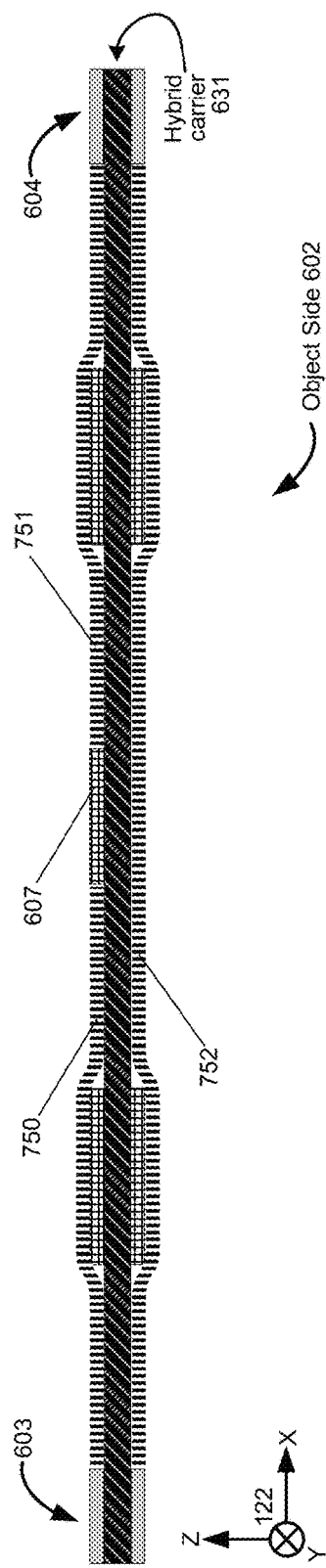

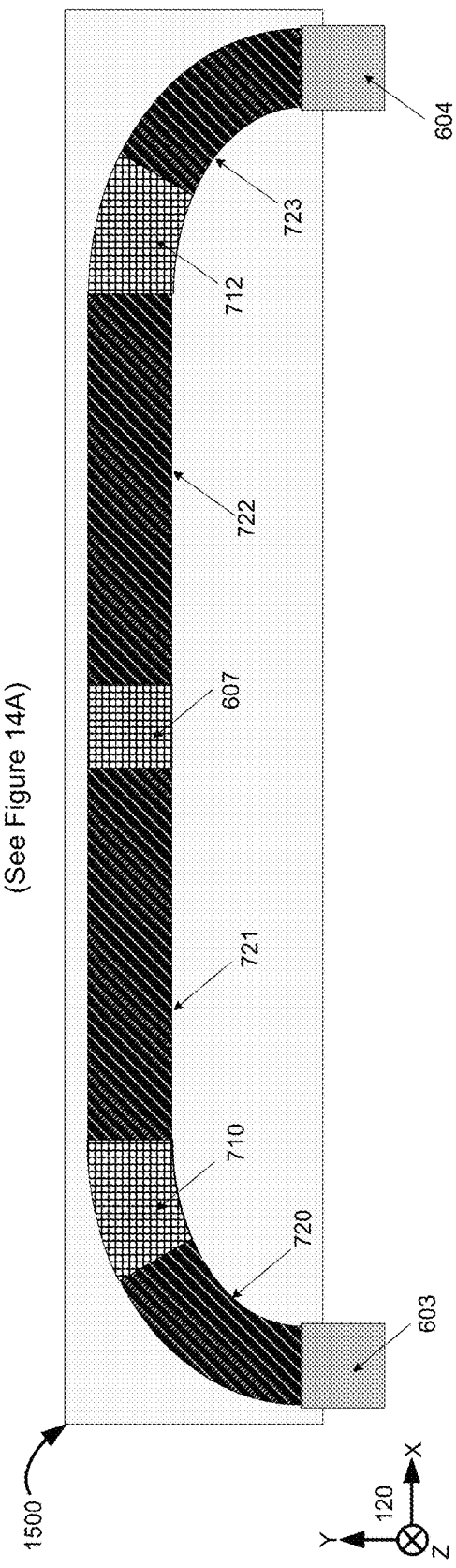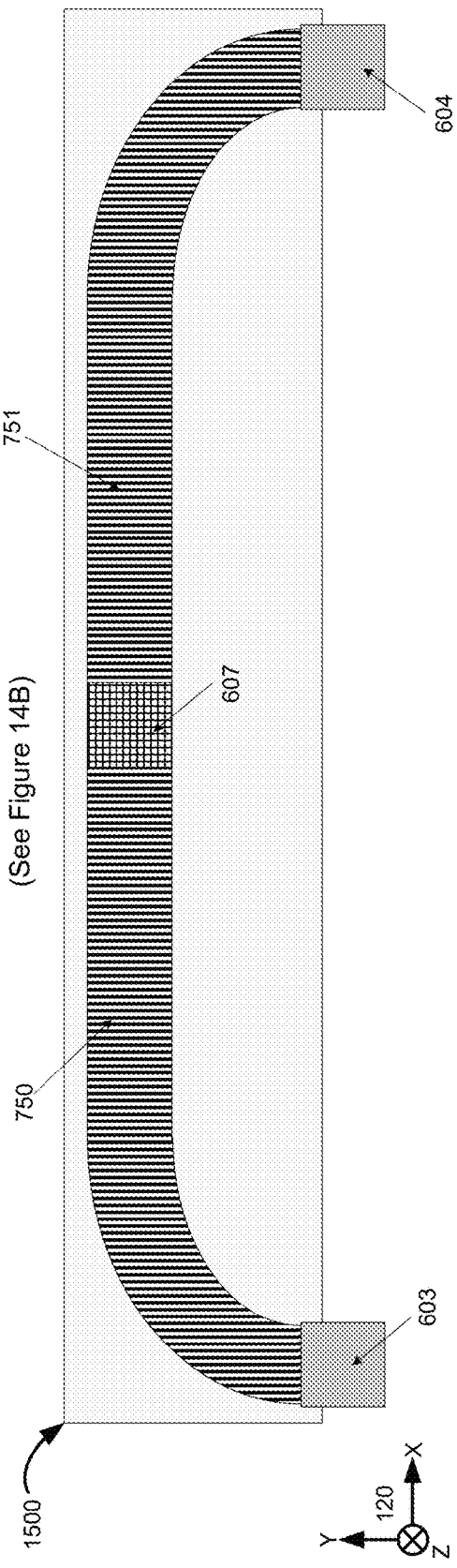

Wall Side 800

Wall Side 800

Wall Side 900

Wall Side 900

Wall Side 1000

Wall Side 1000

Wall Side 1100

Wall Side 1100

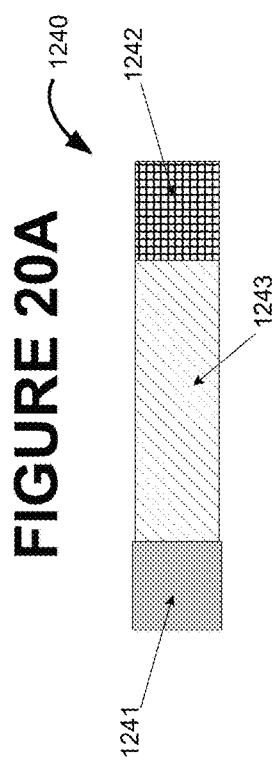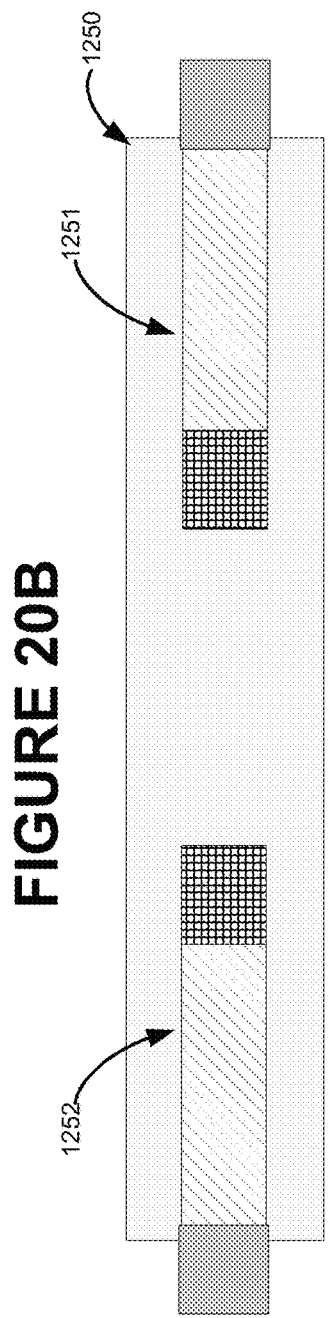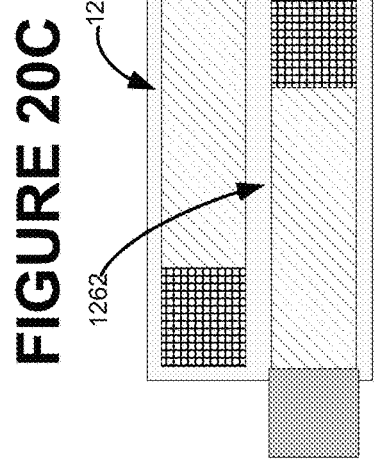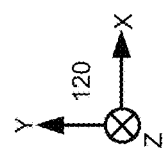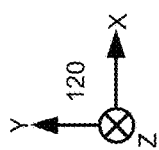

METHODS AND APPARATUS FOR NON-DESTRUCTIVE ADHESIVE DEVICES

This application is a continuation of the following International Application, to which benefit is claimed:

"Methods and Apparatus for Non-Destructive Adhesive Devices," with an International Filing Date of 2022/05/19 (y/m/d), having inventors Jeffery L. Jackson and Jon Tory Jackson and International App. No. PCT/US2022/030135.

International App. No. PCT/US2022/030135 claims priority to, and benefit of, the following U.S. Provisional Patent Applications:

"Methods and Apparatus for Non-Destructive Adhesive Devices," filed 2021 May 19 (y/m/d), having App. No. 63/190,653, and inventors Jeffery L. Jackson and Jon Tory Jackson; and "Methods and Apparatus for Non-Destructive Adhesive Devices," filed 2021 Jun. 1 (y/m/d), having App. No. 63/195,478, and inventors Jeffery L. Jackson and Jon Tory Jackson.

This application herein incorporates by reference, in their entirety, the following applications:

"Methods and Apparatus for Non-Destructive Adhesive Devices," with an International Filing Date of 2022/05/19 (y/m/d), having inventors Jeffery L. Jackson and Jon Tory Jackson and International App. No. PCT/US2022/030135;

"Methods and Apparatus for Non-Destructive Adhesive Devices," filed 2021 May 19 (y/m/d), having App. No. 63/190,653, and inventors Jeffery L. Jackson and Jon Tory Jackson; and "Methods and Apparatus for Non-Destructive Adhesive Devices," filed 2021 Jun. 1 (y/m/d), having App. No. 63/195,478, and inventors Jeffery L. Jackson and Jon Tory Jackson.

TECHNICAL FIELD

The present invention relates generally to adhesive devices and, more particularly, to adhesive devices Intended to achieve a non-destructive removal.

BACKGROUND ART

There is a major and growing need for adhesive devices that, under normal operating conditions, are capable of achieving a non-destructive removal from the surface or surfaces to which it is attached. Herein, we shall refer to such adhesive devices as Non-Destructive Adhesive Devices (or NDAD's).

For example, the 3M Company (St. Paul, Minnesota, USA) produces the "COMMAND" brand of adhesive strips. 3M provides instructions for using Command strips to attach a variety of items to interior walls, including hooks and picture frames.

A first type of Command strip is shown in FIGS. 1A-1C, where it is referred to as an NDAD of type 110 (or NDAD 110). FIGS. 1A-1B have a set of axes 120. When used to attach an item (or object) to a wall, the Y axis generally represents the vertical (the general direction of gravity), and X the horizontal. Between X and Y the planar surface of a typical interior wall surface can be defined. The Z axis represents a depth dimension, such as the depth of any object or objects attached to the interior wall. For example, the Z axis can represent the depth of a Command strip itself, which is shown in FIG. 1C with set of axes 121.

In the figures herein, differing materials are often indicated by a fill pattern (e.g., cross-hatching or dots), grayscale shading, or a combination of both. A legend to the patterns and shading types used herein is presented in FIG. 13.

In FIGS. 1A-1B, an area filled with pattern 1300 of FIG. 13 indicates an exposed surface that is adhesive. In the case of a Command strip, adhesive is applied to a carrier (or substrate), A region where the carrier is not covered by an adhesive (or anything else) is represented by black (i.e., pattern 1301 of FIG. 13). According to published information provided by the 3M Company, the carrier material is described as a polyethylene foam, and the adhesive type is described as rubber. According to additional published information provided by the 3M Company, for such products as polyethylene foam tape, a suitable polyethylene foam is closed cell and cross-linked. Further, a suitable adhesive can be acrylic-based. Regardless of the particular adhesive used, they will all generally be within the category of pressure-sensitive adhesives.

Not shown in FIGS. 1A-1C are the release liners (or, more simply, the liners) that would typically protect adhesive surfaces prior to use, such that an NDAD, like those of type 110, can be conveniently stored. A release liner can be made of a paper (commonly glassine) or plastic sheet, and may be coated with a release agent.

FIG. 1A is the same as FIG. 1B, except NDAD 110 is rotated 180° about the Y axis. FIG. 1A depicts a first major planar surface of NDAD 110, while FIG. 1B depicts a second major planar surface. FIG. 1C represents FIG. 1A after FIG. 1A is rotated 90° (about the Y axis) according to a first direction of rotation. Conversely, FIG. 1C represents FIG. 1B after FIG. 1B is rotated 90° according to a second and opposite direction of rotation.

As can be seen in FIGS. 1A-1B, for both the first and second major planar surfaces, a bottom region of carrier is left uncovered with adhesive, thereby providing a tab 130. At the top of the second major planar surface, of FIG. 1B, there is also a region 131 left uncovered with adhesive.

FIG. 1C depicts the continuous nature of carrier material 140, from which NDAD 110 is constructed. Adhesive layer 141 of FIG. 1C is depicted in FIG. 1A, while adhesive layer 142 of FIG. 1C is depicted in FIG. 1B.

According to 3M Company instructions, printed on the release liner for adhesive layer 141, adhesive layer 141 is for coupling an NDAD 110 to a wall (i.e., the instruction "WALL side" is printed). For this reason, the view of FIG. 1A is labeled wall side 111. Conversely, adhesive layer 142 is for attaching an object to that wall, and is therefore called object side 112.

To remove an NDAD, such as that shown in FIGS. 1A-1C, an end-user grasps tab 130 and pulls it in a downward direction. Polyethylene foam 140 is stretched, starting first with the carrier material closest to the pull tab, and such stretching causes the carrier to assume different relative dimensions. Specifically, stretched carrier material assumes a greater length along the Y axis, and a smaller width along the X dimension. Such dimensional change (also referred to herein as a flow) causes a breaking of the adhesive bond, between an adhesive plane and the wall or object to which it is attached.

The lack of adhesive, at region 131 of object side 112, appears addressed to a long-standing problem during the removal of NDAD's like those of type 110: catapulting of the formerly-attached object towards the hand of the person pulling the tab. Until sufficient adhesive of NDAD 110 is detached from its wall side, carrier 140 will continue to stretch increasingly longer distances, and therefore store increasingly larger amounts of potential energy. At some point, the force generated by the carrier overcomes the remaining adhesion between adhesive area 141 and the wall to which the NDAD 110 is attached. At that point, the potential energy of the carrier is suddenly released, causing NDAD 110 to be catapulted in the direction of the end-user's hand. In addition to NDAD 110 being catapulted, any object still attached to adhesive area 142 is also catapulted towards the end-user. The once-attached object can strike an end-user's hand with additional energy, beyond the elasticity of the carrier, due to its falling in the direction of gravity.

The catapulting problem has been known for a long time. For example, there is U.S. Pat. No. 6,162,534 to Hamerski (hereinafter simply "Hamerski"), filed by the 3M Company in 1998. Hamerski is specifically about adding a "secondary release member" to a "stretch release adhesive strip." The secondary release member serves to prevent an object, attached to a wall with a stretch release adhesive strip, from "catapulting at the end of the stretch removal sequence and further prevents the object from suddenly falling." Hamerski at col. 3, lines 16-20.

With regard to NDAD 110, region 131 appears an attempt to lessen the catapulting problem. During a stretch removal process, assume the portion of adhesive layer 141, opposite region 131, is sufficient to keep an NDAD 110 attached to its wall. Also assume adhesive layers 141 and 142 detach at approximately the same rate. At the point where adhesive region 142 completely de-bonds from its object (because region 131 has been reached), the remaining portion of adhesive layer 141 continues to keep NDAD 110 attached to its wall. In that case, the object, that had been attached to a wall with the NDAD, is subject only to falling towards the end-user's hand. When NDAD 110 releases from its wall sometime later, due to further debonding of adhesive layer 141, the potential energy stored in the carrier serves only to catapult the NDAD itself toward the end-user's hand.

An example use of an NDAD like NDAD 110, shown in 3M Company literature, is with respect to the mounting of a single wall hook. Often, the wall hook is composed of two main parts: a base plate (the item directly attached to a wall with an NDAD 110), and a cover that fits over the base plate. The cover is equipped with the hook.

As illustrated in FIGS. 1A-1C, a Command strip is usually considerably longer along a first dimension (the Y dimension in FIGS. 1A-1C) than a second dimension (the X dimension of FIGS. 1A-1B). For example, Command strips appear to be, in general, in a range of 2× to 10× longer, along the first dimension than the second dimension. Further, in general, 3M Company literature encourages orientation of a Command strip such that its longer dimension is parallel to the direction of gravity (also known as the longer dimension being along the vertical), as is shown in FIGS. 1A-1C.

FIGS. 1D-E are used to depict 3M Company dimensions for their large-size Command strip. These dimensions are as follows:

131 (reduction of adhesive length on object side): 0.51 cm
132 (longest dimension including tab): 9.27 cm
133 (longest dimension of adhesive on wall side): 7.36 cm
134 (width of strip): 1.90 cm
135 (length of adhesive on object side): 6.85 cm An important potential application, for an NDAD of type 110, would be the hanging of picture frames. However, due to geometric and aesthetic constraints, it is difficult to utilize an NDAD of type 110 for this application without adding some kind of mechanical coupling.

The 3M Company has developed another variety of NDAD, shown as NDAD 210 in FIGS. 2A-2C. NDAD 210 appears to have been developed for the hanging of picture frames. Side 211 of NDAD 210, as shown in FIG. 2A, is the same as side 111 of FIG. 1A. Side 212 of NDAD 210, as shown in FIG. 26, corresponds to side 112 of FIG. 16. Side 212 differs mainly from side 112 as follows: over its layer of pressure-sensitive adhesive, side 212 is covered with a mechanically-coupling tape that is functionally similar to VELCRO. Rather than Velcro, however, Command seems to use a 3M Company coupling approach called "Dual Lock." Mechanically-coupling tape is represented by dot pattern 1302 of FIG. 13.

FIG. 2C depicts a carrier 240 that can be comprised of the same material as carrier 140 of FIG. 1C. Similarly, adhesive layers 241 and 242, of FIG. 2C, can be comprised of the same adhesive utilized for, respectively, layers 141 and 142 of FIG. 1C. However, rather than using layer 242 to couple directly to an object, layer 242 attaches to a layer 243 of mechanically-coupling tape. In addition to side 212 differing from side 112 because of side 212's coverage with mechanically-coupling tape, side 212 also lacks a region like region 131 of side 112. In other words, other than an uncovered portion of carrier 240 to create a pull tab 230, side 212 is completely covered with adhesive layer 242 followed by mechanically-coupling tape 243, FIGS. 3A and 3B illustrate how NDADs of type 210 can be used, in accordance with 3M Company instructions, to attach a picture frame to a wall.

In particular, FIG. 3A depicts a back view of a picture frame 300. Herein, an area representative of a picture frame (such as a frame 300) is filled with cross-hatching pattern 1305 of FIG. 13. As can be seen in FIG. 3A, four NDADs, each of type 210, are attached to the back of frame 300. The four NDADs are numbered 301-304. Each is attached to frame 300 with its pressure-sensitive adhesive layer 241, and each has its layer 243, of mechanically-coupling tape, facing towards the viewer (of FIG. 3A) in the Z dimension, FIG. 3B depicts a side view of frame 300 of FIG. 3A, and also depicts a side view of a wall 400 to which the frame is to be attached. Herein, an area representative of a wall (such as wall 400) is filled with dot pattern 1309 of FIG. 13. For purposes of simplicity of explanation, and without loss of generality, FIG. 3B does not include a side view of NDAD 303 of FIG. 3A. FIG. 3B depicts NDAD 301 as not yet attached to frame 300, but having its adhesive surface 241 facing towards the back of frame 300 (the front of frame 300 indicated as 520). Introduced in FIG. 3B is an NDAD 321 intended for mechanical coupling to NDAD 301. NDAD 321 is intended for attachment to wall 400 by its adhesive surface 241. NDADs 301 and 321 are depicted as having their mechanically-coupling tape surfaces (each labeled 243) facing each other. Typically, the sequence for attaching a frame 300 to a wall 400, with NDADs 301 and 321, may be outlined as follows:

NDAD 301 is attached to frame 300 with adhesive layer 241.

NDAD 321 is attached to NDAD 301 by pressing their respective mechanically-coupling tape surfaces 243 into contact with each other.

Frame 300, with NDADs 301 and 321 already attached, is pressed into attachment with wall 400 by adhesive layer 241 of NDAD 321.

Above are just the three major steps, of picture frame to wall attachment. 3M Company instructions for picture frame hanging are complex, and include seven distinct steps.

To remove frame 300 from wall 400, the recommended procedure is to grasp the bottom of frame 300 (indicated as region 511 in FIG. 3B). The bottom of frame 300 is then pulled upwards such that frame 300, as a whole, tends to rotate about its upper part (indicated as region 510 in FIG.

36). In general, the coupling, between the mechanically-coupling tape layers 243 (of NDADs 301 and 321), is expected to be weaker than the adhesive coupling of either NDAD 301 to frame 300 or of NDAD 321 to wall 400. Thus, after picture frame 300 is removed from wall 400, NDAD 301 remains attached to frame 300, and NDAD 321 remains attached to wall 400. Either of these NDADs is removed by pulling downwards on its tab 230. The downward stretching of carrier 240 causes adhesive layer 241 to de-bond from the surface to which it had been attached (for example, in the case of NDAD 301, adhesive layer 241 de-bonds from frame 300, while NDAD 321 de-bonds from wall 400). Similarly, the downward stretching of carrier 240 causes adhesive layer 242 to detach from mechanically-coupling tape layer 243.

Another approach to the hanging of picture frames with an NDAD of type 110 is described in U.S. Pat. No. 10,051,982 to Jackson (also referred to herein as "the '982 patent"). U.S. Pat. No. 10,051,982 to Jackson is herein incorporated by reference in its entirety.

An overview of the '982 patent approach is shown in FIG. 4A. The mechanical coupling of the '982 patent is accomplished with a rectangular mounting plate 410, the main body of which has length 420 and width 421. In addition, the mounting plate has an upper edge that has been narrowed, along a notch line 411, to provide a rail 412. Rail 412 has length 422. FIG. 4A depicts a front view of how mounting plate 410 can be used to hang a picture frame 301. The upper portion of frame 301 is equipped with a notch or slot (not shown in FIG. 4A) into which rail 412 can fit.

While not visible in FIG. 4A, FIG. 5A depicts a side view of frame 301, in which a slot 500 can be seen at its wall-facing side. The front of frame 301 is indicated as 520. Mounting plate 410 is shown as having a main body thickness 423, with rail 412 having a lesser thickness 424. As can be seen, rail 412 is oriented towards the leftward side of mounting plate thickness 423. Along the X dimension (as indicated by axes 121), this cross-section creates a channel 413, facing upwards and towards wall 400. It is for this reason that notch line 411 is depicted with dashes in FIG. 4A, to indicate the notch is not visible from the front view. FIG. 5A also depicts an NDAD 430, of type 110, serving as an adhesive coupler between mounting plate 410 and wall 400.

Typical dimensions for mounting plate 410 are as follows:
420 (length: along X axis for FIG. 4A): 100 cm
421 (main body width; along Y axis for FIG. 4A): 70 mm
422 (length of rail; along Y axis for FIG. 4A): 6 Mm
423 (main body thickness; along Z axis for FIG. 5A): 3 mm
424 (rail thickness; along Z axis for FIG. 5A): 1 mm FIG. 4B depicts a back (or wall side) view of just mounting plate 410, where two NDAD's, of type 110, are attached. The two NDAD's are labeled 430 and 431. Since FIG. 4B depicts a back view of mounting plate 410, notch line 411 is depicted as a solid line, to indicate the notch is visible from this view.

When using a mounting plate 410 of the just-above typical dimensions, NDAD's 430 and 431 can each be a large-size 3M Company Command strip, with dimensions listed above.

FIG. 4C depicts, from a front view, another potential variety of mounting plate 410. Specifically, mounting plate 410 of FIG. 4C includes a slot 440. Slot 440 provides a location where modular accessories, helpful to the picture-frame-hanging process, can be temporarily attached to the mounting plate. For example, a level-measuring device can be packaged as a module (not shown) that can be slid into slot 440. An example dimension of slot 440, along the Y axis, can be 12 mm. The walls of slot 440 can be grooved, and a module for the slot can be shaped to fit into the grooves.

FIG. 4D depicts an additional front view, of a mounting plate 410 and a frame 301. Specifically, FIG. 4D depicts a front view of mounting plate 410 with NDAD's 430 and 431 attached. Since the NDAD's are attached to the wall-facing side of the mounting plate, only their pull tabs are visible. Further, FIG. 4D depicts rail 412 as inserted into slot (or channel) 500 of frame 301. The portion of the rail 412 inserted into slot 500 is depicted with dashes, to indicate its lack of visibility from the front view.

FIG. 5B is the same side view shown in FIG. 5A, except frame 302 differs from frame 301 by its inclusion of a front-side "lip" 501. In general, actual frames can be expected to include a front-lip 501, but frame type 301 of FIG. 5A is included for purposes of clarity of explanation. For example, frame 301 permits the insertion of rail 412, into channel 500, to be viewed more clearly in FIG. 4D.

FIG. 5C re-depicts the frame type 300, first introduced above in connection with FIGS. 3A-3B, that lacks a channel 500. FIG. 5C depicts how the lack of a channel, as an integral part of the frame itself, can be addressed by attaching an adapter 560 to the back (or wall-facing) side of frame 300. Specifically, adapter 560 can be an aluminum extrusion, with a cross-section as shown. Along the length of the extrusion (along the X dimension as indicated by axes 121 of FIG. 5C) the cross-section causes adapter 560 to have a surface 561. Along surface 561 an adhesive can be applied (such as through double-sided tape) for attachment of adapter 560 to the back of a frame 300. FIG. 5D is the same as FIG. 5C, except adapter 560 is shown as attached to frame 300. As can be seen, once the adapter has been attached to the frame, it provides a channel 562 with which rail 412 can engage.

As can be appreciated, the approach of the '982 patent has advantages over other picture-hanging systems, such as the use of NDAD's of type 210. However, the '982 patent approach still has the above-discussed catapulting problem.

For an NDAD of type 210, the danger to the end-user from catapulting is reduced, but the complexity of picture frame attachment and detachment is high.

It would therefore be desirable to develop new types of NDADs, that have at least one or both of the following advantages: pose less risk of injury, and require simpler procedures for attachment or detachment.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 1A-1C depict a first type of Command strip.

FIGS. 2A-2C depict another variety of NDAD (NDAD 210) developed by the 3M Company.

FIGS. 3A and 3B illustrate how NDADs of type 210 can be used, in accordance with 3M Company instructions, to attach a picture frame to a wall.

FIG. 4D depicts an additional front view, of a mounting plate 410 and a frame 301.

FIG. 5D is the same as FIG. 5C, except adapter 560 is shown as attached to frame 300.

FIGS. 6A-68 introduce a new type of NDAD, labeled NDAD 600, that is superior to previous NDAD's for many applications.

FIGS. 6C-D depict an example set of dimensions for an NDAD 600.

FIGS. 6E-6H depict further potential dimensions of an inventive NDAD.

FIGS. 7A-78 depict a side view, of a mounting plate 410, NDAD 600, and wall 400 assembly.

FIG. 8A depicts a rotation of NDAD 600 by 90°, around an axis 612 and in a direction 613.

FIG. 8B depicts another potential structure 641, for an NDAD of type 600, based upon a single continuous length of a hybrid carrier.

FIGS. 9A-9B depict the same NDAD structure 641, as shown in FIG. 8B, except release liners have been added.

FIG. 11B depicts a picture frame 301 hung by placing it over the rail 412 of FIG. 11A.

FIG. 13 is a legend to the patterns and shading types used herein in the figures.

FIG. 14A depicts a hybrid-carrier based NDAD 700, assumed to be capable of attaching an object with a maximum dimension of 20.0 cm, or more.

FIG. 14B depicts how three segments of release liner can be used: 750, 751, and 752.

FIG. 15A depicts an example object 1500 attached to NDAD 700.

FIG. 15B depicts the previously-discussed strategy of FIG. 9A, now relative to an NDAD 700.

FIGS. 20A-G show a tab (e.g., 1241), an elastic area (e.g., 1243), and an inelastic area (e.g., 1242) approximately in-line with each other.

MODE(S) FOR CARRYING OUT THE INVENTION

Reference will now be made in detail to various embodiments of the invention, examples of which are illustrated in the accompanying drawings. Wherever possible, the same reference numbers will be used throughout the drawings to refer to the same or like parts.

Please Refer to the Section Titled "Glossary of Selected Terms," for the definition of selected terms used below.

TABLE OF CONTENTS TO DETAILED DESCRIPTION

1 Introduction
2 Further Structure
   2.1 Visual Feedback During Debonding
   2.2 Release Liners, and Peelable Tabs
   2.3 Nonlinear Structure
3 Forces Analysis
   3.1 Analysis
   3.2 Experimental Data
4 Additional Variations
   4.1 Attaching Extra-Length Objects
   4.2 Further Nonlinear Structures
5 Glossary of Selected Terms

1 INTRODUCTION

FIGS. 6A-6B introduce a new type of NDAD, labeled NDAD 600, that is superior to previous NDAD's for many applications. For example, a mounting plate 410 is discussed above in the Background section, in conjunction with FIGS. 4A-4D and FIGS. 5A-5O, NDAD 600 provides superior performance in this type of situation, when compared with the above-discussed use of Command-type strips (e.g., Command-type strips as illustrated in FIGS. 1A-1C).

Figure 1E:
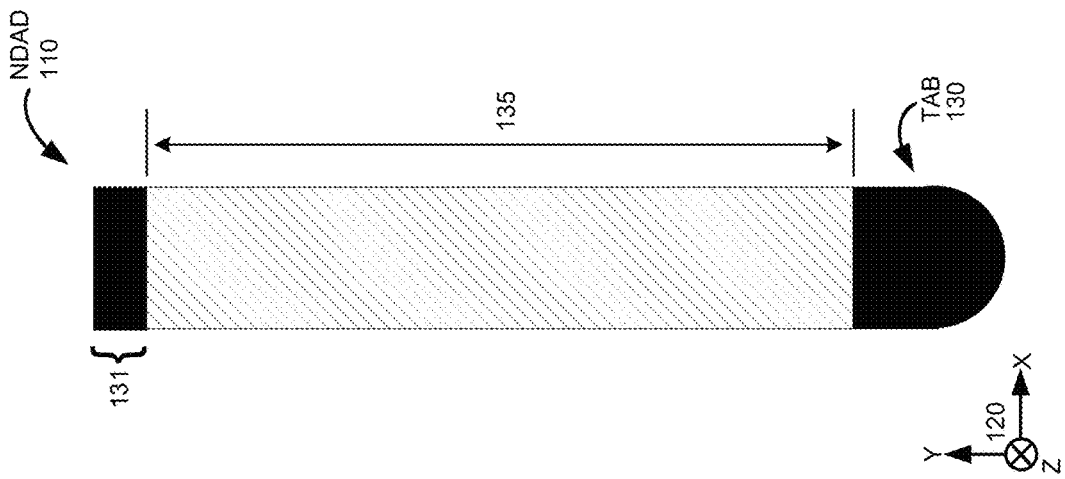
FIGS. 1D-E depict 3M Company dimensions for their large-size Command strip.
Figure 1D:
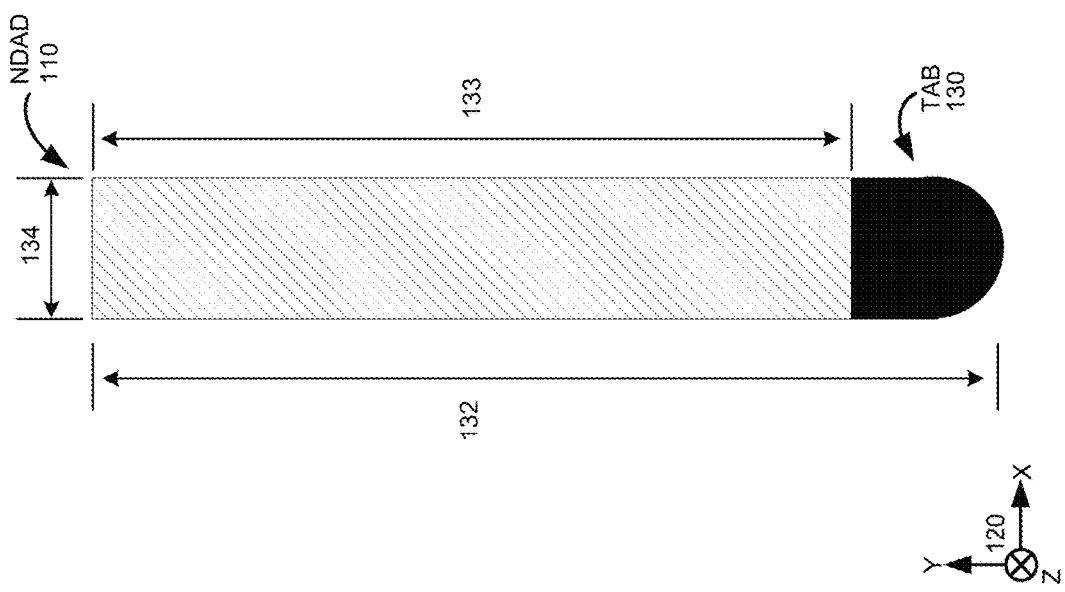

FIG. 1A (a wall side view) can be corresponded with FIG. 6A, and FIG. 1B (an object-side view) can be corresponded with FIG. 6B. As can be seen, FIGS. 1A-1B share a same set of axes 120 with FIGS. 6A-6B. Therefore, in contrast to 3M Company literature, that encourages orientation of a Command-strip such that its longer dimension is parallel to gravity, inventive NDAD 600 is generally best utilized when its longer dimension is perpendicular to gravity (i.e., along the X axis horizontal).

When proceeding along the X axis, from left to right, the wall side components of NDAD 600 (i.e., the components visible in FIG. 6A) are as follows:

- A tab 603 that can be corresponded, in terms of general functionality, to tab 130 of FIG. 1A. Grayscale level 1304 of FIG. 13 is used to indicate regions with tab functionality.
- An adhesive region 605 that can be corresponded, in terms of general functionality, to the adhesive region visible in FIG. 1A.
- An inelastic and nonadhesive region 607. The functionality of region 607 is indicated by crosshatching pattern 1303 of FIG. 13. The inelastic material is inelastic along the X and Y dimensions, but is generally highly deformable along the Z axis.
- An adhesive region 606 that, like adhesive region 605, can be corresponded to the adhesive region visible in FIG. 1A.
- A tab 604 that, like tab 603, can be corresponded to tab 130 of FIG. 1A.

FIG. 6B depicts the side of NORD 600 that is typically used for adhesive coupling to an object, such as the previously-discussed mounting plate 410 (of FIGS. 4A-40 and FIGS. 5A-5D). FIG. 6B depicts a view where the NDAD of FIG. 6A is rotated 180° about the Y axis. As can be seen, the main difference between FIG. 6A (also known as wall side 601) and FIG. 6B (also known as object or mounting plate side 602) is the lack of visibly-present inelastic region 607, on the object side. Therefore, the object side of an NDAD 600 (between tabs 603 and 604) has a continuous adhesive area 608. The portion of adhesive area 608, in line with inelastic region 607 of wall side 601, is indicated as region 609 in FIG. 6B. While region 609 differs from region 607 by its being covered with adhesive, it is important to note that region 609 still has the same inelastic (along the X and Y) and deformable (in the Z dimension) properties of region 607.

As pictured in FIGS. 6A-6B, NDAD 600 is of a generally (or approximately) linear structure, between its two tabs 603 and 604. However, as will be discussed later, this linearity need not always be the case. Also, as pictured in FIGS. 6A-6B, NDAD 600 is of a generally (or approximately) symmetric structure, about its inelastic region. The inelastic region is placed at an approximate midpoint, between tabs 603 and 604.

Figure 4A:
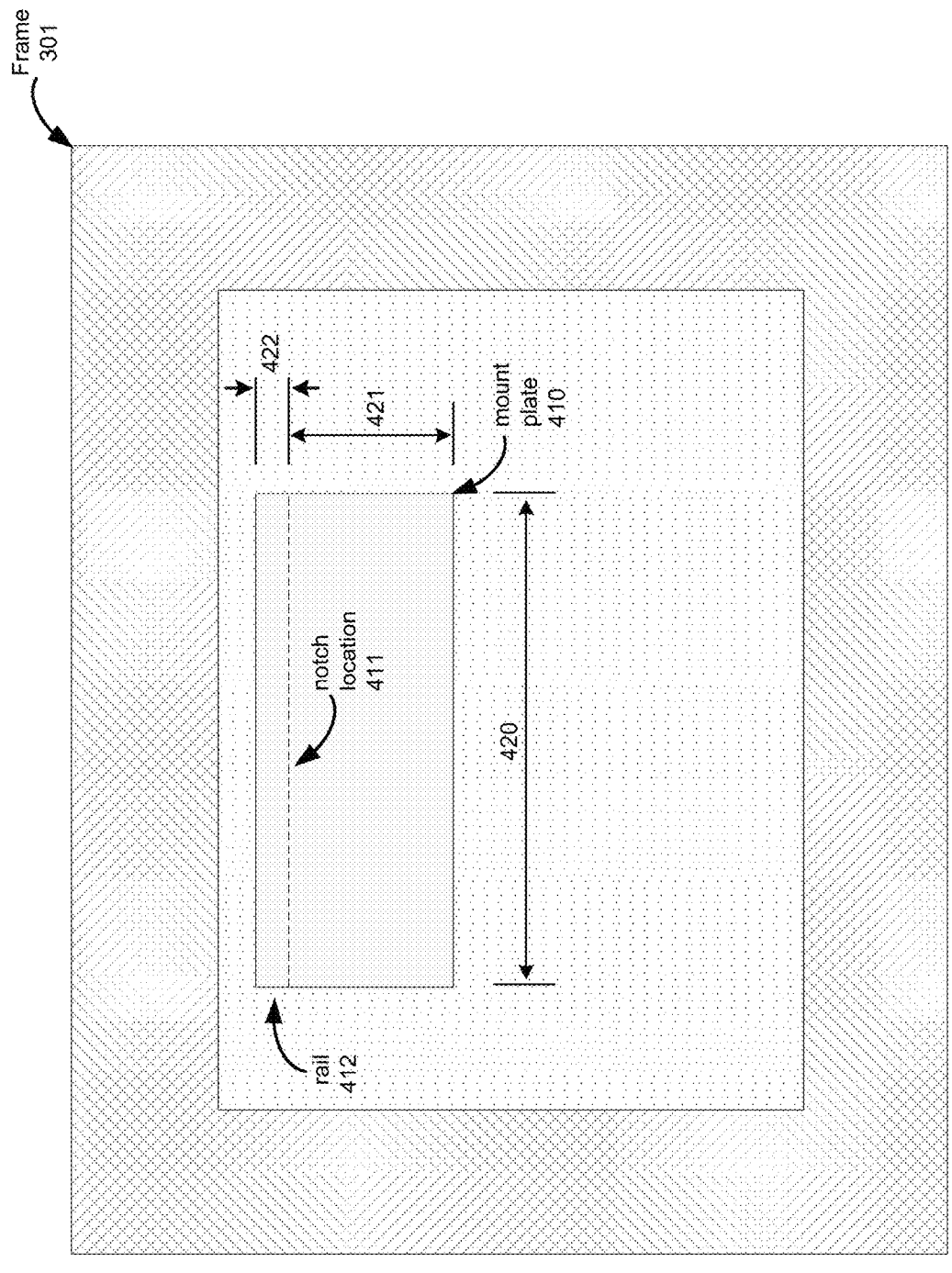
FIG. 4A depicts a front view of how a mounting plate 410 can be used to hang a picture frame 301.
Figure 4B:
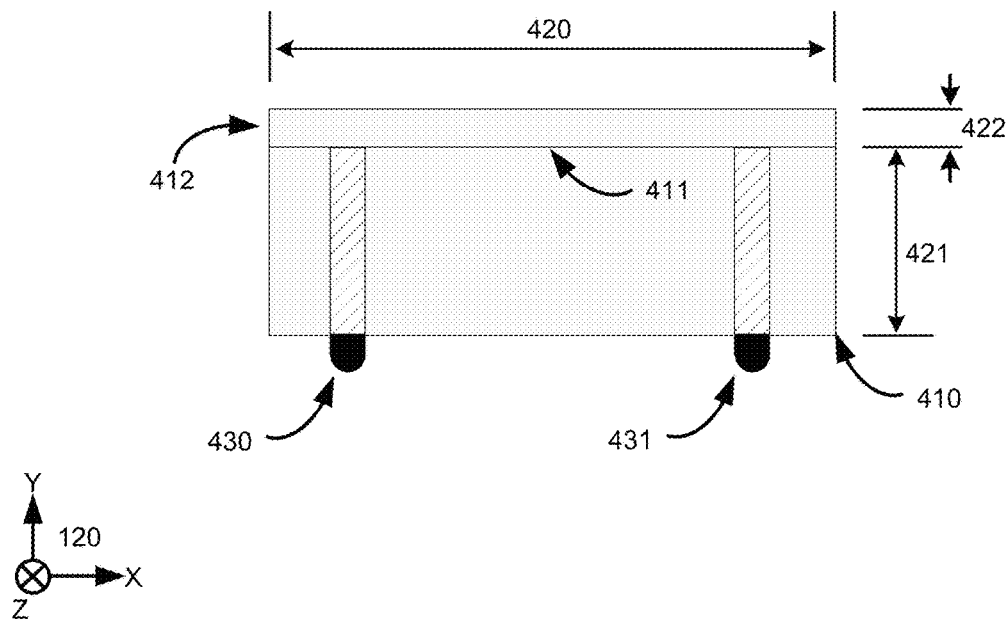
FIG. 4B depicts a back (or wall side) view of just mounting plate 410, where two NDAD's, of type 110, are attached.
Figure 4C:
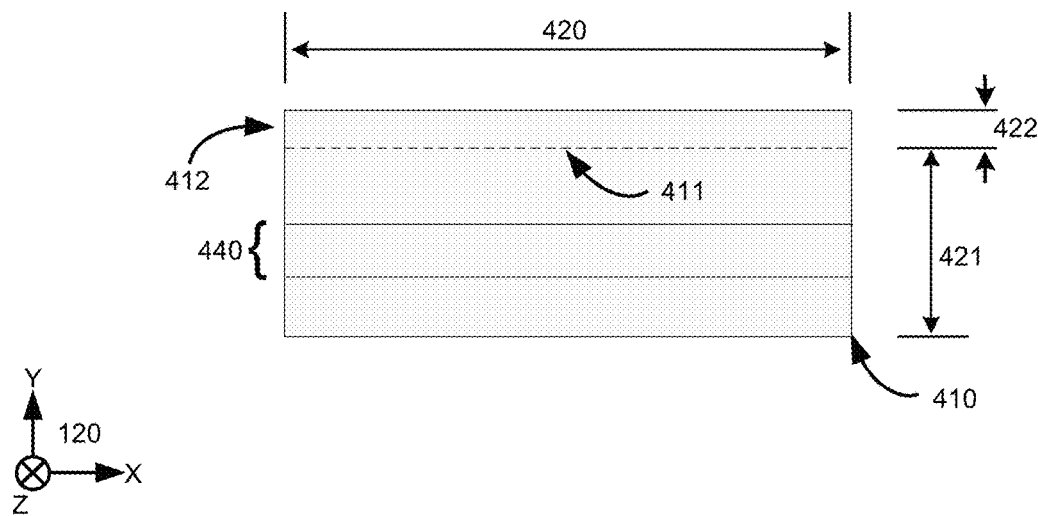
FIG. 4C depicts, from a front view, another potential variety of mounting plate 410.
Figure 5A:
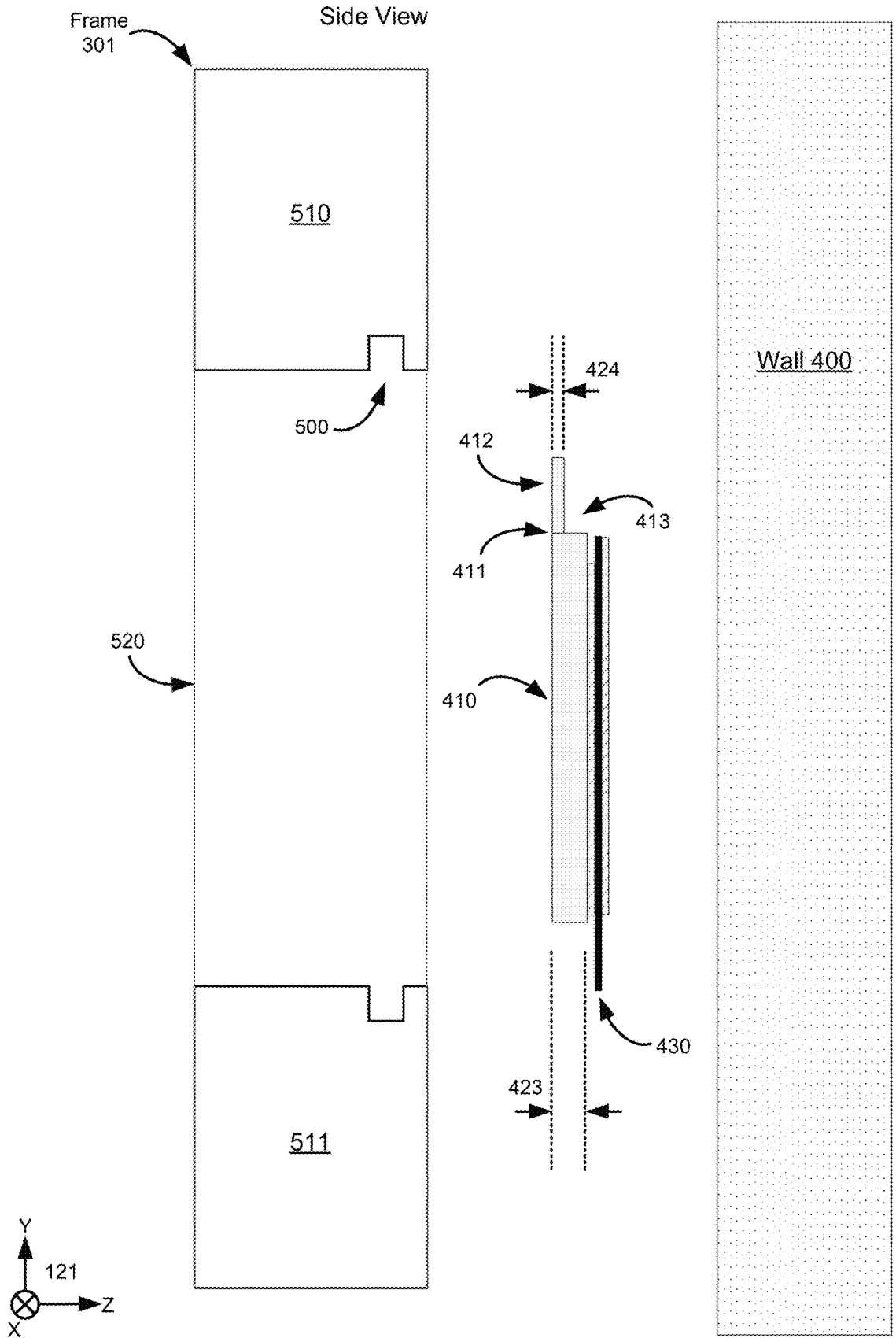
FIG. 5A also depicts an NDAD 430, of type 110, serving as an adhesive coupler between a mounting plate 410 and wall 400.
Figure 5B:
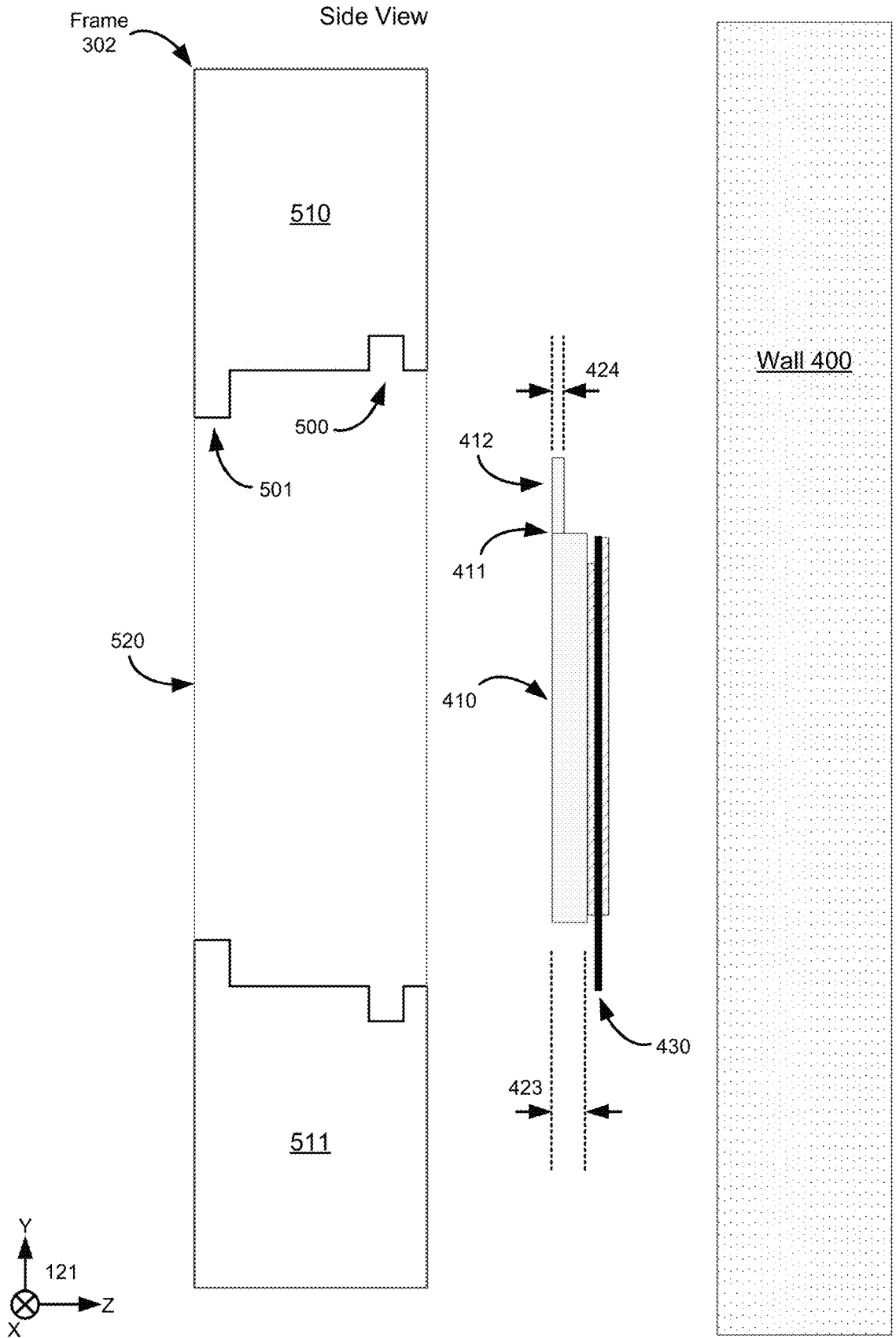
FIG. 5B is the same side view shown in FIG. 5A, except frame 302 differs from frame 301 by its inclusion of a front-side "lip" 501.
Figure 5C:
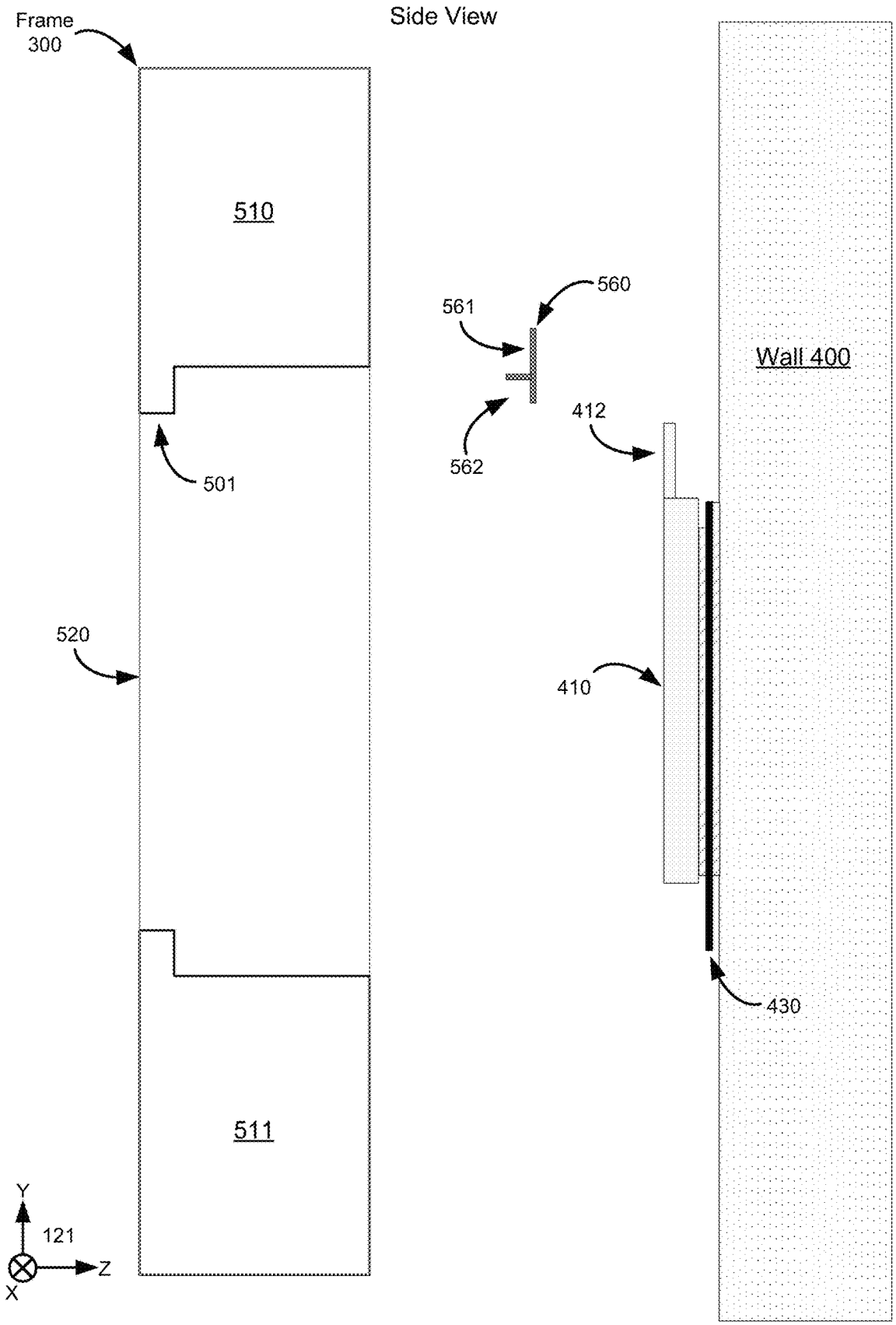
FIG. 5C re-depicts the frame type 300, introduced in connection with FIGS. 3A-3B, that lacks a channel 500.

In the above Background section, an example set of dimensions for a mounting plate 410 are discussed, in conjunction with FIGS. 4A and 5A. An example set of dimensions for an NDAD 600, that could be suitable for use with the Background mounting plate 410, are as follows (following are presented in conjunction with FIGS. 6C-D):

- 620 (length of NDAD 600, excepting tabs 603 and 604): Can be 100 mm to match dimension 420 of mounting plate 410 as depicted in FIG. 4A.
- 621 (width of NDAD 600): 2.0 cm
- 623, 624 (length of each tab, along X axis): 2.0 cm
- 622 (length, along X axis, of inelastic region): 1.5 cm
- 609 (in line with inelastic region 622): 1.5 cm FIG. 6D shows the same dimensions of FIG. 6C apply on the object side of NDAD 600. The only difference being that length 620 in FIG. 6D is entirely adhesive, but region 609 of the adhesive plane is inelastic (because it corresponds to 622).

More detailed structures for implementing an NDAD 600 are discussed herein, which are believed to reflect manufacturing capabilities that are currently cost-effective. However, an NDAD of type 600 is meant to embrace any manufacturing approach which results in a sequence of regions (linear or otherwise) with the functionality illustrated in FIGS. 6A-6B. Further, example materials are also discussed herein, which are believed to reflect: currently-available options for materials, material choices that are cost-effective, or combination of both. However, an NDAD of type 600 is meant to embrace any choice of materials which results in a sequence of regions (linear or otherwise) with the functionality illustrated in FIGS. 6A-6B.

FIG. 6A also includes supplemental rotation axes 610 and 612. Rotation axis 610 is paired with rotation direction 611, while rotation axis 612 is paired with rotation direction 613. A rotation of NDAD 600 by 90°, around axis 612 and in direction 613, produces the side view of NDAD 600 as shown in FIG. 8A. A side view of the type shown in FIG. 8A is believed to be particularly effective for illustrating more detailed structures for implementing an NDAD 600. A rotation of NDAD 600 by 90°, around axis 610 and in direction 611 produces the end view (a tab-end view) of NDAD 600 as shown in FIG. 7A. (In FIG. 7A, the Z axis depth of tab 603 is visible.)

More detailed discussion of example Z axis depths for an NDAD of type 600, are discussed below (e.g., Section 2, "Further Structure"). However, in general, one can expect the Z axis thickness of an NDAD 600 to range from approximately 0.2 mm up to approximately 2.0 mm. Within this range, a particular thickness is decided by such issues as the materials to be attached, their texture (e.g., a painted wall, to which an object is to be attached, may be textured), and the weight of the object (e.g., of a picture frame or shelf) attached.

Figure 10A:
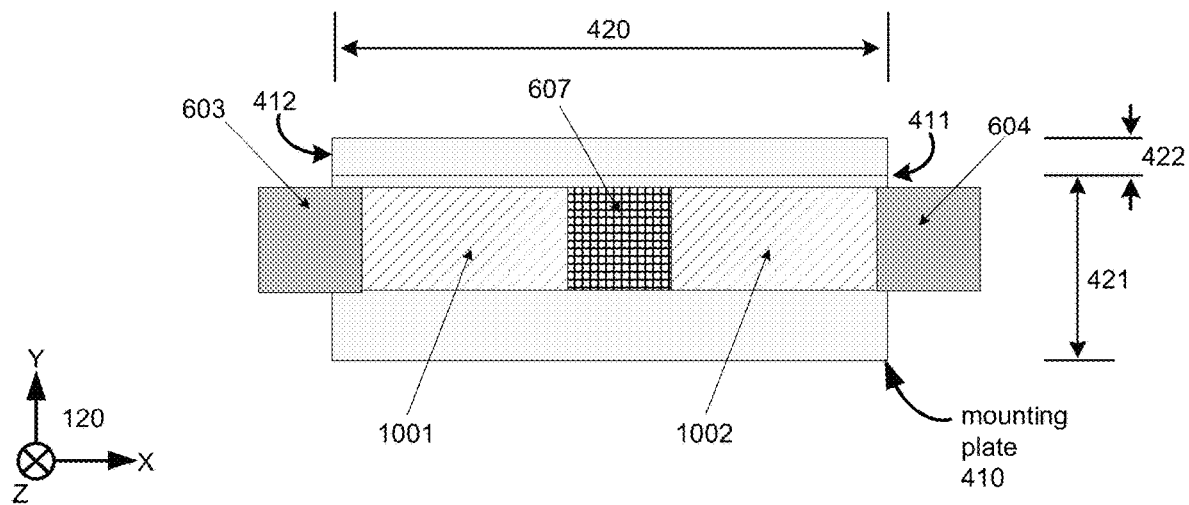
FIG. 10A depicts an example attachment, of an NDAD of type 600 to a mounting plate 410.

An example attachment, of an NDAD of type 600 to a mounting plate 410, is depicted in FIG. 10A. As can be seen, side 602 of NDAD 600 is in adhesive contact with a mounting plate, while side 601 of NDAD 600 faces the viewer. Because FIG. 10A depicts the wall-facing side of a mounting plate, its notch line 411 is depicted as a solid line, to indicate the notch is visible from this view. Rotating the NDAD-and-mounting-plate combination of FIG. 10A by 180° about the Y axis, and pressing side 601 of NDAD 600 into contact with a wall 400, results in an attachment as shown (in front view form) in FIG. 11A. A side view, of a mounting plate 410, NDAD 600, and wall 400 assembly, is shown in FIGS. 7A-7B. FIG. 7A depicts the three components before they are pressed into adhesive contact with each other as a result of NDAD 600, while FIG. 7B shows the three components after adhesive contact has been achieved.

A picture frame 301 can be hung by placing it over rail 412, resulting in the configuration of FIG. 11B. FIG. 11B can be compared with the use of prior art NDAD's of type 110, as discussed above in the Background section and shown in FIG. 4D.

It will be observed from FIG. 10A that NDAD 600 is placed as close as possible to the topmost edge of mounting plate 410. Specifically, it can be seen that the topmost edge of NDAD 600 is placed as close as possible to notch line 411. This is in accordance with the analysis of forces, and experimental data, presented below in Section 3 ("Forces Analysis"). In general, the strength with which an NDAD can hold an object against a wall is optimized by locating as much as possible, of the NDAD's adhesive area, as close as possible to the object's topmost edge. As can be seen, at least for the case of the object being a rectangular mounting plate, an NDAD of type 600 satisfies the optimization.

Figure 11A:
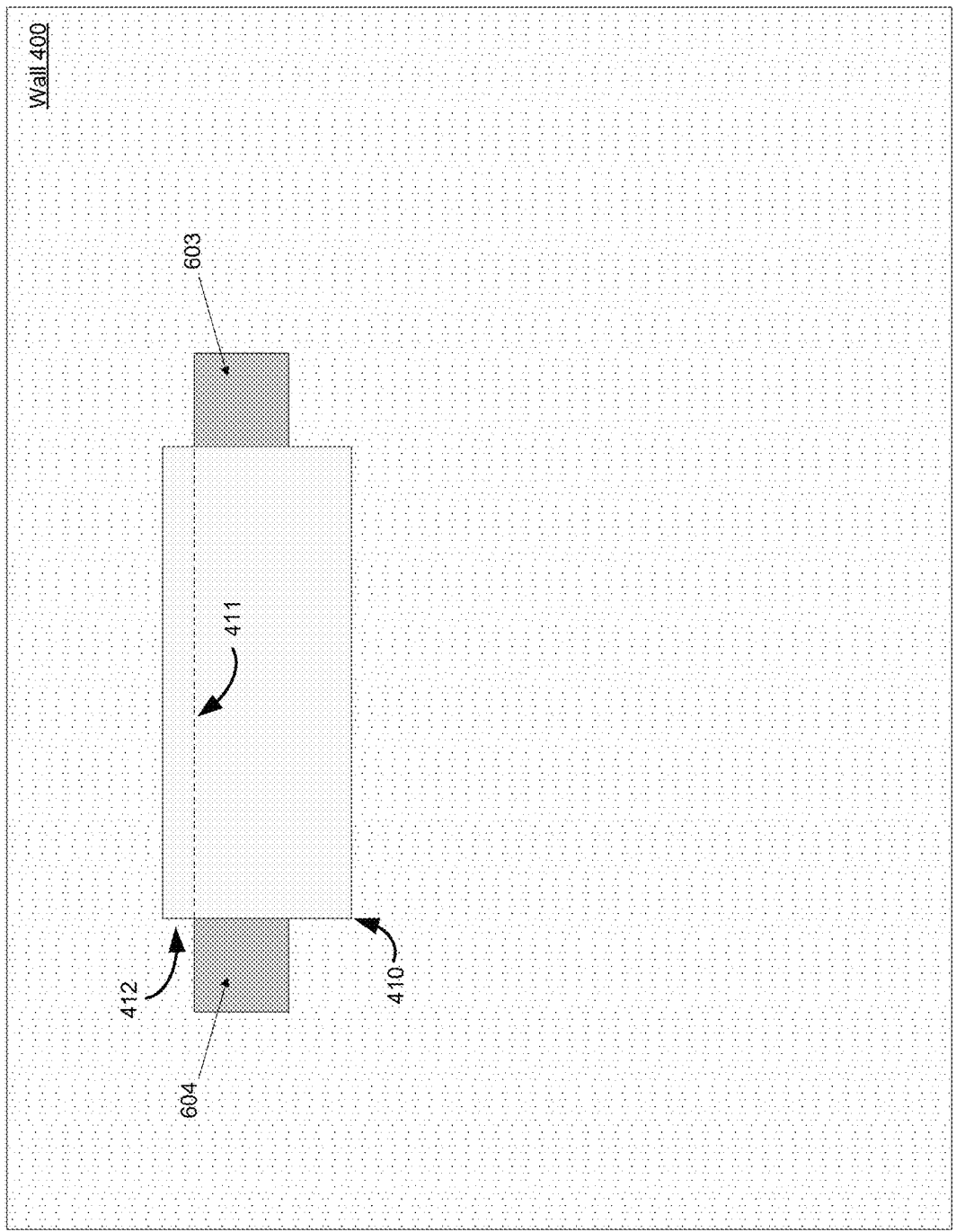
FIG. 11A depicts rotating the NDAD-and-mounting-plate combination of FIG. 10A by 180° about the Y axis, and pressing side 601 of NDAD 600 into contact with a wall 400.

When initially placing the mounting-plate-and-NDAD combination into contact with wall 400, resulting in FIG. 11A, it will be observed that tabs 603 and 604 can provide an end-user with convenient handles. Their advantages as handles include the following (where the following advantages apply after an NDAD 600 is attached to a mounting plate, but before such NDAD-and-mounting-plate combination is attached to a wall):

- If tabs 603 and 604 are directly opposite each other (or at least approximately opposite), and form an axis perpendicular to gravity, the mounting plate can hang with stability from its attachment to adhesive region 608 of NDAD 600.
- Grasping the left tab (e.g., tab 604 in FIG. 11A) with the left hand and the right tab (e.g., tab 603 in FIG. 11A) with the right hand centers the suspended mounting plate within the end-user's field of view, while preventing the end-user's hands from blocking that field-of-view.
- While grasping the tabs, the end user can place his or her hands in close contact with wall 400, while still keeping the NDAD's adhesive regions 605 and 606 from contacting wall 400.

The net effect is that the end-user is able to easily slide the mounting plate around the surface of a wall, have an accurate view of the final result if the plate is attached at a particular location, but avoid an accidental attachment until a location is reached that satisfies the end-user's goals. The end-user's goals can be functional (e.g., attaching an object at an accessible height), aesthetics, or combination of both.

To detach a mounting plate 410, the end-user can grasp tabs 603 and 604, and pull these tabs away from each other. In general, each tab needs to be pulled in a direction that is essentially parallel to the main adhesive planes of the NDAD. This type of pulling, in a linear manner, reduces the risk of an inadvertent tearing of the carrier material prior to completion of the debanding process.

With respect to the wall-facing adhesive regions 605 and 606, they will begin to stretch (or flow), first at the regions closest to the tabs. Specifically, with respect to tab 603, the region of 605 closest to it stretches first, and, at approximately the same time, with respect to tab 604, the region of 606 closest to it stretches first. As successive segments of 605 and 606 stretch, 605 and 606 will successively de-bond from wall 400.

With respect to object side 602 of NDAD 600, we can expect a similar successive debonding from the mounting plate 410. Specifically, with respect to tab 603, the region of 608 closest to it stretches first, and, at approximately the same time, with respect to tab 604, the region of 608 closest to it stretches first.

The debonding can be expected to occur at approximately the same rate, and at approximately the same time, on both wall side 601 and object side 602. The debonding process starting from tab 603 stops when it reaches inelastic region 607. Similarly, and at approximately the same time, the debonding process starting from tab 604 stops when it reaches inelastic region 607. At this point, it can be appreciated that there is no further adhesive bonding NDAD 600 to wall 400. However, with respect to mounting plate 410, it is still attached to NDAD 600 by portion 609 of adhesive region 608. Therefore, the end-user experiences mounting plate 410 as gently detaching from wall 400, while at the same time still remaining stably held between tabs 603 and 604.

Even though NDAD 600 still remains attached to mounting plate 410, mounting plate 410 can be designed such that its surface is much more resistant to damage than that of wall 400. For example, mounting plate 410 can be constructed of a metal (such as aluminum), a hard plastic (e.g., a polyvinyl chloride or PVC that can be extruded), or a ceramic. (The prior listed materials are not meant to be limiting, and the mounting plate can be constructed from any suitable material.) Therefore, the end-user need not detach region 609 through a gentle flow-type debonding process. Wall 400, in contrast, can be expected to have a delicate and easily damaged surface, such as a painted surface.

2 FURTHER STRUCTURE

FIG. 8A depicts a potential structure 640, for an NDAD of type 600, based upon a single continuous length of carrier 630 (the black region, classified as fill pattern 1301 in FIG. 13). Wall side 601 and object side 602, of carrier material 630, can be entirely coated with a layer of adhesive (i.e., see the use of diagonal pattern 1300 in FIG. 8A). At either end of carrier 630, a tab can be created by attaching segments of relatively inelastic material on both the 601 and 602 sides. For example, tab 603 of FIG. 8A is shown as comprised of relatively inelastic segments 620 and 621. Similarly, tab 604 of FIG. 8A is shown as comprised of relatively inelastic segments 622 and 623. A segment 607 of inelastic material is attached to side 601, at an approximate midpoint between segments 620 and 622.

All of segments 620-623, and 607, are attached to carrier 630 because of the adhesive generally applied to side 601 and 602. The adhesive of side 601, not covered by segments 620, 622, or 607, leaves the adhesive regions 605 and 606, as previously discussed with respect to FIG. 6A. Similarly, the adhesive of side 602, not covered by segments 621 or 623, leaves the adhesive region 608, as previously discussed with respect to FIG. 6B.

Under some embodiments, segments 620-623 can be comprised of the same inelastic material used for inelastic region 607.

Under other embodiments, segments 620-623 can be omitted entirely. Further, at the portions of carrier 630 where segments 620-623 would be attached, the application of adhesive can also be omitted. In this case, the uncovered carrier material itself becomes the tab at either end of the NDAD 600. This can be a particularly suitable construction approach, if carrier 630 is made of a polyethylene foam (particularly one that is closed cell and cross-linked).

The adhesive applied to sides 601 and 602 can be based on a rubber, an acrylic, or any other suitable pressure sensitive adhesive.

In general, carrier 630 can be any type of elastomeric material, including elastomers, so long as the material has suitable elastomechanical properties.

It is important to note that the relative thicknesses, of the layers shown in FIG. 8A, have been chosen for purposes of clearly identifying components, and are not necessarily realistic. In particular, the following segments can be expected to be, relative to carrier 630, much thinner than as shown: 620-623, and 607.

For example, if polyethylene foam is used as the carrier, a typical thickness for carrier 630 is approximately 1.1 mm. The inelastic material attached to the carrier can be, for example, a biaxially-oriented polypropylene (BOPP) with a thickness of approximately 0.05 mm. A suitable BOPP, for example, is manufactured by AVERY DENNISON CORPORATION (Glendale, California, USA) under the FASSON trade name. The adhesive layer applied to carrier 630, on each of sides 601 and 602, can be even thinner than the BOPP.

FIG. 8B depicts another potential structure 641, for an NDAD of type 600, based upon a single continuous length of a hybrid carrier of type 631 (also see pattern 1306 of FIG. 13). A definition of "hybrid carrier" is provided in the below Glossary. Because a hybrid carrier has adhesive properties, it generally has far greater elasticity than foam-based (and, in particular, polyethylene foam) carriers. For example, when being stretched during a non-destructive debonding process, a foam-based carrier may stretch to about twice its bonded length (without breaking or tearing). In contrast, a hybrid carrier can frequently stretch up to about five times its bonded length, during a non-destructive debonding process.

Due to its great plasticity and inherent stickiness, a region of just hybrid carrier cannot usually serve as a pull-tab on its own, as can be done, for example, with such carriers as polyethylene foam. It is for this reason that NDAD structure 641 includes relatively inelastic segments 620-623, with segments 620-621 forming tab 603, and segments 622-623 forming tab 604.

During the debonding of a hybrid carrier based NDAD, because of hybrid carrier's far greater elasticity than foam-based carrier, the requirement for a linear pulling of tabs 603 and 604 is greatly relaxed.

Once again, it is important to note that the relative thicknesses, of the layers shown in FIG. 8B, have been chosen for purposes of clearly identifying components, and are not necessarily realistic. In particular, the following segments can be expected to be, relative to carrier 631, much thinner than as shown: 620-623, and 607.

For example, as discussed in the below Glossary for the term "hybrid carrier," a specific suitable hybrid carrier product is manufactured by TESA SE, a German company. Tesa refers to its hybrid carrier product as a double-sided "Bond & Detach" tape. Thicknesses of "Bond & Detach" tape currently sold include the following: 0.25 mm, 0.65 mm, 0.8 mm, and 1.0 mm. The 0.25 mm thickness is suitable when attaching to smooth surfaces, while 0.8 mm and 1.0 mm are better for textured surfaces. The 0.65 mm is a good general-purpose thickness, suitable for smooth surfaces as well as many textured surfaces. In general, one can expect hybrid carrier thickness to range from approximately 0.2 mm up to approximately 2.0 mm.

As with FIG. 8A, the inelastic regions of FIG. 8B (i.e., 620-623, and 607) can also be constructed with the same types of inelastic material, such as the above-mentioned BOPP sold under the FASSON trade name.

2.1 Visual Feedback During Debonding

During debonding, hybrid carrier has introduced far greater elasticity, and resistance to tearing, compared with carriers such as polyethylene foam. As mentioned above, hybrid carrier can frequently stretch up to about five times its bonded length, compared with twice its bonded length for foam-based carriers. Such elasticity and resistance to tearing opens the possibility for longer NDAD's. For example, as discussed in the above Background section, even large-size 3M Company Command strips have a maximum adhesive dimension (on the wall side) of 7.36 cm. In comparison, an example set of dimensions for NDAD 600, introduced above in Section 1 ("introduction"), has a maximum adhesive dimension (length 620) of 10.0 cm. The 10.0 cm length is intended to accommodate a mounting plate 410 as discussed in the above Background section.

In fact, with hybrid carrier, an NDAD of type 600 can be created to accommodate a mounting plate 410 with a length (i.e., a length 420) of 20.0 cm, or more.

Thus, the greater elasticity of hybrid carrier, the greater lengths of NDAD's constructed with hybrid carrier, or combination of both, can lead to a lengthier debonding process. The debonding process is lengthier in two ways:
- the length of the debonded carrier, produced by the pulling of the end-user, is increased, and
- it can also take more time to complete the debonding process.

It can therefore be helpful to provide the end-user with visual feedback, regarding the state (or level of completion) of his or her debonding process.

For example, hybrid carrier 631 can be color-coded. For example, a portion of the carrier material closest to inelastic region 607 can be color-coded red, while the carrier material farther from the inelastic region 607 can be color-coded white. During an earlier stage of the debanding process, when the end-user is pulling tabs 603 and 604 away from each other, the stretched carrier material that becomes visible to the end-user (because it is not occluded, for example, by a mounting plate 410) can appear white. However, once the end-user has accomplished a certain amount of progress, towards the point where plate 410 will detach from the wall surface, the end-user is able to see the stretched carrier material changes to a reddish color. This color change can act as a signal to the end-user, that he or she has reached a certain stage, in the process of detaching the mounting plate (or other attached object).

The visual signal can, for example, indicate to the end-user that he or she is halfway towards the detachment point. Rather than a single color change (e.g., from white to red), multiple (e.g., two or more) color changes can be used. For example, if three color changes (using four colors) are used, each color change can indicate completion of an additional 25% of the debonding process.

Alternatively, or additionally, a color change can be arranged to occur when the end-user is very close (e.g., 80% or 90%) towards completion of the debonding process. In that case, the color change can serve as a kind of warning to the end-user, such that he or she is not surprised when the mounting plate detaches. Alternatively, or in addition, such close-to-completion visual feedback can cause the end-user to slow down the rate at which he or she stretches the remaining carrier (i.e., the carrier remaining in adhesive contact with the wall and attached object), and thereby reduce, for example, the likelihood of tearing the carrier once the inelastic region (e.g., 607) is reached.

As an alternative to changing color, as the end-user progresses towards the inelastic region, a change in grayscale can be used.

As an addition, or alternative, to changing color or grayscale, a gradient (of a color or grayscale) can be used.

Rather than, or perhaps as an addition to, the use of color or grayscale coding, distinct visual patterns can be printed on a region or regions of the carrier. As with color or grayscale coding, a visual pattern can indicate to the end-user the state (or level of completion) of his or her debonding process. For example, during the earlier stages of the debonding process, when the end-user is pulling tabs 603 and 604 away from each other, the stretched carrier material that becomes visible to the end-user (because it is not occluded, for example, by a mounting plate 410) can have no pattern printed upon its surface. However, once the end-user has accomplished a certain amount of progress, towards the point where plate 410 will detach from the wall surface, the end-user is able to see that the stretched carrier material changes to a graphical pattern. An example suitable pattern can be a series of stripes across the shorter dimension of the carrier (i.e., across the Y dimension of the carrier, as shown in such figures as FIGS. 6A-6B). The use of stripes is presented only by way of example, and any other distinctive graphical pattern (such as a pattern of dots) can be used.

As discussed above with respect to color or grayscale, rather than a single pattern change (e.g., from no pattern to stripes), multiple (e.g., two or more) pattern changes can be used.

While the above-described visual feedback is particularly useful with NDAD's constructed from hybrid carrier, such visual coding can also useful when debanding an NDAD based on polyethylene foam.

In fact, the use visual coding is a useful and inventive addition, when applied to otherwise prior art NDAD's, such as those depicted in FIGS. 1A-1C and FIGS. 2A-2C (i.e., when applied to NDAD's of types 110 and 210).

2.2 Release Liners, and Peelable Tabs

FIGS. 9A-9B each depicts the same NDAD structure 641, as shown in FIG. 8B, except release liners have been added. In FIG. 9A, it can be seen that the following three segments of release liner are used: 650-652 (also see pattern 1307 of FIG. 13). Liner segments 650-652 cover, respectively, adhesive regions 605, 606, and 608 of FIG. 8B. In FIG. 9B, it can be seen that the same release-liner segment 652, included in FIG. 9A, is again used. However, release liner segments 650-651 are replaced with a single release-liner segment 653.

It should be noted that release liner materials (e.g., such as glassine) are often inelastic. It is for this reason that any or all of segments 620-623 can be made of release liner material (rather than, for example, using the inelastic material used for debonding-blocking region 607). For example, since segments 620 and 622 are on the same side (i.e., 601) of the carrier 631 as debonding-blocking region 607, it may be efficient, from a manufacturing perspective, to construct segments 620 and 622 from the same inelastic material used for inelastic region 607. On side 602 of an NDAD 641, however, it may be more efficient, from a manufacturing perspective, to construct segments 621 and 623 from the same material used for release liner 652.

Constructing segments 621 and 623 from release liner material is an additional inventive technique for at least the following reasons. With respect to FIG. 11A, it can represent a configuration where release liners 650-652, of an NDAD of type 641, have already been removed, thereby permitting the attachment of mounting plate 410 to wall 400 via NDAD 641. Regarding the portions of the tabs facing the viewer in FIG. 11A, it can be appreciated that left tab 604 can be constructed with release liner for its segment 623, while right-side tab 603 can be constructed with release liner segment for its 621. We can refer to tabs that incorporate release liner material (such as just-described tabs 604 and 603) as "peelable tabs." Segment 622 of tab 604, and segment 620 of tab 603, can still be constructed of the same inelastic, and non-peelable, material (e.g., BOPP) used for segment 607.

Because segments 621 and 623 are constructed from release liner, an end-user can decide to remove them (i.e., segments 621 and 623), thereby revealing the sticky surface of carrier material 631. At that point, an end-user can bend each of tabs 604 and 603 forward (i.e., towards the viewer, along the Z dimension of FIG. 11A), and, through a bending of tabs 604 and 603 by approximately 180°, adhere the sticky side of the tabs to the viewer-facing side of mounting plate 410. At that point, segment 622 of tab 604, and segment 620 of tab 603, are facing the viewer of FIG. 11A, How much (if any) of segments 620 and 622 face the viewer depends upon lengths 623 and 624 (defined above, for tabs 603 and 604, with respect to FIGS. 6C-D) relative to the Z dimension of mounting plate 410.

At the current point in this discussion, it is assumed the Z dimension of 410 is substantially smaller than lengths 623 and 624. For example, in the above Background section, an example main body thickness (423) of 3 mm (or 0.3 cm) is presented, while 2.0 cm (or 20 mm) is presented in the above Introduction (Section 1) as an example dimension for lengths 623 and 624.

When it is desired to remove mounting plate 410 from wall 400, each of tabs 604 and 603 can be peeled away from the surface of the mounting plate. Because tab 604 still has inelastic segment 622, and tab 603 still has inelastic segment 620, tabs 604 and 603 are still usable for the debonding process described above. In a similar manner to that described above, the surface of mounting plate 410 can be constructed such that an end-user need not detach the tabs through a gentle flow-type debonding process.

2.3 Nonlinear Structure

Figure 10B:
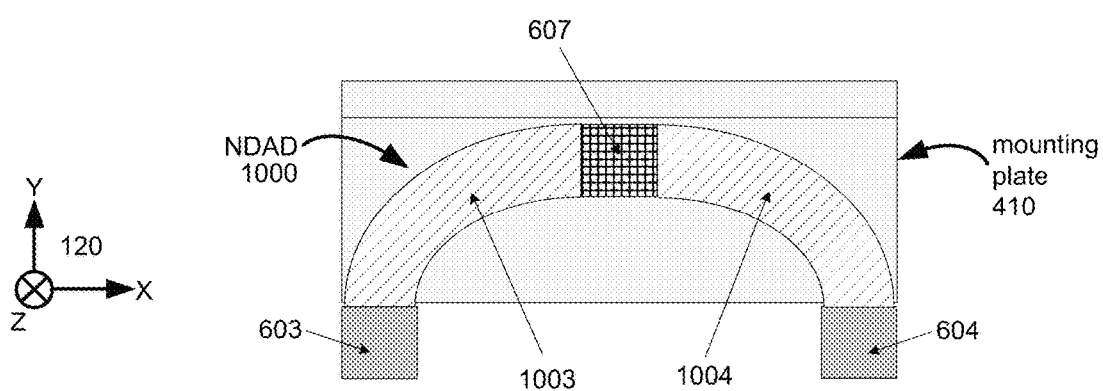
FIG. 10B depicts an NDAD of type 1000, with an example nonlinear structure.

As mentioned above, an NDAD of type 600 need not have the linear structure introduced in FIGS. 6A-6B. FIG. 10B depicts an NDAD of type 1000, with an example nonlinear structure. Specifically, between its tabs 603 and 604, NDAD 1000 curves 180'. This permits, for example, for both tabs 603 and 604 to project below the lower horizontal edge of mounting plate 410. Further examples of nonlinear structures are presented below (see Section 4.2, "Further Nonlinear Structures").

As has already been discussed above (e.g. Section 2.1, "Visual Feedback During Debanding"), hybrid carrier has far greater elasticity, and resistance to tearing, when compared with other types of carriers, such as polyethylene foam. Such elasticity and resistance to tearing encourages the use of nonlinear NDAD's.

It can be appreciated that the above-described inventive peelabie tabs can be particularly useful in conjunction with a non-linear NDAD (e.g., NDAD 1000) if the object attached by the NDAD has sufficient depth (e.g., sufficient Z dimension). For example, with respect to above-discussed FIGS. 6C-D, example dimensions of 2.0 cm, for each of the tab-lengths 623 and 624, are presented. Further, consider the case where the Z dimension of the object being attached (e.g., perhaps a picture frame or a shelf, attached without a mounting plate) is at least as long as tab-lengths 623 and 624. For the 2.0 cm dimensions of tab-lengths 623 and 624, discussed in connection with FIGS. 6C-D, this would be a Z dimension of at least 2.0 cm for the object attached by an NDAD (such as NDAD 1000 OF FIG. 10B).

In that case, the sticky sides of tab 603 and 604 (i.e., the sides where release liner segments 621 and 623 are removed) can be adhered to the underside of the object attached by NDAD 1000. Depending upon the extent to which the Z dimension of the attached object exceeds tab-lengths 623 and 624, and depending upon the height at which the attached object is placed, the underside of the attached object may not be visible to the normal viewer or end-user.

While it may not be as likely as for a picture frame or shelf, the Z dimension of a mounting plate can also exceed tab-lengths 623 and 624.

For some types of objects, mounting configurations, or both, the top of the attached object (as an addition, or alternative, to the underside) may not be visible to the normal viewer. In that case, one can rotate an NDAD with peelable tabs, such as NDAD 1000 of FIG. 10B, such that the tabs project from the top edge of the attached object.

3 FORCES ANALYSIS

3.1 Analysis

Figure 12A:
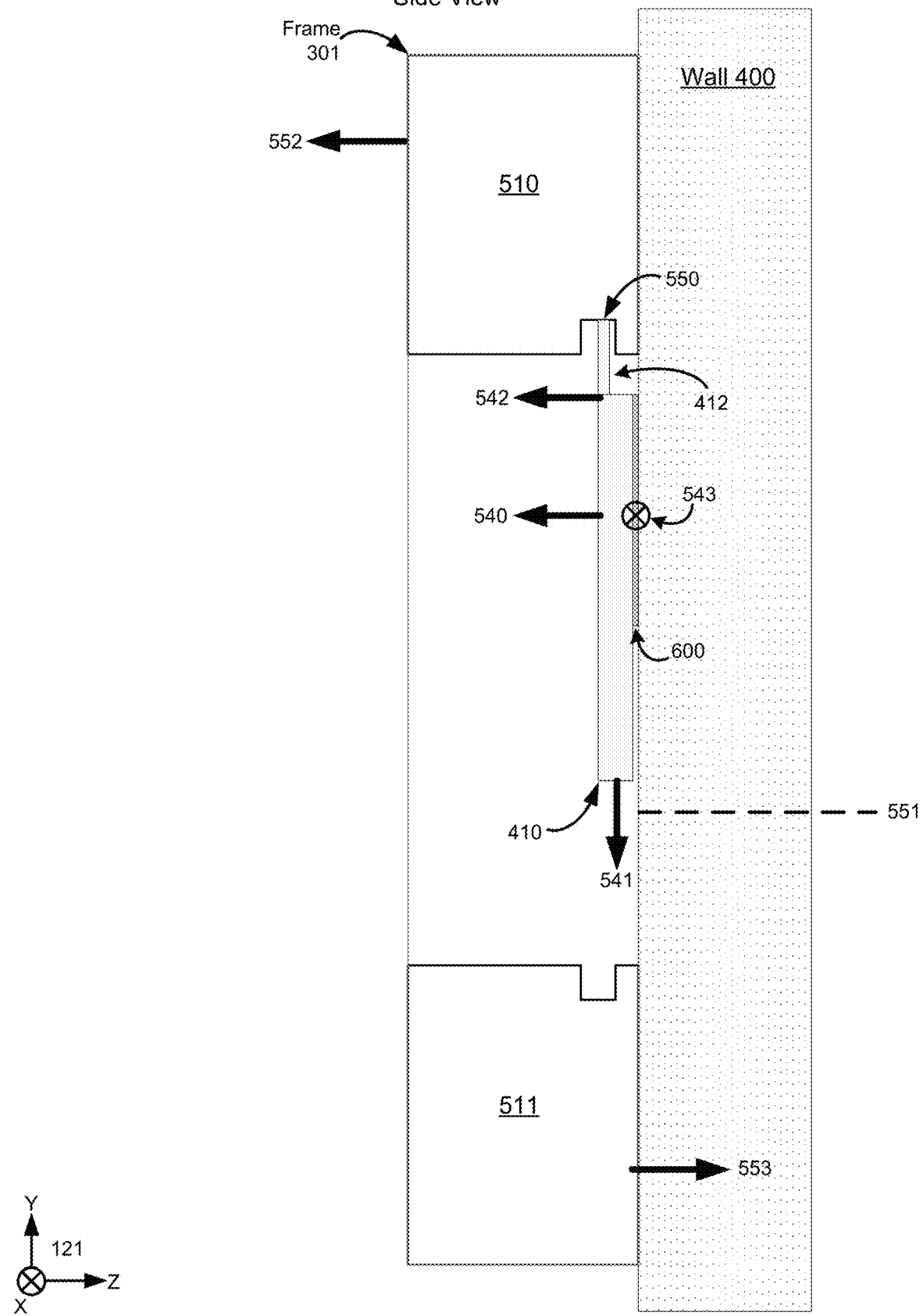
FIG. 12A is the same as FIG. 5A, except the use of prior art NDAD's of type 110 in FIG. 5A (e.g., NDAD 430) is replaced in FIG. 12A with the use of an inventive NDAD of type 600.

A particularly important application of the inventive NDAD presented herein is the hanging of picture frames (please see below Glossary for definition of picture frame). FIG. 12A is an example forces analysis of this application, when using a mounting plate, such as the previously discussed mounting plate of type 410.

FIG. 12A is the same as FIG. 5A, except the use of prior art NDAD's of type 110 in FIG. 5A (e.g., NDAD 430) is replaced in FIG. 12A with the use of an inventive NDAD of type 600. In FIG. 12A, NDAD 600 is shown from the tab-end view introduced in FIGS. 7A-7B. In particular, based on the configuration of FIGS. 11A-11B (showing a particular placement of an NDAD 600, in between a mounting plate 410 and wall 400), we can expect the end of tab 603 is facing the viewer of FIG. 12A, FIG. 12A depicts frame 301 as already hung flush against wall 400. Frame 301 is held up, against the force of gravity, by contact between top edge 550 of rail 412 and the slot (labeled 500 in FIG. 5A) in frame 301's upper portion 510. As shown by set of axes 121, top edge 550 extends into the page along the X axis.

The force of gravity on frame 301 produces a shear force 541 on mounting plate 410. As defined herein, a shear force is a force parallel to an adhesive plane. In the case of FIG. 12A, there are two adhesive planes (proceeding left to right along the Z axis): a first between mounting plate 410 and NDAD 600, and a second between NDAD 600 and wall 400.

Frame 301 is static because of the presence of wall 400. However, top edge 550 engages with frame 301 such that frame 301, but for wall 400, would have a lower center-of-mass. Thus, while static, frame 301 can be expected to produce rotational forces 552 and 553. The fact that frame 301 would rotate, but for the presence of wall 400, can be appreciated by imagining wall 400 as removed below outline 551 (and the remainder of FIG. 12A remaining the same). Therefore, top portion 510 of frame 301 exerts a counterclockwise force 552. Conversely, bottom portion 511 of frame 301 exerts an equal and opposite force 553 against wall 400.

As with the purely downward force 541 counterclockwise force 552 is also transmitted to mounting plate 410 through top edge 550 of rail 412. To the extent force 552 is purely perpendicular to the adhesive planes of NDAD 600, it is referred to herein as an adhesive force. In FIG. 12A, the adhesive force is represented as force 540.

To the extent counterclockwise force 552 has a greater effect at the upper edge of NDAD 600 than at its lower edge, it is referred to herein as a modified peel force. In FIG. 12A, the peel force is represented as force 542, and is applied along a direction perpendicular to the plane of mounting plate 410. For definitions of peel force and modified peel source see Glossary of Selected Terms.

Force 543 of FIG. 12A is referred to herein as a flow force. The flow force is the force required to start the debonding process of an NDAD. In the case of FIG. 12A, flow force 543 is applied parallel to the X axis, to tabs 603 (towards the viewer) and 604 (away from the viewer). In general, the amount of flow force required depends upon the length of the edge, of an adhesive plane, along which the flow force is applied. In the case of FIG. 12A, it is the dimension of NDAD 600 along the Y axis.

In addition to the definitions provided above, the shear and adhesive forces can be characterized by the fact that they are not influenced by the particular geometry of the adhesive plane. For example, NDAD 600, as presented in FIGS. 6A-6B and utilized in FIG. 12A, is much longer along its X dimension than its Y dimension (a ratio of approximately 7:1). However, the amount of shear force required, to separate mounting plate 410 from wall 400, is independent of whether the shear force is applied parallel to the Y axis (depicted as force 541 in FIG. 12A), or parallel to the X axis. The shear force required is simply a function of the total amount of surface area, of the first and second adhesive planes between 410 and 400.

Unless specifically state otherwise, we will generally assume first and second adhesive planes of a same area, or of areas sufficiently close they can be approximated as the same. Under such conditions, we may refer to an NDAD as having "an adhesive area." If the surface area of the first and second adhesive planes differ sufficiently, the shear force of the NDAD is limited to the force required by the plane with lesser adhesive area.

Similarly, with respect to the amount of adhesive force 540 required, to separate mounting plate 410 from wall 400, it does not matter whether the longer dimension of NDAD 600 is along the X axis (as is shown in FIG. 12A) or the Y axis. Like the shear force, the adhesive force required is simply a function of the NDAD's adhesive area. As with shear force, if the surface area of the first and second adhesive planes sufficiently differ, the adhesive force of the NDAD is limited to the force required by the plane with less adhesive area.

Unlike shear and adhesive forces, however, modified peel force, as well as peel force, do depend on the geometry of the adhesive planes. In this discussion we will focus on modified peel force, since we are primarily concerned with the force required to detach an object (e.g., a plate or mounting plate) with a rigid planner surface from another rigid planar surface (e.g., a wall). For example, modified peel force 542, which is applied along NDAD 600's longer X dimension, is greater than the modified peel force necessary, if applied at either end of NDAD 600 along the Y dimension. Peel force is also dependent on the angle at which it is applied, which angle is assumed herein to be approximately perpendicular, to the mounting plate and adhesive planes by which it is attached to another planner surface (e.g., a wall).

Furthermore, it is instructive to compare peel force 542 of FIG. 12A under two scenarios:

Scenario 1: When the relationship of NDAD 600 to mounting plate 410 is as shown in FIG. 12A. That relationship can be more easily appreciated from the wall-side view of FIG. 10A, Scenario 2: If the use of inventive NDAD 600 is replaced with the use of two NDAD's of type 110 in accordance with 3M Company recommendations. The resulting relationship, between the NDAD's and mounting plate 410, can be more easily appreciated from the wall-side view of FIG. 4B, In accordance with 3M Company recommendations, NDADs 430 and 431 in FIG. 46 are attached (to mounting plate 410) with their longer dimension along the Y axis.

It will be further assumed that the adhesive area of inventive NDAD 600 is equal to the sum of the adhesive areas of NDAD 430 and 431. In order to easily achieve equality, the following conditions are assumed:

NDAD 600 is composed of the same type of carrier and adhesive as is used for NDAD's 430 and 431.

The wall and mounting-plate sides, of NDAD 600, are constructed to have the same, or approximately same, adhesive areas. For example, with respect to FIGS. 6C-D, region 609, of the mounting plate side 602 of NDAD 600, can be made non-adhesive, as it is for wall side 601.

NDAD's 430 and 431 have the same (or approximately same) amount of adhesive area on their wall side 111 and mounting plate side 112 (with reference to FIGS. 1A-1B).

Despite the equality of adhesive area, because of the difference in the geometry, by which those adhesive areas are placed, one can expect to observe a greater modified peel force 542 under Scenario 1 compared with Scenario 2.

The difference in peel force is due to two main factors:

Factor 1: Along the upper edge of mounting plate 410, the amount of dimension 420 (which follows the X axis as shown in FIG. 10A) for which adhesive is present. Because in Scenario 2 the NDAD's are placed with their longer dimension along the Y axis, while the opposite is true for Scenario 1, we can expect that, along rail 412's dimension 420, less adhesive plane is present under Scenario 2 than Scenario 1, for resisting a modified peel force like 542.

Factor 2: The amount of dimension 421 (e.g., see FIG. 10A) of the mounting plate (which excepts the Y axis dimension of rail 412) that acts as leverage against the adhesive areas. For Scenario 2, the entirety of this dimension acts as leverage, against at least some part of the adhesive areas of NDADs 430 and 431. Under Scenario 1, however, the adhesive areas of NDAD 600 (e.g., 1001 and 1002) project only about two-thirds downwards along this same Y axis dimension (i.e., dimension 421).

Increased resistance to modified peel force is produced by maximizing Factor 1, and minimizing Factor 2.

For a picture-frame-hanging type situation, such as that shown in FIG. 12A, it can be expected most of the weight of frame 301 is applied to mounting plate 410 as a shear force 541. However, as a result of empirical observation and experimentation, it has been determined that modified peel force is frequently the limiting factor, regarding the amount of weight that can be supported by a particular use of one or more NDADs. In general, because they involve a uniform engagement of force across the full adhesive plane, the shear and adhesive forces are greater than an NDAD's modified peel force. The nondestructive characteristic of an NDAD relies upon the flow force being less than any of the modified peel, shear, or adhesive forces.

An inventive NDAD (such as NDAD 600 with inelastic region 607) also relies upon the flow force being less than any of the modified peel, shear, or adhesive forces. Until the inelastic region is reached, the debonding process relies upon supplying sufficient flow force. When the inelastic region is reached, however, further detachment of an NDAD 600 (from its object side) relies upon application of any of the peel, shear, or adhesive forces. Since these peel, shear, and adhesive forces are substantially greater than the flow force, the end-user experiences the reaching of the inelastic region as a definite discontinuity, where further detachment stops. The strength of the peel, shear, and adhesive forces means that, in general, in comparison to the total adhesive area of an NDAD 600, only a minor portion is necessary to hold the object (e.g., mounting plate 410) once such object is detached from its wall (or other surface). Thus, in exchange for the advantages of an NDAD in accordance with the present invention, only a minor portion of the peel, shear, and adhesive forces, between the inventive NDAD and the surface to which it is attached (e.g., a wall), is lost. Constructing the inelastic region from a material (such as a BOPP) that is easily deformable along its Z axis (while remaining rigid along the X and Y axes of the object to which it is attached) permits a more focused application of peel force, than would be possible if the inelastic region is also rigid along its Z axis. The greater focusing, of the peel force applied, thus decreases the amount of peel force necessary, to achieve a complete detachment of an object from its NDAD.

While NDAD 600 is still attached to both its object and surface (i.e., before debonding has begun), however, and assuming all other factors held constant, it is advantageous to optimize (i.e., increase) resistance to modified peel force by maximizing Factor 1, minimizing Factor 2, or a combination of both.

Furthermore, since shear force (and adhesive force) is independent of an adhesive plane's geometric distribution, optimization of modified peel force, essentially, results in no reduction in an NDAD's ability to resist shear force (or resist adhesive force).

More quantitatively, modified-peel-force optimization can be described as follows.

First, the problem to be optimized can be generalized as follows. There is a rectangular object (such as a mounting plate) for attachment to a surface (such as a wall) via one or more adhesive planes (such as the two adhesive planes provided by an NDAD 600). The upper and lower edges of the rectangular object are normal (i.e., perpendicular) to the direction of a shear force (e.g., gravity), and the modified peel force is applied to the upper edge. For purposes of simplicity of explanation, the following discussion refers to the attachment of a "mounting plate" to a "wall," but it will be understood the same optimization can be applied to the attachment of any rectangular object to any planar surface. Furthermore, where the term NDAD is used, it will be understood the same optimization can be applied to any adhesive plane (or stack of adhesive planes).

Next, suppose an adhesive plane of total area "A" has been determined the minimum required, for an NDAD to provide the necessary resistance to shear force between a mounting plate and wall. (Or that area "A" has otherwise been determined to satisfy an end-user's need for shear-force resistance.) Further, suppose "L" is the maximum length available, normal to gravity, for the NDAD's adhesive plane.

To maximize the amount of modified peel force required, area "A" should be shaped into a rectangle of length "L" (e.g., the dimension of NDAD 600 along the X axis, excepting its tabs, as used in FIG. 12A) and width A/L (e.g., the dimension along the Y axis). The mounting plate (i.e., the object the adhesive plane attaches to a wall) should be of at least the same dimensions: "L" along the X axis, and A/L along the Y axis. If the mounting plate is longer along the Y axis, than what is needed by A/L, then the top-most edge of adhesive area "A" should be in line with the top-most edge of the mounting plate. This placement (of the top-most edge of the adhesive area at the top-most edge of the mounting plate) is used in FIG. 12A, where the Y axis dimension of NDAD 600 is less than the Y axis dimension of mounting plate 410.

In general, maximizing the modified peel force resistance of an adhesive area "A" tends to reduce the size, and therefore the cost, of the mounting plate needed.

It should be noted that the placement of an L-by-AIL rectangle of adhesive, at the top-most edge of the mounting plate, is an aspirational goal, for maximization of peel-force resistance, assuming other design factors are not countervailing. For example, in the case of FIG. 12A, because a rail 412 is needed (having a Y axis length 422, as shown in FIG. 4A), the top-most edge of the adhesive must end at no higher than notch line 411 (notch line 411 also introduced in FIG. 4A), rather than at top 550 of rail 412.

Further, NDAD 600, as used in FIG. 12A, includes a centrally located inelastic region (labeled 607 in FIG. 6A) lacking adhesive on the wall-facing side. The inclusion of region 607 works against maximization of Factor 1 and minimization of Factor 2. However, the advantages from including 607, for addressing the catapulting problem and otherwise enhancing end-user safety, can often be sufficiently countervailing. As another example, the nonlinear carrier of FIG. 108 (i.e., see Section 2.3, "Nonlinear Structures") works against maximization of Factor 1 and minimization of Factor 2. However, the advantage provided, of having both tabs 603 and 604 below the mounting plate, can be sufficiently countervailing.

To summarize, the use of the above-described L-by-AIL configuration maximizes resistance to peel force for two main reasons:

It maximizes Factor 1: the length, normal to gravity, of the upper edge of the adhesive plane.

It minimizes Factor 2: the mounting plate's leverage (i.e., its width) against the adhesive plane.

Maximizing the length of the uppermost edge of an adhesive plane is important because any amount of force sufficient to peel away an NDAD's top-most edge is sufficient to peel away the "new" top edge thereby formed, which is lower than the initial top edge. This is because the mounting plate acts as a kind of lever, along its Y-axis, against the X-axis length of the adhesive plane. Any amount of peel, along the topmost edge of the mounting plate, increases that leverage.

Further, the peeling causes a rotation of the mounting plate. Referring back to FIG. 12A, such peeling causes a counterclockwise rotation of mounting plate 410. The rotation causes more of the shear force (e.g., 541 in FIG. 12A) to be transformed into modified peel force (e.g., 542).

The net result, of increased leverage and transformation from shear to peel, is a kind of "avalanche" effect: with each lowering, of the topmost edge, such new topmost edge peels faster than the preceding topmost edge.

While the above-described forces analysis focuses on the example of picture frame hanging, it is readily appreciated that this analysis is applicable to the attachment, to a wall, of many other types of objects. For example, the same type of mounting plate as 410, and its engagement with a slot in the attached object, can be applied to the attachment of a shelf to a wall.

Further potential dimensions of an inventive NDAD are presented in connection with FIGS. 6E-6H. In particular, FIG. 6E depicts a generic NDAD structure 1200, from a wall side 1201.

FIG. 6E presents a relatively central region 1202 that is inelastic, in the ways discussed above for region 607 in such figures as FIG. 6A. In connection with region 1202 are two stretchable adhesive regions 1211 and 1213. A key characteristic of regions 1211 and 1213 is that they can de-bond due to a sufficient flow force applied to, respectively, tabs 1203 and 1204. Generically, we can refer to a region like 1202 as a Non-Flowable Area (NFA), and to each of regions 1211 and 1213 as a Flowable Area (FA).

As has already been discussed, with respect to FIG. 10B, the FA's, attaching, to an NFA, need not be linear, but, rather, can present any of a variety of nonlinear paths for de-bonding, including: curved, zigzag, or stepped. Further, as indicated in FIG. 6E, an FA need not be of uniform width. For example, FA's 1211 and 1213 of FIG. 6E are shown as having a nonlinear width, along each of their respective lengths 1212 and 1214.

The NDAD of the present invention is regarded as being, essentially, a hand-powered device (i.e., a device powered by the hands and arms of a typical person). Therefore, regarding tabs 1203 and 1204, they can be of any size and shape suitable for grasping by an end-user, and through which an end-user can apply sufficient force. Regarding the lengths 1212 and 1214, of the FA's, they can depend upon the size of the particular object to be attached. In general, each FA can be expected to range in length from approximately 1 cm to 1 m.

Regarding the width of the FA's, this can be expected to range from a minimum width necessary to avoid unintentional tearing, and up to a maximum width based upon a typical end-user's physical strength. For example, unintentional tearing can result from an end-user applying unbalanced force between his or her two hands, or as a result of misjudgment of the amount of force necessary.

Therefore, one can expect the width of an FA to range from a minimum of approximately 0.25 cm up to approximately 8.0 cm.

The NFA of an inventive NDAD is generally depicted herein as a rectangular area, but this need not be the case. Other example shapes can include the circular or oval shape of FIG. 6G. Also, the use of a rectangular area can be generalized to the use of an n-sided polygon, where n happens to be 4 for the examples focused upon herein. FIG. 6H, however, depicts the use of a 6-sided polygon. Other suitable polygonal shapes can include 3-sided (i.e., triangular), 5-sided, 7-sided, or more. In general, a suitable NFA needs at least two characteristics:

a shape with sufficient centrality, such that unintentional tearing is avoided; and sufficient area, to prevent unintentional detachment of the NFA (from its mounting plate), due to peel, shear, or adhesive forces.

In terms of a suitable area, this depends mostly upon the width of the FA's at the point where each attaches to its NFA. In FIG. 6E, this width, also referred to herein as the "interface" width "w," is labeled 1210, In general, NFA ranges from approximately 0.25 w up to about 4.0 w, provided that both of the following minimums are (at least approximately) satisfied:

0.25 cm≤w 0.125 cm²≤NFA

An inventive NDAD with minimum values, for w and NFA, can only be expected to hold a minimum-sized object, both in terms of dimensions (e.g., a few centimeters) and weight (e.g., a few grams). Larger objects require commensurately larger values of w and NFA.

3.2 Experimental Data

Figure 12B:
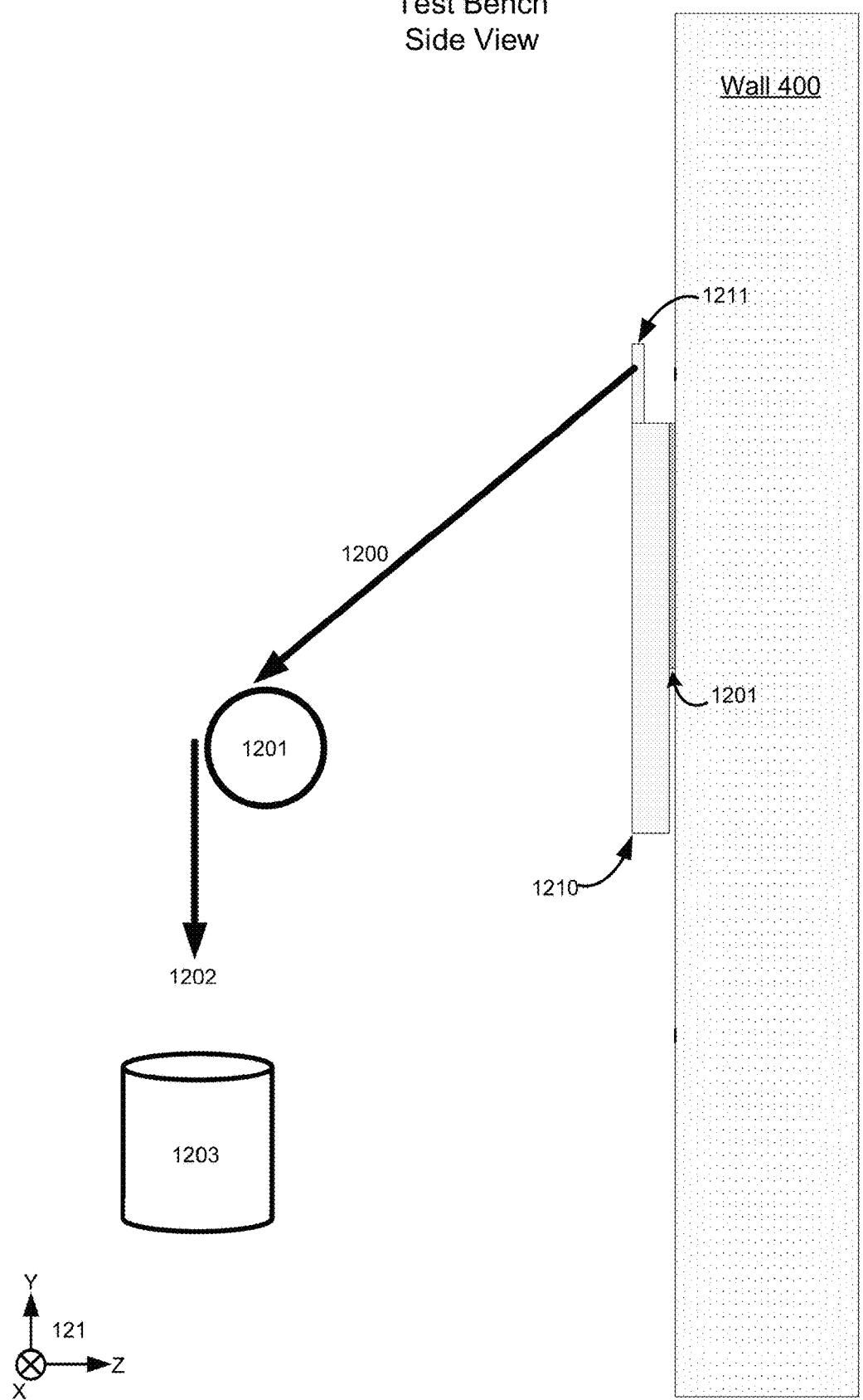
FIG. 12B is an experimental test bench, shown in side view like FIG. 12A.

The advantage of maximizing Factor 1 and minimizing Factor 2, has been verified through experimental data. FIG. 12B is an experimental test bench, shown in side view like FIG. 12A.

For purposes of testing, a complete NDAD is not needed. FIG. 128 depicts an adhesive area 1201, that can be of the same type as used for an NDAD. FIG. 128 also depicts a mounting plate 1210 which can be the same as, for example, mounting plate 410 of FIG. 12A, FIG. 12B also depicts a modified peel force 1200 applied to rail 1211, where rail 1211 can be the same as, for example, rail 412 of FIG. 12A. As can be seen, force 1200 is applied downwards at an approximately 45° angle, relative to the vertical (e.g., a wall 400). Therefore, at least a portion of force 1200 can be expected to act like modified peel force 542 of FIG. 12A.

Through a pulley wheel 1201, and the use of a suitable cable, force 1200 can be converted into downward force 1202. Various magnitudes of force 1202 can be achieved by attaching to it, for example, a cylindrical container 1203. Incremental weight can be added to (e.g. put inside of) container 1203. By this means, the modified peel force applied to plate 1210 can be incrementally increased until detachment of plate 1210 from wall 400 is achieved.

Using the test setup of FIG. 1213, four specific adhesive area geometries, as depicted in FIGS. 12C-F, were tested. In each of FIGS. 12C-F, the hybrid carrier 1306 is used.

As can be seen, in each of FIGS. 12C-F, mounting plate 1210 has the same basic dimensions:
Dimension 1220, along the X axis, is 100 mm.
Along the Y axis, the main body of the plate, dimension 1221 is 41 mm. The rail 1211 adds another 6 mm (dimension 1222).

For each of these figures, the adhesive area is a constant total of 1230 mm$^2$. For example, in FIG. 12C, the adhesive area is composed of two regions 1230 and 1231. Each of regions 1230 and 1231 has the following dimensions:
Along the X axis, dimension 1203 is 41 mm.
Along the Y axis, dimension 1202 is 15 mm.

Figure 12C:
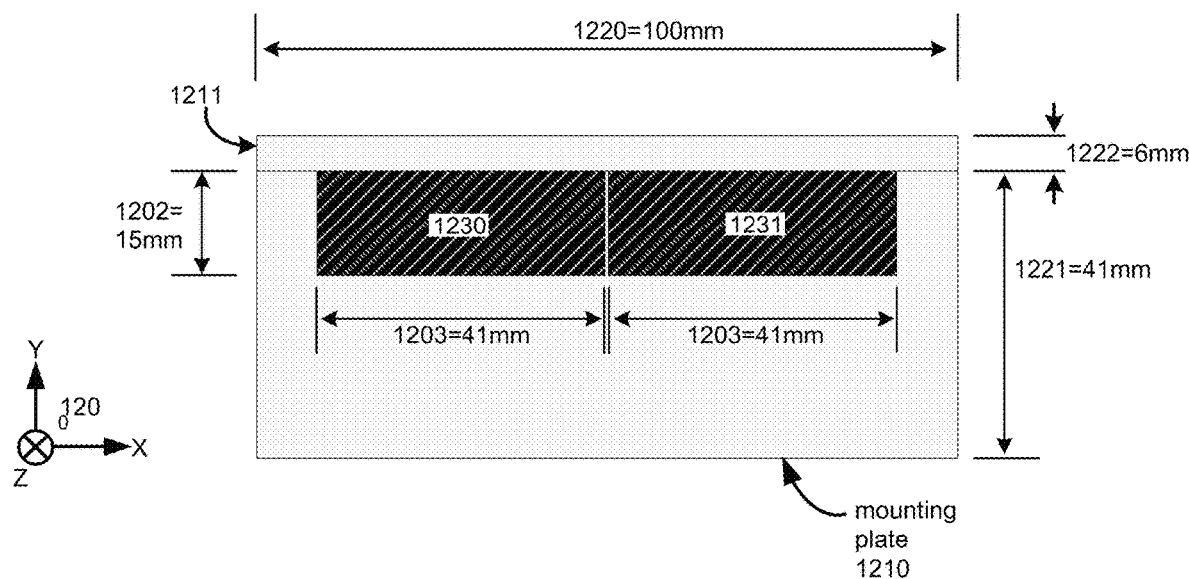
FIGS. 12C-F depict four specific adhesive area geometries tested with the setup of FIG. 12B.
Figure 12D:
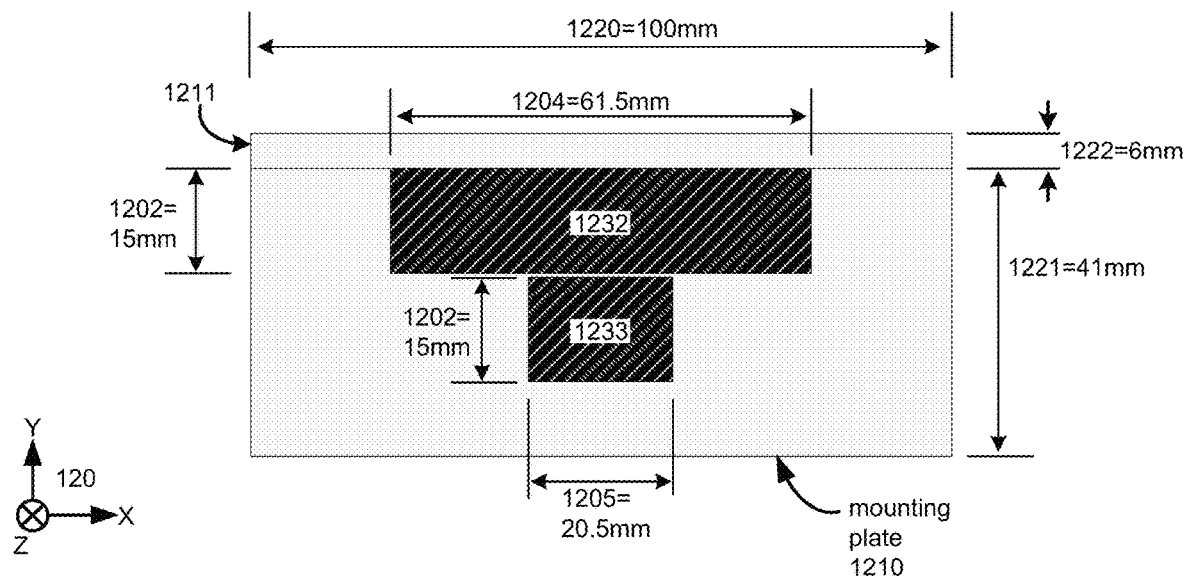
Figure 12E:
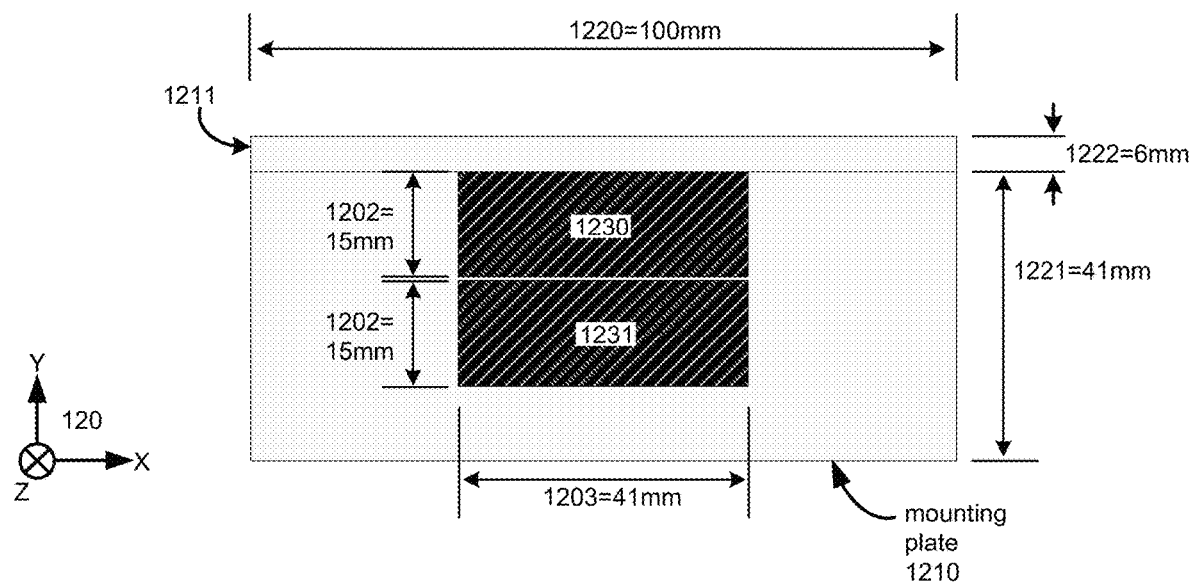
Figure 12F:
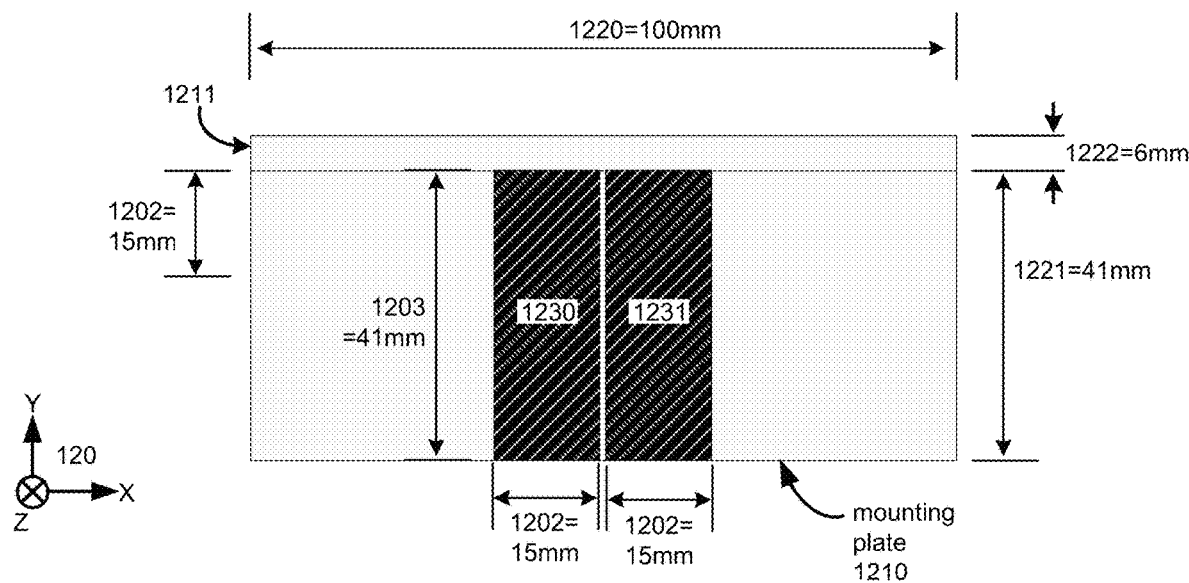

Among the adhesive geometries tested, FIG. 12C, relative to FIGS. 12D-F, has the greatest maximization of Factor 1 (i.e., greatest length of adhesive along the topmost edge of mounting plate), and the greatest minimization of Factor 2 (i.e., lease leverage of mounting plate against the adhesive area). Because of this, relative to FIGS. 12D-F, we would expect FIG. 12C to require the maximum modified peel force for removal of plate 1210 from the wall.

Among FIGS. 12C-F, FIG. 12D is designed to have the second-highest maximization of Factor 1, and minimization of Factor 2. As can be seen, the adhesive area of FIG. 12D consists of two regions with differing locations along the Y axis:
Region 1232 has a dimension 1204 of 61.5 mm along the X axis, and a dimension 1202 of 15 mm along the Y axis. The upper edge of region 1232 is placed closest to the top edge of plate 1210.
Region 1233 has a dimension 1205, along the X axis, of 20.5 mm, and a dimension 1202 of 15 mm along the Y axis. The upper edge of region 1233 is immediately adjacent to the lower edge of region 1232. Also, the upper edge of region 1233 is centered relative to the lower edge of region 1232.

Relative to the area of regions 1230 and 1231 of FIG. 12C, region 1232 of FIG. 12D is 25% less: X axis dimensions of regions 1220 and 1221 total to 82 mm, while the same X axis dimension of region 1232 is 61.5 mm. The Y axis dimensions of 1230, 1231, and 1232 are all the same 15 mm. The 25% reduction, embodied by region 1232, is, in effect, shifted to region 1233. Thus, we have kept the same total adhesive area of FIG. 12C, but 25% of the area is shifted to father away from the mounting plate's top edge.

Similarly, FIG. 12E can be regarded, relative to FIG. 120, as the shifting of another 25% of the adhesive area closest to the mounting plate's top edge. Therefore, FIG. 12E represents a shifting of half of the original area (i.e., of 1230 or 1231) closest to the top edge. Therefore, in FIG. 12E it is convenient to represent the adhesive area as comprised of the same two areas 1230 and 1231 (as in FIG. 12C), but with region 1231 shifted farther down along the Y axis.

FIG. 12F represents a fourth example, in the progression of decreasing adhesive area closest to the mounting plate's top edge, and shifting the decreased area to lower down on the Y axis. Relative to FIG. 12E, FIG. 12F depicts a 90° rotation of adhesive regions 1230 and 1231. The result is the dimension of the adhesive area, along the topmost edge of the mounting plate (along the X axis), as 30 mm for FIG. 12F, while it is 41 mm for FIG. 12E.

Thus, from FIG. 12C to FIG. 12F, one would expect the modified peel force to decrease, and, in fact, the prediction is supported by the following data:
FIG. 12C, Modified Peel Force: 150 lbs.
FIG. 12D, Modified Peel Force: 110 lbs.
FIG. 12E, Modified Peel Force: 90 lbs.
FIG. 12F, Modified Peel Force: 70 lbs.

4 ADDITIONAL VARIATIONS

4.1 Attaching Extra-Length Objects

As discussed above (e.g., Section 2.1 "Visual Feedback During Debonding"), with a hybrid carrier, an NDAD of type 600 can be created to accommodate a mounting plate 410 with a length (i.e., a length 420) of 20.0 cm, or more. This is in contrast to even large-size 3M Company Command strips, which have a maximum adhesive dimension (on the wall side) of 7.36 cm.

For example, FIG. 14A depicts a hybrid-carrier based NDAD 700, assumed to be capable of attaching an object with a maximum dimension of 20.0 cm, or more. Comparing NDAD 700 to NDAD 641 of FIG. 8B, it can be seen that NDAD 700 has the same structure, except it includes the following additional inelastic areas:
a first pair of inelastic areas 710 and 711, where a first member (710) of the first pair is on the wall side (601), and a second member (711) of the first pair is on the object side (602).
a second pair of inelastic areas 712 and 713, where a first member (712) of the first pair is on the wall side (601), and a second member (713) of the first pair is on the object side (602).

Each pair of inelastic areas reduces the length of carrier that needs to stretch, in order that NDAD 700 de-bonds. It is assumed that the length of carrier, covered by the first and second inelastic pairs, are not necessary for secure bonding of the relevant object to the relevant surface (e.g., a wall). For example, the length of carrier between tab 603 and inelastic area 607, for stretching, is reduced to the following two segments:
the segment with sides 720 and 730, which can be referred to herein simply as segment 720; and
the segment with sides 721 and 731, which can be referred to herein simply as segment 721.

Similarly, the carrier for stretching, between tab 604 and inelastic region 607, is reduced to the segment with sides 723 and 733 (also referred to simply as segment 723), and the segment with sides 722 and 732 (also referred to simply as segment 722).

FIG. 15A depicts an example object 1500 attached to NDAD 700. FIG. 15A depicts a wall-side view of NDAD 700, where the view can be produced by a 90° rotation, about the X axis, of NDAD 700 as shown in FIG. 14A. Object 1500 can be, for example, a mounting plate with a dimension, along the X axis, of 20 cm, or more. As other example possibilities, object 1500 can be a picture frame (attached without a mounting plate), shelf, or the base for a row of hooks.

To de-bond NDAD 700, an end-user can grasp tabs 603 and 604, pulling tab 603 leftward along the X axis, and pulling tab 604 rightward along the X axis. Initially, in addition to pulling tabs 603 and 604, respectively, leftward and rightward, it may also be desirable to pull tabs 603 and 604 in a downwards direction. In response, carrier segment 720 can sequentially stretch and de-bond, and carrier segment 723 can likewise sequentially stretch and de-bond. The sequential debonding can be further detailed as follows:

Regarding adhesive segment 720, it can begin to stretch at the regions closest to tab 603, and adhesive segment 723 can begin its stretching closest to tab 604.

As the end-user pulls tabs 603 and 604 farther apart, the stretching of adhesive segments 720 and 723 eventually reaches, respectively, the first and second pairs of inelastic areas (i.e., pair 710, 711, and pair 712, 713).

Because each of the first and second pairs of inelastic areas lack adhesive on both sides of NDAD 700, once an inelastic pair is reached, further debonding jumps (i.e., proceeds very quickly) to any next adhesive area for debonding:

For example, once the debonding of adhesive area 720 reaches the first inelastic pair (i.e., the pair 710, 711), further debonding quickly jumps (i.e., transitions almost immediately) to adhesive area 721.

Similarly, once the debonding of adhesive area 723 reaches the second inelastic pair, further debonding quickly jumps to adhesive area 722.

The debonding process finishes when both adhesive area 721 and adhesive area 722 reach the approximately central inelastic area 607.

As was described above, the usage of release liners can be incorporated using strategies such as those already discussed for NDAD 641 (of FIG. 8B), and FIGS. 9A-B. For example, the previously-discussed strategy of FIG. 9A is illustrated, relative to NDAD 700, in FIGS. 14B and 15B.

Specifically, as illustrated in FIG. 14B, three segments of release liner can be used: 750, 751, and 752. Release liner segment 750 both covers the first pair of inelastic areas (a strategy similar to that FIG. 9B), while not covering inelastic region 607 (the strategy of FIG. 9A). Similarly, release liner segment 751 covers the second pair of inelastic areas, while also not covering inelastic region 607. Release liner segment 752 is shown as covering, on the object side of NDAD 700, the area in-between tabs 603 and 604.

Other possible combinations, for covering or not covering an inelastic region with release liner, can be used. Considerations for choosing a particular combination, can include the following:

Covering an inelastic region reduces the number of separate segments of release liner. This can simplify the manufacturing process, lessen the likelihood of a segment of release liner from being inadvertently detached, or combination of both.

An uncovered inelastic region can be printed with instruction for the end-user. While release liner can also be printed with instruction, an inelastic region has the advantage of keeping the instruction remaining even after the release liner is removed. This can be particularly important for the approximately central inelastic region (e.g., inelastic region 607), since it is important that its side be used for attachment to a wall (or other planar surface), and not for attachment to the object (e.g., print inelastic region 607 with the instruction "wall side").

As discussed above in Section 2.2 ("Release Liners. and Peelable Tabs"), the object side of tabs 603 and 604 can be constructed of release liner, allowing each tab to be made sticky an its object side.

While the above-described technique, of pairs of inelastic areas lacking adhesive on both sides, has been described with respect to NDAD's constructed of hybrid carrier, the technique is also useful with NDAD's based on other types of carrier material, such as a polyethylene foam (to which a pressure sensitive adhesive is added).

4.2 Further Nonlinear Structures

As has already been discussed above (e.g., Section 2.3. "Nonlinear Structure"), the greater elasticity, and resistance to tearing, of hybrid carrier encourages the use of nonlinear NDAD's. This section presents further nonlinear configurations.

As defined herein, a nonlinear NDAD is one where the debonding process, from pull-tabs to approximately central inelastic region, follows a path that is something other than purely linear.

Figure 16B:
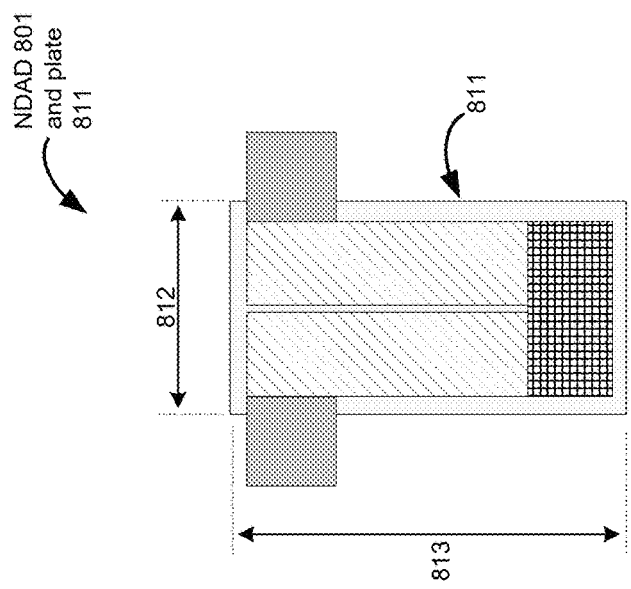
FIG. 16B depicts an NDAD 801 attached to a mounting plate 811, where 811 is significantly longer along its dimension 813, than along its dimension 812.
Figure 16A:
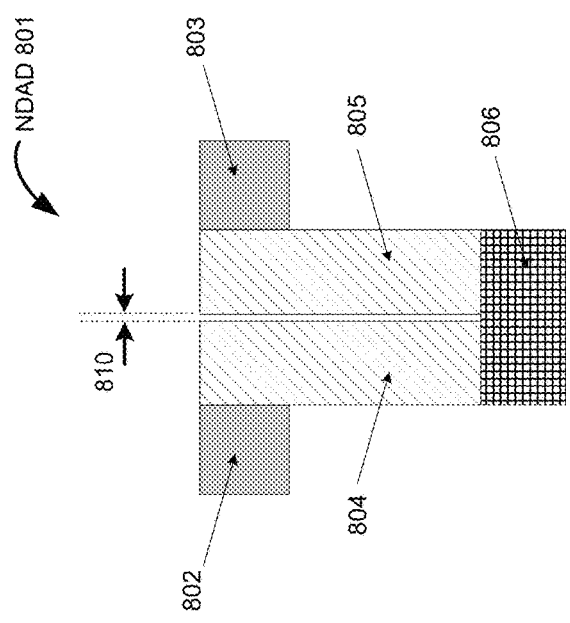
FIG. 16A presents an NDAD configuration 801 intended mainly for those situations where the object to be attached (e.g., a mounting plate) is significantly longer along its vertical (or Y axis) dimension, than along its horizontal.

FIG. 16A presents an NDAD configuration 801 intended mainly for those situations where the object to be attached (e.g., a mounting plate) is significantly longer along its vertical (or Y axis) dimension, than along its horizontal (e.g., the X axis in FIGS. 16A-B). For example, FIG. 16B depicts an NDAD 801 attached to a mounting plate 811, where 811 is significantly longer along its dimension 813, than along its dimension 812. A mounting plate with dimensions like those of 811 can be used, for example, when the objective is to attach a single hook to a wall. As discussed above, the wall hook can be composed of two main parts: a base plate (the item most directly attached to a wall through an NDAD), and a cover that fits over the base plate. The cover is equipped with the hook. If an item other than a hook is to be attached, the same base plate can be used, but its covering can change.

In such cases, a simple linear path, between tabs 802 and 803, of length 812, may provide insufficient adhesive area, with respect to resistance to shear, resistance to modified peel, or both. Providing as much adhesive area as possible, while keeping a horizontal pulling of tabs for debonding, can be addressed by having the debonding process initially start along an essentially horizontal direction, but shortly thereafter perform a 90° change of direction. For example, the major dimension of adhesive area 804 is placed at an essentially 90° change of direction with respect to the essentially horizontal pulling force expected for tab 802, The same configuration, between tab 802 and adhesive area 804, exists between tab 803 and the major dimension of adhesive area 805. It should be noted that adhesive areas 804 and 805 are kept separate as a result of a slit 810 (which is generally quite narrow, when compared with the X axis dimensions of the adhesive areas it divides). As can be seen, a slit 810 can begin at the top-most edge of the NDAD (e.g., NDAD 801), proceed downwards along a generally vertical direction, and end at inelastic area 806.

To maximize resistance to peel force, inelastic area 806 can be placed as low as possible, along vertical dimension

813, in accordance with the discussion of Section 3 ("Forces Analysis"). Specifically, if there is a choice along the Y axis, regarding where the L-by-A/L rectangle of adhesive (of total adhesive area "A") should be placed, then the top-most edge of adhesive area "A" should be in line with the top-most edge of the mounting plate. (For FIG. 16A, total adhesive area "A" is the sum of areas 804 and 805.) Among other things, top-most placement tends to minimize above-described Factor 2 (the amount of Y axis dimension of the mounting plate that can act as leverage against the adhesive areas).

Figure 17B:
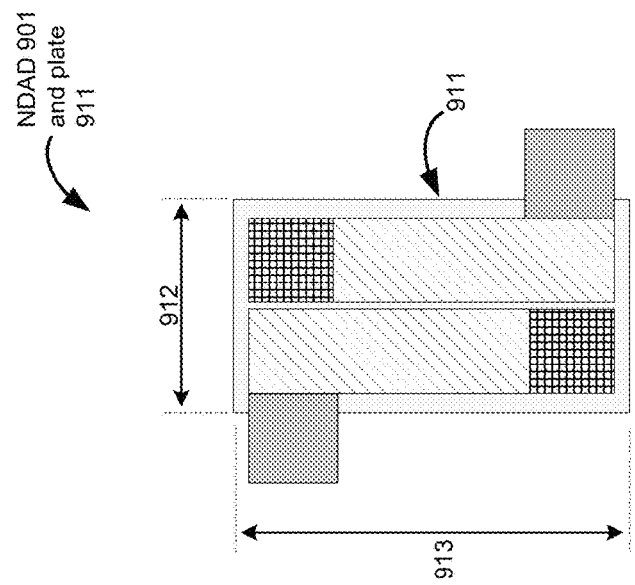
FIG. 17B shows that the first and second halves, of FIG. 17A, couple only through mounting plate 911.
Figure 17A:
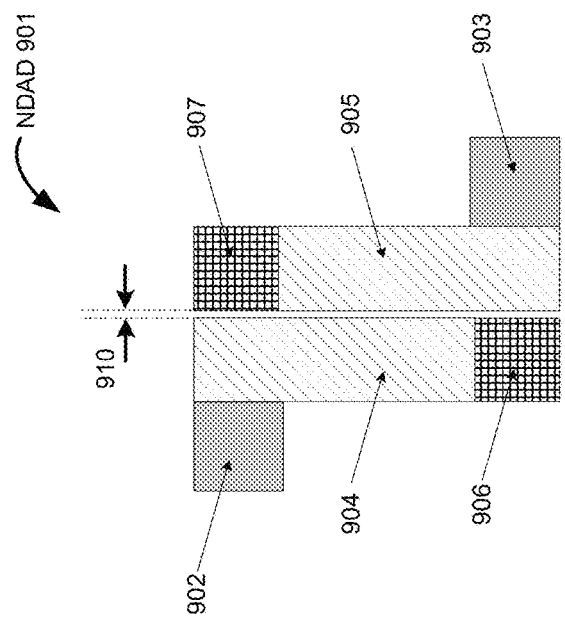
FIG. 17A depicts the fact that the inelastic area need not be composed of a single continuous area; and need not be placed at a mid-point between two tabs.

While not shown in FIGS. 16A-B (or in FIGS. 17A-B. FIGS. 18A-B, or FIGS. 19A-B), a curved relief radius can be included, between a tab (e.g., tab 802 of FIGS. 16A-B) and its generally vertically-oriented adhesive area (e.g., adhesive area 804 with respect to tab 802). The relief radius can reduce the risk of tearing during the debonding process.

FIG. 17A depicts the fact that the inelastic area need not be:
  composed of a single continuous area; and
  need not be placed at a mid-point between two tabs.

As can be seen, for an NDAD 901, its first-half can be comprised of ab 902, adhesive area 904, and inelastic area 906, while its second half can be comprised of tab 903, adhesive area 905, and inelastic area 907. These first and second halves can have no direct mechanical connection with each other (being separated by a slit 910). The first and second halves couple only through mounting plate 911, shown in FIG. 17B as having vertical dimension 913 and horizontal dimension 912. Slit 910 can extend along the full vertical dimension 913.

As shown in FIGS. 17A-B, the first-half of NDAD 901 is rotated 180° about the Z axis with respect to the second half of NDAD 901. However, this need not be the case. The first and second halves can have both their tabs located at either the top edge or bottom edge of mounting plate 911. The result is that the inelastic area (composed of areas 906 and 907) is located at an approximate mid-point between the tabs, but is still not composed of a single continuous area.

Figure 18B:
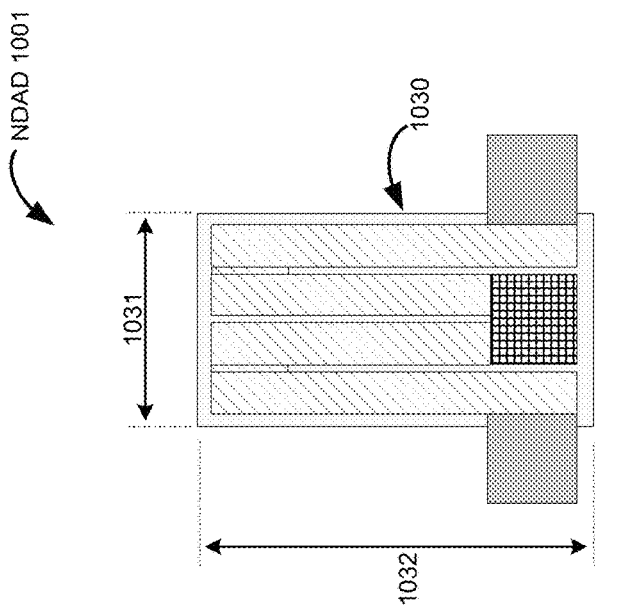
FIG. 18B depicts use of the zigzag pattern with a mounting plate 1030.
Figure 18A:
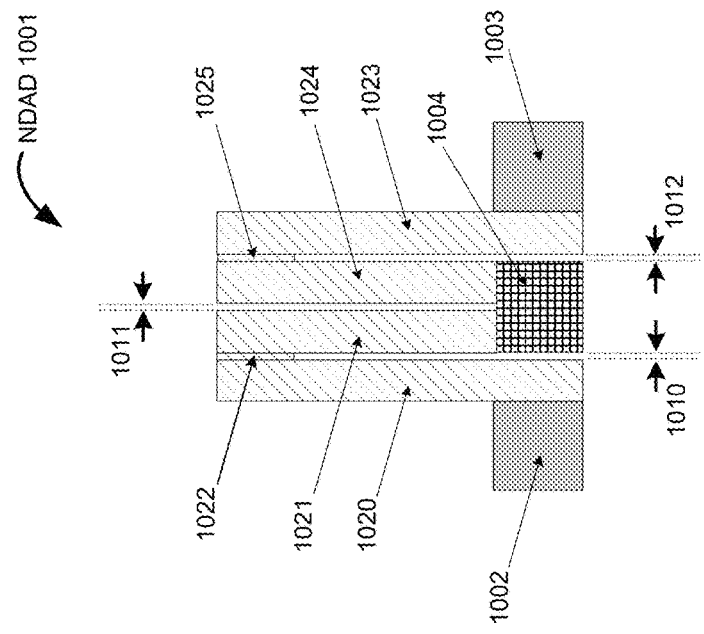
FIG. 18A depicts an NDAD 1001 where the debanding process proceeds in a 'zigzag' manner.

FIG. 18A depicts an NDAD 1001 where the debonding process proceeds in a "zigzag" manner. In particular, the debonding can proceed as follows. The following description focuses on debonding from the perspective of tab 1002, but a symmetric debonding process is simultaneously occurring with respect to tab 1003:
  Pulling on tab 1002 starts a debanding of carrier region 1020, with the debonding proceeding upwards along the Y axis.
  Carrier region 1020 is connected to a carrier region 1021 by carrier region 1022. As can be seen, the length of carrier region 1022, along the X axis, is approximately the same as the width of slit 1010, that separates carrier region 1020 from carrier region 1021.
  Once the debonding of carrier region 1020 reaches carrier region 1022, the debonding process shifts towards being in a generally X-axis direction, until carrier region 1021 is reached.
  Once the debonding process has reached carrier region 1021, the debonding process proceeds downwards along the Y axis.
  The debanding process (at least the debonding based on application of flow forces) stops once the debonding of 1021 reaches inelastic region 1004.

As mentioned above, with respect to tab 1003, a symmetric debonding process occurs in the following sequence: upwards along carrier region 1023, laterally along carrier region 1025 (acting as a bridge, between carrier regions 1023 and 1024), and downwards along carrier region 1024 until inelastic region 1004 is reached.

While FIG. 18A depicts just one "cycle" of debonding (i.e., one cycle of proceeding in a first direction along the Y axis, and then in a second opposite direction along the Y axis) before the inelastic region is reached, it should be understood that, depending upon the application and object-geometries involved, an indefinite number of zigzag cycles can be used in connection with each pull-tab.

A zigzag debonding pattern can have the following advantages:
  It decouples the width of the carrier, subject to debonding, from the dimensions of the object to be attached,
  It decouples the size of the inelastic region from the dimensions of the object to be attached.

In general, the two above-listed decoupling's permit high efficiency use of the area available for application of adhesive (e.g., see the discussion of Section 3, "Forces Analysis") across a wide range of object geometries.

For example, in comparison to FIG. 16A, FIG. 18A permits use of a smaller inelastic area (e.g., compare 806 to 1004), while still permitting essentially all elastic areas to use flow-debondable adhesive.

In fact, FIG. 16A may be viewed as a half-cycle version of FIG. 18A. Therefore, FIG. 16A may be highly efficient under some circumstances, but the ability to add more cycles (and to end on either a whole number of cycles, or on a whole number plus a half-cycle) permits the zigzag approach to be optimized for more circumstances.

In comparison to FIG. 17A, FIG. 18A permits the adhesive areas to be placed as close as possible to the top-most edge of the mounting plate (i.e., at the top-most edge of mounting plate 1030 of FIG. 188), and thereby minimize above-described Factor 2 (i.e., the amount of Y axis dimension of the mounting plate that can act as leverage against the adhesive areas).

Figure 19B:
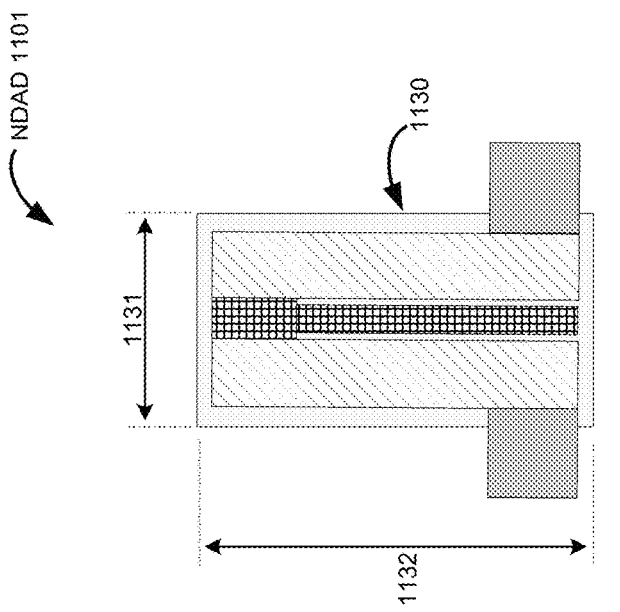
FIG. 19B depicts the same NDAD 1101, except it is attached to a mounting plate 1130.
Figure 19A:
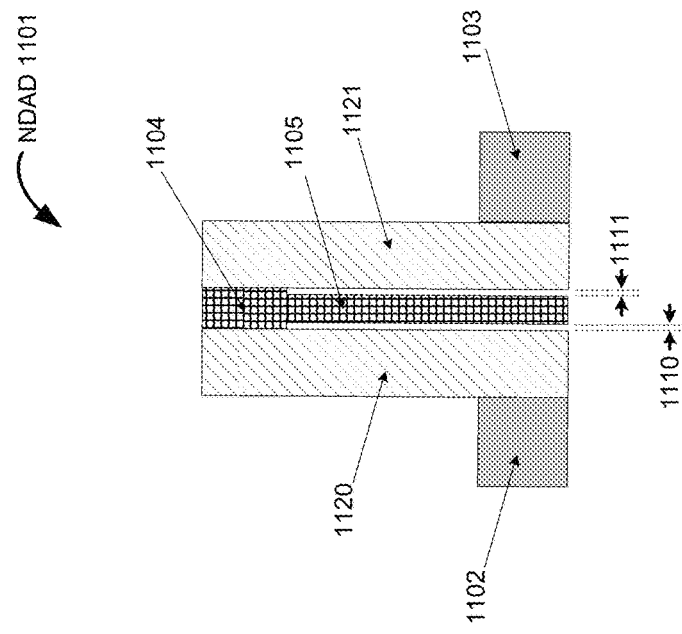
FIG. 19A depicts an NDAD of type 1101.

FIG. 19A may be viewed as very similar to FIG. 16A, except the inelastic area of FIG. 19A is much thinner along the X axis and much wider along the Y axis.

FIG. 19A depicts an NDAD of type 1101. FIG. 19B depicts the same NDAD 1101, except it is attached to a mounting plate 1130. As with NDAD 801 of FIG. 16B, it can be seen that NDAD 1101 of FIG. 19B is attached to a mounting plate 1130, where 1130 has a longer vertical dimension 1132 than horizontal dimension 1131. FIG. 19A shows an elastic adhesive area 1120, coupled to an elastic adhesive area 1121 through an inelastic area 1104. As can be seen, inelastic area 1104 differs from inelastic area 806 primarily by inelastic area 1104 utilizing only a minority of horizontal dimension 1131.

FIGS. 20A-C can be compared with FIGS. 17A-B. A major difference of FIGS. 20A-C is that they show a tab (e.g., 1241), an elastic area (e.g., 1243), and an inelastic area (e.g., 1242) approximately in-line with each other. FIGS. 20A-C emphasize in-line along the horizontal (or X) axis, but, depending upon the application, a different axis (e.g., Y) can be used.

One can consider an inventive NDAD, such as NDAD 600 of FIG. 6A, as comprised of five main regions: two tabs (e.g., 603 and 604), two adhesive regions (e.g., 605 and 606), and an inelastic region (e.g., 607). With respect to FIG. 20A, this 5-part arrangement can be regarded as divided into a 3-part building block: tab 1241, adhesive region 1243, and inelastic region 1242.

FIG. 20B is intended to show how a long object 1250 can be attached, while decoupling the long dimension from the amount of elastic debonding required for removal. As can be seen, two 3-part building blocks are used (i.e., 1252 and 1251) with a considerable gap (relative to the dimensions of the 3-part building blocks, as shown in FIG. 20B) between their inelastic regions. While FIG. 20B depicts 3-part building blocks 1252 and 1251 as essentially co-linear with each other (i.e., at approximately the same location along the Y axis), this need not be the case.

FIG. 20C is intended to emphasize the amount by which two 3-part building blocks (i.e., 1261 and 1262) need not be collinear. As can be seen, the Y axis dimensions, of each of 1261 and 1262, if projected onto the Y axis, would not overlap. Stated another way, the top edge of 1262 is below the bottom edge of 1261, Further, the X axis dimensions, of each of 1261 and 1262, if projected onto the X axis, would overlap.

With regard to all the above-described nonlinear configurations, while they may perform better with hybrid carrier, it should be understood that such configurations can also be useful with NDAD's based on other types of carrier material, such as polyethylene foam.

5 GLOSSARY OF SELECTED TERMS adhesive: adhesives may be broadly divided in two classes: structural or pressure sensitive. To form a permanent bond, structural adhesives harden via processes such as: evaporation of solvent (for example, white glue), reaction with UV radiation (as in dental adhesives), chemical reaction (such as two-part epoxy), or cooling (as in hot melt). In contrast, pressure-sensitive adhesives form a bond simply by the application of relatively light pressure, between the adhesive and the surfaces (or adherends) it is intended to bond.

elastomechanical: something that has, or includes as a property of its normal operation, elasticity.

elastomer: any of various polymers having elastic properties such as those of natural rubber.

elastomeric material: any material exhibiting elastic or rubber-like properties.

segment: a continuous area of material, such as of carrier or inelastic material (release liner or otherwise).

hybrid carrier or hybrid elastomeric material: any of the variety of materials, typically polymer-based, that is intrinsically adhesive while simultaneously possessing suitable elastomechanical properties permitting it to serve as a carrier material in an NDAD. Example hybrid carrier is manufactured by TESA SE, a German company with headquarters in Norderstedt. It is marketed by Tesa as a reversible bonding solution, under the tradename "BOND & DETACH." An example specific product is Tesa 70465 double-sided "Bond & Detach" tape, with a total thickness of 0.65 mm.

inelastic material: a material rigid along its X and Y axes, but which may be easily deformable along its Z axis. An inelastic material can be, for example, a biaxially-oriented polypropylene (BOPP). For the embodiments discussed herein, a BOPP thickness of approximately 0.05 mm is often appropriate. A suitable BOPP, for example, is manufactured by AVERY DENNISON CORPORATION (Glendale, California, USA) under the FASSON trade name.

mechanically-coupling tape: tapes that couple (or adhere) to each other through the operation of small mechanical devices spread over first and second surface areas. The adhering occurs when such surfaces are pressed into contact with each other. A well-known variety of mechanically-coupling tape is marketed under the brand name "VELCRO." Velcro uses a "hook and eye" type of mechanical coupling, where a first surface is comprised of numerous hook-like features, and a second surface comprises numerous eye-type structures. Another well-known variety of mechanically-coupling tape is marketed by the 3M Company under the brand name "DUAL LOCK." Each Dual Lock surface is covered with mushroom-like structures that interlock, when the surfaces are pressed into contact with each other. The mechanical couplers are repeated many times across each surface area to be joined. For example, there will generally be at least 25 mechanical couplers per square centimeter, and frequently many more (e.g., 100 per square centimeter).

modified peel force: modified peel force can be regarded as measured under the same conditions as those for measuring peel force (see below definition of peel force), except the backing, to which the adhesive (or mechanical coupling) is applied, is rigid rather than flexible. Therefore, the "tape" backing may be more appropriately referred to as a mounting plate, such as rectangular mounting plate 410 of various figures herein. As with peel force, modified peel force is applied at one edge (and only at one edge) of the mounting plate, Let us call this edge me1, and represent its length as ml1. As with measuring peel force, modified peel force is applied normal to the flat surface to which the mounting plate has been attached. If the modified peel force is sufficient to detach the mounting plate at edge me1, then the mounting plate forms a new edge me2. Along the dimension of application of the modified peel force, new edge me2 has the same length (ml1) as me1. As can be appreciated, with a same modified peel force applied at me2, the modified peel force sufficient to detach me1 is also sufficient to detach me2. In addition to being sufficient for detachment of me2, because the modified peel force is applied to a rigid backing, a same modified peel force has additional mechanical leverage against me2. This creates a kind of "avalanche" effect, where the additional mechanical leverage, of each successively-formed edge, causes detachment of each successive edge to proceed more quickly.

peel force: typically measured when an adhesive (or mechanical coupling) is applied to a flexible backing to form a kind of tape (either an adhesive tape or a mechanical-coupling tape). The tape backing is typically in a rectangular configuration and applied to a flat surface. At one edge (and only at one edge) of the tape a force (called the peel force), normal to the flat surface, is applied. Let us call this edge e1, and represent its length as l1. If the peel force is sufficient to detach edge e1, because of the flexible and rectangular backing, the tape reforms a new edge e2. Edge e2 has the same length as e1 and is parallel to e1. As can be appreciated, with a same peel force applied at e2, the peel force sufficient to detach e1 is also sufficient to detach e2 picture frame:
A picture frame is for display of graphical material of a two-dimensional, or primarily two-dimensional, character, Conventional types of graphical material include photographs, prints, paintings, flatscreen electronic displays, and any other types of primarily two-dimensional graphical media. In addition, picture frames can be used for display of graphical material with a substantial depth (or Z) dimension, such as various types of relief sculpture.

A picture frame provides a main plane, for viewing, that is approximately rectangular and rigid.

If we define the depth of any particular picture frame as being 1 unit, each of the length and width is generally limited to being within a relative size range of 2-500 units.

Regarding the ratio of the length and width to each other, it is generally limited to being within the range of 20 to 1. This means the longer dimension of a picture frame is generally no more than 20× its shorter dimension. The "longer" dimension stops being longer when the ratio is 1 (i.e., the length and width are equal).

Other than being limited to these types of relative measures, we regard the term picture frame as encompassing a vast range of absolute or actual sizes. For example, it is not uncommon to see picture frames on the scale of a postage stamp (i.e., just 2 or 3 cm along its width and length), and ranging up to the display of vast graphical works in publicly accessible settings (e.g., vast mural sized works of 20 to 30 m, along its width, length, or both), polyethylene foam: any of a variety of polymer-based foam or sponge materials, with suitable elastomechanical properties to serve as an NDAD carrier. Suitable polyethylene foam's include those which are closed cell, cross-linked, or combination of both.

pressure-sensitive adhesive: a non-reactive adhesive which forms a bond when pressure is applied to cause contact between the adhesive and a surface (or adherend). In general, no addition of a solvent, water, or heat is needed, to activate the adhesive. Pressure-sensitive adhesives are designed with a balance between flow and resistance to flow. The bond forms because the adhesive is soft enough to flow, or wet, the adherends. The bond has strength because the adhesive is hard enough to resist flow when stress is applied to the bond. Once the adhesive and the adherends are in proximity, there are also molecular interactions, such as van der Waals forces, involved in a bond. Pressure-sensitive adhesives are usually based on an elastomer compounded with a suitable tackifier (e.g., a rosin ester). The elastomers can be based on acrylics, which can have sufficient tack on their own and do not require a tackifier wall: unless context indicates otherwise, reference to a "wall" or "wall side" herein, also includes reference to any planar surface to which an object is desired for attachment.

While the description herein has focused on using the invention for attachment of an object to a wall, it can be readily appreciated that the invention can be used for attaching any two objects together, so long as the objects satisfy the requisite mechanical properties.

While the invention has been described in conjunction with specific embodiments, it is evident that many alternatives, modifications, and variations will be apparent in light of the foregoing description. Accordingly, the invention is intended to embrace all such alternatives, modifications, and variations as fall within the spirit and scope of the appended claims and equivalents.

What is claimed is:

1. An elastomechanical fastening system, comprising:
a first end-user graspable tab coupled to a first end of a first area of elastomeric material;
a first and a second side, of the first area of elastomeric material, that are adhesive;
a first inelastic area coupled, at a first end, to a second end of the first area of elastomeric material;
a first side, of the first inelastic area, that is not adhesive;
a second side, of the first inelastic area, that is adhesive;
a second area of elastomeric material coupled, at a first end, to a second end-user graspable tab, and, at a second end, to a second end of the first inelastic area;
a first and a second side, of the second area of elastomeric material, that are adhesive;
a first side of a fastening device, consisting of a first side of the first end-user graspable tab, the first side of the first area of elastomeric material, the first side of the first inelastic area, the first side of the second area of elastomeric material, and a first side of the second end-user graspable tab;
a first sub-side of the fastening device, consisting of the first side of the fastening device, except the first sides, of the first and second end-user graspable tabs, are excluded;
a second side of the fastening device, consisting of a second side of the first end-user graspable tab, the second side of the first area of elastomeric material, the second side of the first inelastic area, the second side of the second area of elastomeric material, and a second side of the second end-user graspable tab; and
a second sub-side of the fastening device, consisting of the second side of the fastening device, except the second sides, of the first and second end-user graspable tabs, are excluded.

2. The fastening system of claim 1, further comprising:
a mounting plate;
a first side of the mounting plate; and
a second side of the mounting plate, to which the second sub-side of the fastening device is attached.

3. The fastening system of claim 2, further comprising:
a single, continuous, length of carrier, with first and second sides upon which, respectively, the first and second sides, of the fastening device, are based;
a first segment of inelastic material, added to the first side of the hybrid carrier, and at a location corresponding to the first inelastic area;
a second segment of inelastic material, added to the first side of the hybrid carrier, and at a location corresponding to the first end-user graspable tab;
a third segment of inelastic material, removed from the second side of the hybrid carrier, and a location corresponding to the first end-user graspable tab;
a fourth segment of inelastic material, added to the first side of the hybrid carrier, and at a location corresponding to the second end-user graspable tab; and
a fifth segment of inelastic material, removed from the second side of the hybrid carrier, and a location corresponding to the second end-user graspable tab.

4. The fastening system of claim 1, further comprising:
a single, continuous, length of a carrier, with first and second sides upon which, respectively, the first and second sides, of the fastening device, are based.

5. The fastening system of claim 4, further comprising:
a hybrid carrier for the single, continuous, length of carrier; and
a first segment of inelastic material, added to the first side of the hybrid carrier, and at a location corresponding to the first inelastic area.

6. The fastening system of claim 5, further comprising:
a second segment of inelastic material, added to the first side of the hybrid carrier, and at a location corresponding to the first end-user graspable tab;

a third segment of inelastic material, added to the second side of the hybrid carrier, and at a location corresponding to the first end-user graspable tab;
a fourth segment of inelastic material, added to the first side of the hybrid carrier, and at a location corresponding to the second end-user graspable tab; and
a fifth segment of inelastic material, added to the second side of the hybrid carrier, and at a location corresponding to the second end-user graspable tab.

7. The fastening system of claim 1, further comprising:
an addition of a first color, to a first sub-area of the first area of elastomeric material, visible from the second side of the fastening device; and
an addition of the first color, to a second sub-area of the second area of elastomeric material, visible from the second side of the fastening device.

8. The fastening system of claim 7, further comprising:
a mounting plate to which the second sub-side of the fastening device is attached; and
wherein, when a predetermined level of debonding has occurred for the first and second areas of elastomeric material, the first color, of the first and second sub-areas, becomes unoccluded.

9. The fastening system of claim 1, further comprising:
an addition of a first pattern, to a first sub-area of the first area of elastomeric material, visible from the second side of the fastening device; and
an addition of the first pattern, to a second sub-area of the second area of elastomeric material, visible from the second side of the fastening device.

10. The fastening system of claim 9, further comprising:
a mounting plate to which the second sub-side of the fastening device is attached; and
wherein, when a predetermined level of debonding has occurred for the first and second areas of elastomeric material, the first pattern, of the first and second sub-areas, becomes unoccluded.

11. The fastening system of claim 1, further comprising:
a first object for attachment by the fastening device;
a first side of the first object; and
a second side of the first object, to which the second sub-side of the fastening device is attached.

12. The fastening system of claim 11, further comprising:
a first nonlinear shape, for the first area of elastomeric material, that causes a first debonding process, from the first end of the first area of elastomeric material to the second end of the first area of elastomeric material, to follow a nonlinear path; and
a second nonlinear shape, for the second area of elastomeric material, that causes a second debonding process, from the first end of the second area of elastomeric material to the second end of the second area of elastomeric material, to follow a nonlinear path.

13. The fastening system of claim 12, wherein the first debonding process, from the first end of the first area of elastomeric material to the second end of the first area of elastomeric material, changes direction by approximately 90 degrees.

14. The fastening system of claim 11, further comprising:
a wall to which the first sub-side of the fastening device is attached;
a topmost edge of the first object, wherein the topmost edge holds a second object against the wall and against a force of gravity; and
a configuration, such that as much of the first and second areas of elastomeric material, as is possible, is as close as possible to the topmost edge.

15. The fastening system of claim 1, further comprising:
a first longer dimension for the first area of elastomeric material along a first axis;
a second longer dimension for the second area of elastomeric material along the first axis, wherein the first and second areas of elastomeric material begin at an approximately same location with respect to the first axis, and end at an approximately same location with respect to the first axis;
a configuration of the first end-user graspable tab such that it can be pulled along a second axis perpendicular to the first axis; and
a configuration of the second end-user graspable tab such that it can be pulled along the second axis, and in a direction opposite to that of the first end-user graspable tab.

16. The fastening system of claim 1, further comprising:
a configuration of the first area of elastomeric material into a first zigzag pattern; and
a configuration of the second area of elastomeric material into a second zigzag pattern.

17. The fastening system of claim 1, further comprising:
a second inelastic area, within the first area of elastomeric material, wherein the second inelastic area is not adhesive on its first or second side; and
a third inelastic area, within the second area of elastomeric material, wherein the third inelastic area is not adhesive on its first or second side.

18. An elastomechanical fastening system, comprising:
a first end-user graspable tab coupled to a first end of a first area of elastomeric material;
a first and a second side, of the first area of elastomeric material, that are adhesive;
a first inelastic area coupled, at a first end, to a second end of the first area of elastomeric material;
a first side, of the first inelastic area, that is not adhesive;
a second side, of the first inelastic area, that is adhesive;
a second end-user graspable tab coupled to a first end of a second area of elastomeric material;
a first and a second side, of the second area of elastomeric material, that are adhesive;
a second inelastic area coupled, at a first end, to a second end of the second area of elastomeric material;
a first side, of the second inelastic area, that is not adhesive;
a second side, of the second inelastic area, that is adhesive;
a configuration of the first and second inelastic areas such that they do not directly connect to each other;
a first side of a first fastening device, consisting of a first side of the first end-user graspable tab, the first side of the first area of elastomeric material, and the first side of the first inelastic area;
a first sub-side of the first fastening device, consisting of the first side of the first fastening device, except the first side of the first end-user graspable tab is excluded;
a second side of the first fastening device, consisting of a second side of the first end-user graspable tab, the second side of the first area of elastomeric material, and the second side of the first inelastic area;
a second sub-side of the first fastening device, consisting of the second side of the first fastening device, except the second side of the first end-user graspable tab is excluded;
a first side of a second fastening device, consisting of a first side of the second end-user graspable tab, the first side of the second area of elastomeric material, and the first side of the second inelastic area;
a first sub-side of the second fastening device, consisting of the first side of the second fastening device, except the first side of the second end-user graspable tab is excluded;
a second side of the second fastening device, consisting of a second side of the second end-user graspable tab, the second side of the second area of elastomeric material, and the second side of the second inelastic area; and
a second sub-side of the second fastening device, consisting of the second side of the second fastening device, except the second side of the second end-user graspable tab is excluded.

19. The elastomechanical fastening system of claim 18, further comprising:
a first object for attachment by the first and second fastening devices;
a first side of the first object; and
a second side of the first object, to which the second sub-sides, of the first and second fastening devices, are attached.

20. The fastening system of claim 19, further comprising:
a first longer dimension for the first area of elastomeric material along a first axis;
a second longer dimension for the second area of elastomeric material along the first axis;
a configuration of the first end-user graspable tab such that it can be pulled along the first axis; and
a configuration of the second end-user graspable tab such that it can be pulled along the first axis, and in a direction opposite to that of the first end-user graspable tab.

* * * * *